Sept. 2, 1958 A. DAVISON ET AL 2,850,718

COUNTING CIRCUITS

Filed Jan. 25, 1955 32 Sheets-Sheet 1

Inventors
ALAN DAVISON
RONALD THREADGOLD
By
Young, Emery & Thompson
Attorneys

Inventors
ALAN DAVISON
RONALD THREADGOLD.
By
Young, Emery & Thompson
Attorneys

Sept. 2, 1958 A. DAVISON ET AL 2,850,718

COUNTING CIRCUITS

Filed Jan. 25, 1955 32 Sheets-Sheet 3

Inventors
ALAN DAVISON
RONALD THREADGOLD.
By
Young, Emery & Thompson
Attorneys

Inventors
ALAN DAVISON
RONALD THREADGOLD.
By
Young, Emery + Thompson
Attorneys

Sept. 2, 1958 A. DAVISON ET AL 2,850,718

COUNTING CIRCUITS

Filed Jan. 25, 1955 32 Sheets-Sheet 5

Inventors
ALAN DAVISON
RONALD THREADGOLD.
By
Young, Emery & Thompson
Attorneys

Inventors
ALAN DAVISON
RONALD THREADGOLD.
By
Young, Emery & Thompson
Attorneys

Inventors
ALAN DAVISON
RONALD THREADGOLD.
By
Young, Emery & Thompson
Attorneys

Inventors
ALAN DAVISON
RONALD THREADGOLD.
By
Young, Emery & Thompson
Attorneys

Inventors
ALAN DAVISON
RONALD THREADGOLD.
By
Young, Emery & Thompson
Attorneys

Inventors
ALAN DAVISON
RONALD THREADGOLD.
By
Young, Emery & Thompson
Attorneys

Inventors
ALAN DAVISON
RONALD THREADGOLD.
By
Young, Emery & Thompson
Attorneys

Inventors
ALAN DAVISON
RONALD THREADGOLD.
By
Young, Emery & Thompson
Attorneys

COUNTING CIRCUITS

Filed Jan. 25, 1955 32 Sheets-Sheet 13

Inventors
ALAN DAVISON
RONALD THREADGOLD.
By
Young, Emery & Thompson
Attorneys

Inventors
ALAN DAVISON
RONALD THREADGOLD.
By
Young, Emery & Thompson
Attorneys

Sept. 2, 1958 A. DAVISON ET AL 2,850,718

COUNTING CIRCUITS

Filed Jan. 25, 1955 32 Sheets-Sheet 15

Inventors
ALAN DAVISON
RONALD THREADGOLD.
By
Young, Emery & Thompson
Attorneys

Sept. 2, 1958 A. DAVISON ET AL 2,850,718

COUNTING CIRCUITS

Filed Jan. 25, 1955 32 Sheets-Sheet 16

Inventors
ALAN DAVISON
RONALD THREADGOLD.
By
Young, Emery + Thompson
Attorneys

Inventors
ALAN DAVISON
RONALD THREADGOLD
By
Young, Emery & Thompson
Attorneys

INCOMING CONTROL CIRCUIT (RECEIVER) 200

Inventors
ALAN DAVISON
RONALD THREADGOLD.
By
Young, Emery & Thompson
Attorneys

Sept. 2, 1958 A. DAVISON ET AL 2,850,718

COUNTING CIRCUITS

Filed Jan. 25, 1955 32 Sheets-Sheet 19

Inventors
ALAN DAVISON
RONALD THREADGOLD.
By
Young, Emery & Thompson
Attorneys

Inventors
ALAN DAVISON.
RONALD THREADGOLD.
By
Young, Emery & Thompson
Attorneys

Sept. 2, 1958 A. DAVISON ET AL 2,850,718

COUNTING CIRCUITS

Filed Jan. 25, 1955 32 Sheets-Sheet 21

Inventors
ALAN DAVISON
RONALD THREADGOLD.
By
Young, Emery & Thompson
Attorneys

LEVEL COUNTER (RECEIVER) 205

Inventors
ALAN DAVISON
RONALD THREADGOLD.
By
Young, Emery & Thompson
Attorneys

Sept. 2, 1958 A. DAVISON ET AL 2,850,718

COUNTING CIRCUITS

Filed Jan. 25, 1955 32 Sheets-Sheet 23

Inventors
ALAN DAVISON
RONALD THREADGOLD.
By
Young, Emery & Thompson
Attorneys

Inventors
ALAN DAVISON
RONALD THREADGOLD
By
Young, Emery & Thompson
Attorneys

Sept. 2, 1958 A. DAVISON ET AL 2,850,718

COUNTING CIRCUITS

Filed Jan. 25, 1955 32 Sheets-Sheet 25

Inventors
ALAN DAVISON
RONALD THREADGOLD
By
Young, Emery + Thompson
Attorney

Sept. 2, 1958 A. DAVISON ET AL 2,850,718

COUNTING CIRCUITS

Filed Jan. 25, 1955 32 Sheets-Sheet 26

Inventors
ALAN DAVISON
RONALD THREADGOLD.
By
Young, Emery & Thompson
Attorneys

Inventors
ALAN DAVISON
RONALD THREADGOLD.
By
Young, Emery & Thompson
Attorneys

SEQUENCE WORK CIRCUIT (RECEIVER) 202

Inventors
ALAN DAVISON
RONALD THREADGOLD.
By
Young, Emery & Thompson
Attorneys

Sept. 2, 1958 A. DAVISON ET AL 2,850,718

COUNTING CIRCUITS

Filed Jan. 25, 1955 32 Sheets-Sheet 29

Inventors
ALAN DAVISON
RONALD THREADGOLD.
By
Young, Emery & Thompson
Attorneys

Inventors
ALAN DAVISON
RONALD THREADGOLD.
By
Young, Emery & Thompson
Attorneys

CHECK MISCELLANEOUS CIRCUIT (RECEIVER) 208

EARLY TRANSFER CIRCUIT (RECEIVER) 203

Inventors
ALAN DAVISON
RONALD THREADGOLD
By Young, Emery & Thompson
Attorneys

Inventors
ALAN DAVISON
RONALD THREADGOLD.
By
Young, Emery & Thompson
Attorneys

United States Patent Office 2,850,718

Patented Sept. 2, 1958

2,850,718

COUNTING CIRCUITS

Alan Davison and Ronald Threadgold, Liverpool, England, assignors to Automatic Telephone & Electric Company Limited, Liverpool, England, a British company Application January 25, 1955, Serial No. 483,985

Claims priority, application Great Britain February 4, 1954

5 Claims. (Cl. 340—147)

The present invention relates to signalling systems and is more particularly concerned with systems of the type in which information stored at one station is transferred in the form of electrical impulses to a second station over a transmission line. Such systems find application in the fields of telephony, telegraphy and remote control. The invention is however also concerned with arrangements for storing numbers and for reproducing the numbers in dynamic form.

A requirement in signalling systems of this type is that equipment at the receiving end of a transmission line shall respond only to a signal received correctly. For example, in an automatic telephone system employing long distance dialling, it is obviously undesirable for the switching equipment at the terminating exchange to connect the junction to a wrong subscriber in the event of a spurious signal appearing on the line and interfering with transmitted selection signals.

It is one of the objects of the invention to provide an improved signalling system of the type mentioned in which an incoming signal is checked at the receiving station for accuracy before being accepted, and in which a transmission is repeated in the event of it first being received incorrectly.

Further objects of the invention relate to the provision of improved means for storing numbers and for reproducing the numbers in dynamic form.

According to one feature of the invention in circuit arrangements for storing numbers in static form and reproducing the numbers in dynamic form a plurality of leads are each connected to a circuit which includes a first gas discharge tube and a second gas discharge tube and a number is represented by the application of a potential to at least one lead, the application of a potential to a lead serving to apply a biasing potential to the first gas discharge tube in the circuit connected to said lead while the conduction of said first gas discharge tube serves to apply a biasing potential to the second gas discharge tube in the same circuit, means being provided for applying pulse potentials successively to the first tubes of all the circuits to cause the striking of the first tubes in those circuits in which a potential has been applied to the connected lead and for subsequently applying pulse potentials successively to all said second tubes to cause the pulsing of the second tubes in those stages in which the first tubes are conducting.

According to another feature of the invention, in circuit arrangements for storing numbers, a plurality of leads are each connected to a circuit which includes a first discharge tube and a second gas discharge tube and a number is represented by the application of a potential to at least one lead, the application of a potential to a lead serving to apply a biasing potential to the first gas discharge tube in the circuit connected to said lead while the pulsing of a second tube serves to apply a pulse potential to the first tube in the same circuit, the second tubes of all the circuits being connected in groups and being controlled to pulse successively by the successive application of a biasing potential to the tubes of each group and during each application of biasing potential by the application of a pulse potential to corresponding tubes of all the groups successively whereby the first tubes are struck only in those circuits in which a potential is applied to the lead connected thereto.

According to a further feature of the invention in a system for transmitting numbers in binary form between a transmitter and a receiver checking arrangements are provided in which a first binary counting circuit provided at the transmitter is arranged to count the total of one digit in the numbers to be transmitted and to transmit this total to the receiver prior to the transmission of the numers, the total being injected in complementary form into a second binary counting circuit having the same capacity as the first and to which the one digits of the received numbers are subsequently added whereby if the number of one digits counted by both counting circuits is the same, the second counting circuit will register its maximum count when reception of the numbers is completed.

According to yet another feature of the invention, in an electrical signalling system for transmitting items of information in a multi-element code by the use of a single pulse in one only of the elements, checking arrangements comprises first and second gas discharge tubes arranged as a binary pair, first and second fault indicating gas discharge tubes to which a priming potential is applied on the conduction of said first and second tubes respectively, a first circuit connected in parallel to said first tube and said first fault indicating tube, a second circuit connected in parallel to said second tube and said second fault indicating tube, means for applying first and second pulses to said first circuit prior to and at the termination of the reception of an item of information respectively and means for applying the single pulse to said second circuit whereby in response to the reception of said single pulse neither fault indicating tube strikes, in response to the reception of two pulses instead of said single pulse the second fault indicating tubes strikes on the reception of the second pulse while in the absence of a pulse the first fault indicating tube strikes due to the application of said second pulse to said first circuit on the termination of the reception of an item of information.

The invention will be better understood from the following description which should be read in conjunction with the accompanying drawings comprising Figs. 1 to 37 which show the invention applied, by way of example, to the transmission of information from an outgoing register at a telephone exchange to an incoming register at a distant exchange. Figs. 1 and 3 to 19 relate to the sending equipment while Figs. 2 and 20 to 37 relate to the receiving equipment.

Fig. 1 shows in block schematic form the terminal equipment at the outgoing end of an inter-change junction line, Fig. 2 shows in similar form the terminal equipment at the incoming end of the inter-exchange junction line, Fig. 3 shows the Supervisory circuits of the Sender, Figs. 4 and 4A show the Start and Pulsed-HT supplies, Figs. 5 and 5A show the Sequence Control circuit, Figs. 6, 6A and 6B show the circuit of the 400/50 I. P. S. Counter, Fig. 7 shows the circuit of a Level Counter of the Sender, Fig. 8 shows the circuit of a Contact Counter of the Sender, Fig. 9 shows the circuit of the Binary Check Counter elements, Fig. 10 shows the circuit of a Prefix Element for use with the Sender, Fig. 11 shows the circuit of a Miscellaneous outgoing Storage element, Fig. 12 shows the circuit of a Numerical Storage element, Fig. 13 shows the Sequence Work circuit, Fig. 14 shows the Send circuit of the Sender, Fig. 15 shows the Fault and Resend Circuit, Fig. 16 shows the Supervisory Circuit of the Receiver located in the sending equipment, Figs. 17, 18 and 19 show how certain of the drawings relating to the Sender should be arranged.

Figs. 20 and 20A show the Incoming Control Circuit of the Receiver,

Figs. 21 and 21A show the circuit of the 50 I. P. S. Counter,

Figure 1:
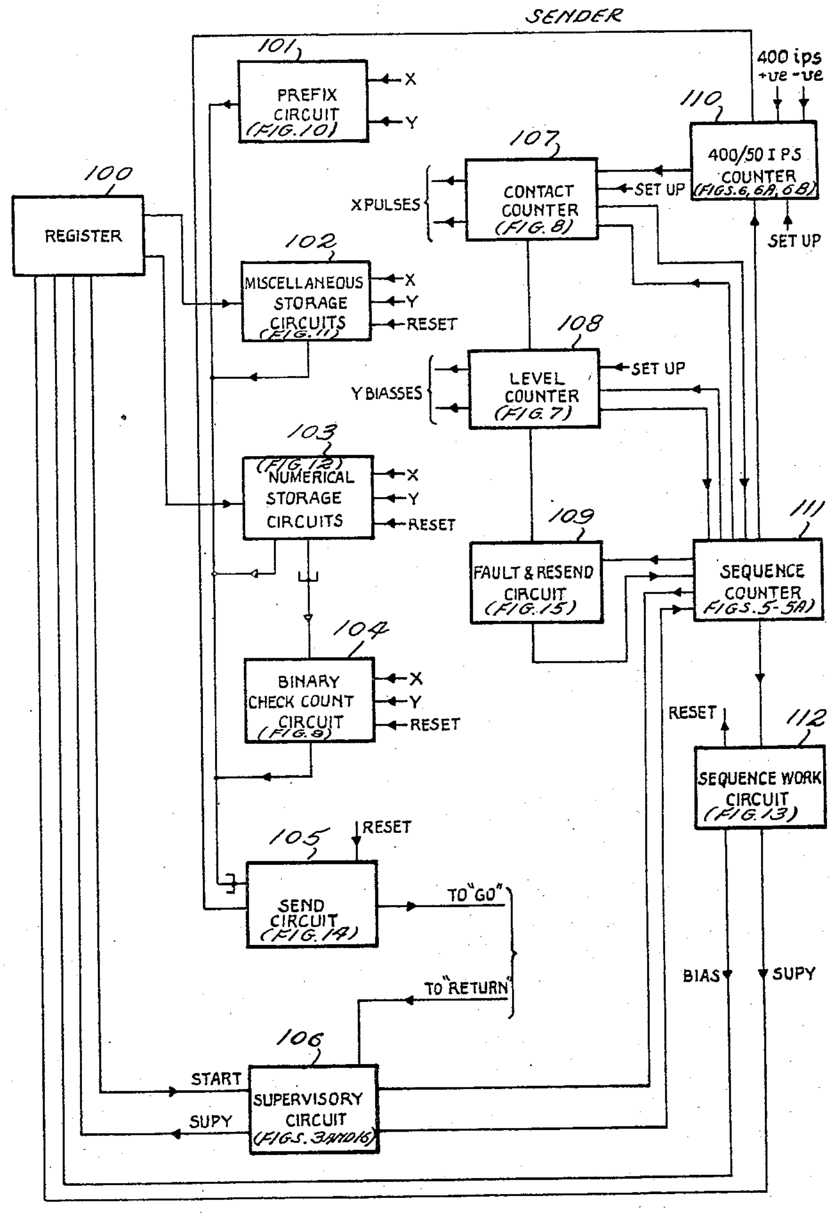

A general description will first be given of the principles of operation of the Sender and the Receiver and of the way in which the various components in Figs. 1 and 2 interwork. In this connection it should be explained that the Sender consists of the elements 101 to 112 inclusive shown in Fig. 1 and is controlled from the Register 100.

The operation of both the Sender and the Receiver is effected by pulse control, that is to say, both the Sender and the Receiver have a single pulse source which serves to drive the circuits through a predetermined sequence of operations. The frequency of the pulse source in both the Sender and Receiver is 400 i. p. s. and in the Sender, these pulses are applied to the 400/50 i. p. s. Counter 110, Fig. 1, which according to the stage reached in the operation of the Sender either repeats the pulses at 400 i. p. s. or is driven by the pulse source to provide pulses at the rate of 50 i. p. s. As regards the Receiver none of the equipment therein requires to be operated at the higher rate and the output from the pulse source is applied to a 50 i. p. s. Counter 201, Fig. 2, which provides a pulse output at 50 i. p. s.

The arrangement and method of operation of the Send circuit 105, the Contact Counter 107, the Level Counter 108, the Fault and Resend circuit 109, the 400/50 i. p. s. Counter 110, the Sequence Counter 111 and the Sequence Work Counter 112 in the Sender (Fig. 1) and the 50 i. p. s. Counter 201, the Sequence Work circuit 202, the Contact Counter 204, the Level Counter 205 and the Sequence Counter 206 in the Receiver (Fig. 2) are all similar and consist of a number of stages each comprising a pulse repeating tube and a counting tube. The circuits are pulse driven from an input common to all the stages or from inputs individual to the stages or to certain of the stages. A pulse repeating tube is primed from the counting tube of the previous stage and will strike in response to the next pulse applied to the circuit. The pulse repeating tubes conduct only for a short period owing to the provision of pulsed high tension supplies and on becoming conducting apply a pulse to the counting tube of the same stage, the counting tube striking. A counting tube remains conducting until a further counting tube is struck, when the first counting tube is extinguished since the counting tubes have a common anode load. In most cases the outputs from the circuits are taken from the cathodes of the pulse counting tubes but in some instances the pulses obtained at the cathodes the pulse repeating tubes are used.

The information to be transmitted from the Sender to the Receiver consists of routing, numerical and supervisory information and is stored on the Register 100 (Fig. 1) on two-position devices such as relays or gas discharge tubes. Separate storage circuits will be provided in the register for each item of information, the storage circuits consisting of a number of stages of two-position devices. Each stage will have a display lead extending to the Sender and when a stage in a storage circuit becomes effective in response to the storage of information therein, a signal is applied to the associated display lead. Each item of routing and supervisory information i. e. Miscellaneous information is indicated in static form by the presence of a signal on one of the display leads extending from the storage circuit appropriate to that item. Numerical information may be presented in a simple coded form and in the embodiment to be described the binary form is used so that each item of information in static form is given by the presence of a signal on one or two of the display leads extending from the storage circuit appropriate to that item. It will, of course, be understood that the information may be indicated in other ways. For instance, the Miscellaneous information may be indicated in binary form while the numerical information may be indicated in "2 out of 5" code. However, whatever the form of indication employed, the items will be made available simultaneously by the Register, the number of display leads being equal to the number of items of information multiplied by the sum of the number of stages in each storage circuit.

All these forms of coded indications however have the characteristic that a single item of information is represented in dynamic form by the presence or absence of a signal in a number of successive time elements. In other words a single item of information is represented in dynamic form by a "0" or a "1" in a number of successive time elements. It will therefore be understood that the Miscellaneous and Numerical Storage circuits 102, 103 to which the information is transferred from the Register 100, must include a number of storage elements equal to the number of elements necessary for each item multiplied by the number of items, and each storage element is associated with a particular display lead extending to the Sender from the Register.

Each storage element in the Miscellaneous and Numerical storage circuits is provided with a number of cold cathode gas discharge tubes and the presence of a signal on a display lead extending from the Register 100 serves to bias one of the tubes in the storage element associated with the display lead. Striking pulses are then applied from scanning means to each of the storage elements in turn so that a tube strikes in each of the storage elements associated with a display lead to which a signal has been applied. When the scanning operation has been completed, therefore, all the information has been transferred from the Register to the Sender.

The effect of the striking of a gas discharge tube in a storage element is to apply a biasing potential to a second tube in the element and a second scanning operation is then performed. This second scanning operation is effective on all the second tubes of the storage elements and causes those to strike in the storage elements in which the first tube has been struck on the previous scanning operation. The striking of one of these second tubes controls the operation of the Send circuit 105 (Fig. 1) which is arranged to transmit mark and space signals over the junction line to the Receiver shown in Fig. 2. At the Receiver the equipment is arranged to operate at the same frequency as the equipment at the Sender but with a slight delay in order to take into account the transmission time of the signals over the junction.

The signals incoming to the Receiver are applied to Miscellaneous and Numerical storage circuits 212 and 213 respectively. These storage circuits effectively operate in the reverse manner to those in the Sender since the incoming signals are in dynamic form. The storage circuits are scanned by bias and pulse potentials obtained from the scanning means at the Receiver and a gating arrangement is provided whereby a pulse potential is only applied to the first discharge tube of a particular storage element if a signal is received in time element appropriate to such storage element so that the pattern of operated storage elements at the Sender is reproduced in the storage elements at the Receiver. The striking of the first tube in a storage element serves to apply a bias to a second tube in the same element and when the information is to be transferred from the storage circuits to the I/C Register, a striking potential is applied simultaneously to the second tubes of all the storage elements whereby those that are primed strike and apply potentials to display leads extending to the I/C Register whereby the information is transferred thereto.

In addition to the transmission of the Miscellaneous and Numerical information, a prefix signal in a similar coded form to that of the Miscellaneous and Numerical information is also transmitted in order to prevent incorrect operation of the Receiver in response to interfering signals. This prefix signal is the same for all transmissions and is sent from the sender to the Receiver in the early stages of the scanning operation.

The use of the above described type of code for the information to be transmitted enables a particularly effective check to be made on any transmission. This check takes place in the following manner. The number of "ones" in a transmitted message is counted by the Binary Check Count circuit 104 (Fig. 1) and this number is transmitted during the scanning operation before the Miscellaneous and Numerical information. At the Receiver, this number is injected into a Binary Check circuit 210 (Fig. 2) which has the same capacity as the Binary Check Count circuit 104. The number is, however, injected into the Binary Check circuit as the complement to the capacity of the Binary Check circuit. When the transmitted signals are received by the Receiver, the number of "ones" received is also counted by the Binary Check circuit and if this number is in agreement with the number transmitted by the Sender, the Binary Check circuit will be restored to its normal condition. If, however, the number of "ones" received differs from that transmitted the Binary Check circuit will remain in an off-normal position at the end of transmission and an indication is given that the reception has been faulty.

The scanning arrangements employed in the Sender and the Receiver are similar and both provide for the co-ordinate scanning of the storage circuits. The scanning arrangements comprise the Contact Counter 107 and Level Counter 108 in the Sender and the Contact Counter 204 and the Level Counter 205 in the Receiver. The Contact Counter is a ten-position Counter while the Level Counter is a fifteen-position counter, the Contact Counter in the Sender being driven from the 400/50 I. P. S. Counter 110, while the Contact Counter in the Receiver is driven by the 50 I. P. S. Counter 201. In each case the Level Counter is driven from the Contact Counter in such a way that each time the Contact Counter reaches the tenth position, a pulse is delivered to the Level Counter to step this on to the next position.

Both in the case of the Sender and in the case of the Receiver, the Level Counter provides bias potentials to the storage elements and the contact Counter provides pulse potentials to the storage elements, the arrangement being such that with a particular stage in the Level Counter effective, a biasing potential is applied to one level of storage circuits during the time that the Contact Counter applies pulse potentials successively to corresponding contacts in all the levels.

The sequence of operations of the Sender and the Receiver is controlled by the Sequence Counter 111 in the Sender and the Sequence Counter 206 in the Receiver. As previously mentioned both these circuits are pulse driven, the pulses being derived at the completion of different stages in the operation of the Sender and Receiver. In addition, the Sequence work circuit 112 in the Sender and the Sequence work circuit 202 in the Receiver are provided and control the operation of a number of electromagnetic relays which are employed for applying signals to the appropriate register in order to indicate the completion of particular stages of operation of the Sender and Receiver respectively.

Briefly, the operation of the system is as follows. Referring first to Fig. 1, when a Register 100 at the sending end has stored its full complement of routing, numerical and supervisory information, a start signal is sent to the Supervisory circuit 106 of a group of Senders, and in a free Sender energises certain circuit elements which were previously inert. The Sender is now ready to accept information from the Register, and a "busy" signal is returned to the Register while the Sender is held. The various functions of the Sender are now controlled by the Sequence Counter 103.

The Miscellaneous and Numerical Storage circuits 102 and 103 respectively together with the Prefix circuit 101 and the Binary Check Count circuit 104 are now scanned for the first time by the Level Counter 108 and the Contact Counter 107. The result of this scan is that the information displayed by the Register 100 is now stored in the Sender, and the Binary Check Count circuit 104 has counted the total of the binary digits i. e. the total of the "ones," in the binary representation of the numerical information and has stored this total in binary form.

The Sender now tests to see if the Receiver at the receiving end of the junction is free, and if it is, scans its storage circuits again. This scan is carried out at 50 tubes per second, the Contact Counter 107 being now driven at this slower rate by the 400/50 I. P. S. Counter 110. All the stored information, commencing with the Prefix signal and including the result of the numerical count, is transmitted at 50 impulses per second (I. P. S.) to the Receiver via the Send circuit 105 in the form of "mark" and "space" impulses. The Prefix signal takes the form of a set pattern of impulses which distinguishes a genuine message from a possible sequence of spurious pulses appearing on the junction.

If the message is received correctly, the Receiver returns a signal indicating this to the Sender, which in turn passes a similar signal to the Register and restores to normal, ready to be seized by another Register. If no "received correctly" signal is returned from the Receiver, the Sender waits until a "Receiver free" signal is returned and then repeats the message. If the Receiver now signals that the message has been received correctly, the Sender returns a similar signal to the Register and clears itself as before. If there is still no acknowledgment from the Receiver, the Sender will clear itself without returning a "received correctly" signal to the Register.

Figure 2:
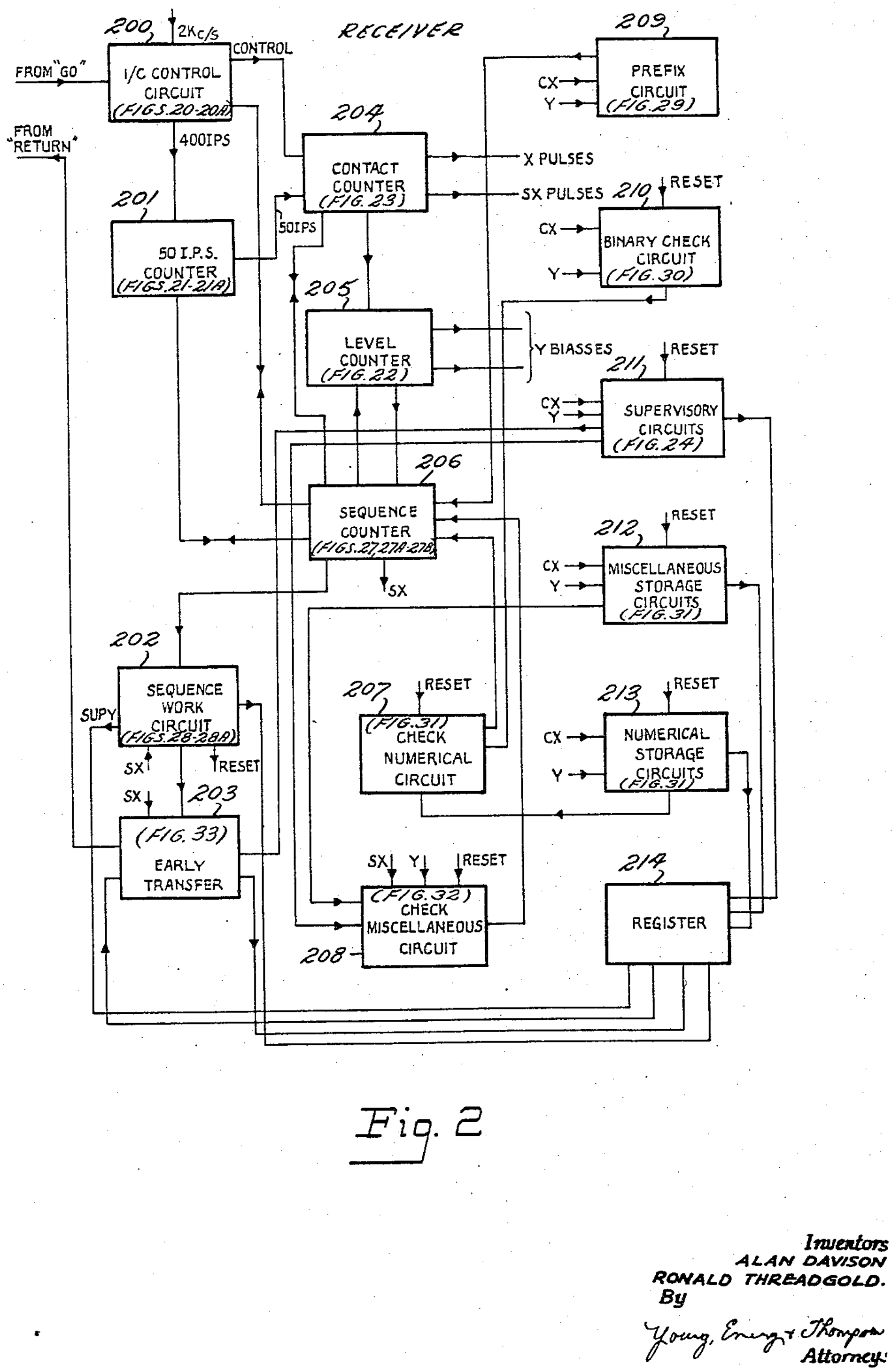

Referring now to Fig. 2, the I/C Control circuit 200 contains a 400 I. P. S. multivibrator synchronized by a 2,000 I. P. S. source which is controlled by a crystal oscillator, and this multivibrator supplies driving pulses to the 50 I. P. S. Counter 201. The multivibrator is started on receipt of a signal from the Sender, and the 50 I. P. S. Counter 201 drives the Contact Counter 204 and Level Counter 205, which are generally similar to corresponding circuits in the Sender. The Contact and Level Counters 204 and 205 respectively scan a field comprising tubes from the Prefix circuit 209, Binary Check circuit 210, Supervisory circuits 211, Miscellaneous Storage circuits 212 and Numerical Storage circuits 213, the scanning being carried out at the same rate but slightly out of step with the pulses being received from corresponding elements in the Sender. The presence or absence of a "space" impulse on the line determines whether or not a particular element receives a pulse when the scan reaches it, and at the end of the scan, the Storage circuits in the Sender and Receiver should contain the same information. In addition to supplying normal scanning pulses, the contact Counter 204 also produces special scanning pulses effective in some positions of the Level Counter 205 for initiating certain functions of the Receiver. As in the Sender, the Sequence Counter 206 controls the operation of the Receiver.

Various checks are made during reception of the message to ensure that it is received correctly. First the Prefix signal is checked to see that it conforms to the expected pattern. Miscellaneous and Supervisory signals are checked to ensure that only one "space" pulse is received in any one group of elements, and a double check is made on certain Supervisory signals, the pulses received in adjacent groups being self-checking. The Numerical signals are checked by injecting into a binary counter in the Binary Check circuit 210 a number which is the complement to the number received from the binary check count in the Sender, and then using the incoming numerical signals to restore the counter to normal. It will be understood that the injected number is the complement of the number in the Sender Check counter to the total capacity of the receiver check circuit, the two check circuits having the same capacity.

If all the checks are satisfactory, a "received correctly" signal is returned to the Sender and the received information is transferred to a free Register. The Receiver then restores itself to its normal condition, and is ready to receive another message. In the event of the faulty signal of any sort, the Receiver restores without returning a "received correctly" signal to the Sender.

Certain routing or supervisory signals may be transferred to a Register before the complete message has been received, an an "early transfer" facility is provided to enable this to be done.

In the drawings, the electron tubes carry references which distinguish their function and the sheet number in which they appear. All the tubes are gas-filled discharge tubes of the cold cathode type except those whose references contain the letters VT, which are thermionic tubes. Of the remainder:

VB indicates a tube in a binary pair,
VC is a counting tube,
VD is a pulse delaying tube,
VE is a biasing tube or an auxiliary tube in a counter circuit,
VF is a tube connected in a scanning field,
VG is a tube with a gating or extinguishing function,
VP is a pulse repeating tube,
VR is a pulse repeating tube which is part of a counter circuit,
VS is an information storage tube,
VW is a relay-operating tube.

The prefix figures indicate the figure number in which the tube is located and the suffix figures the position of the tube in a circuit. For example, the tube 22VR14 is a cold-cathode pulse repeating tube in the counter circuit of Fig. 22 and is associated with the fourteenth stage of the counter.

The leads which connect one part of the circuit to another part shown in a different drawing are shown with a number in brackets alongside the lead. This refers to the number of the figure to which the lead connects.

Figures 3, 16:
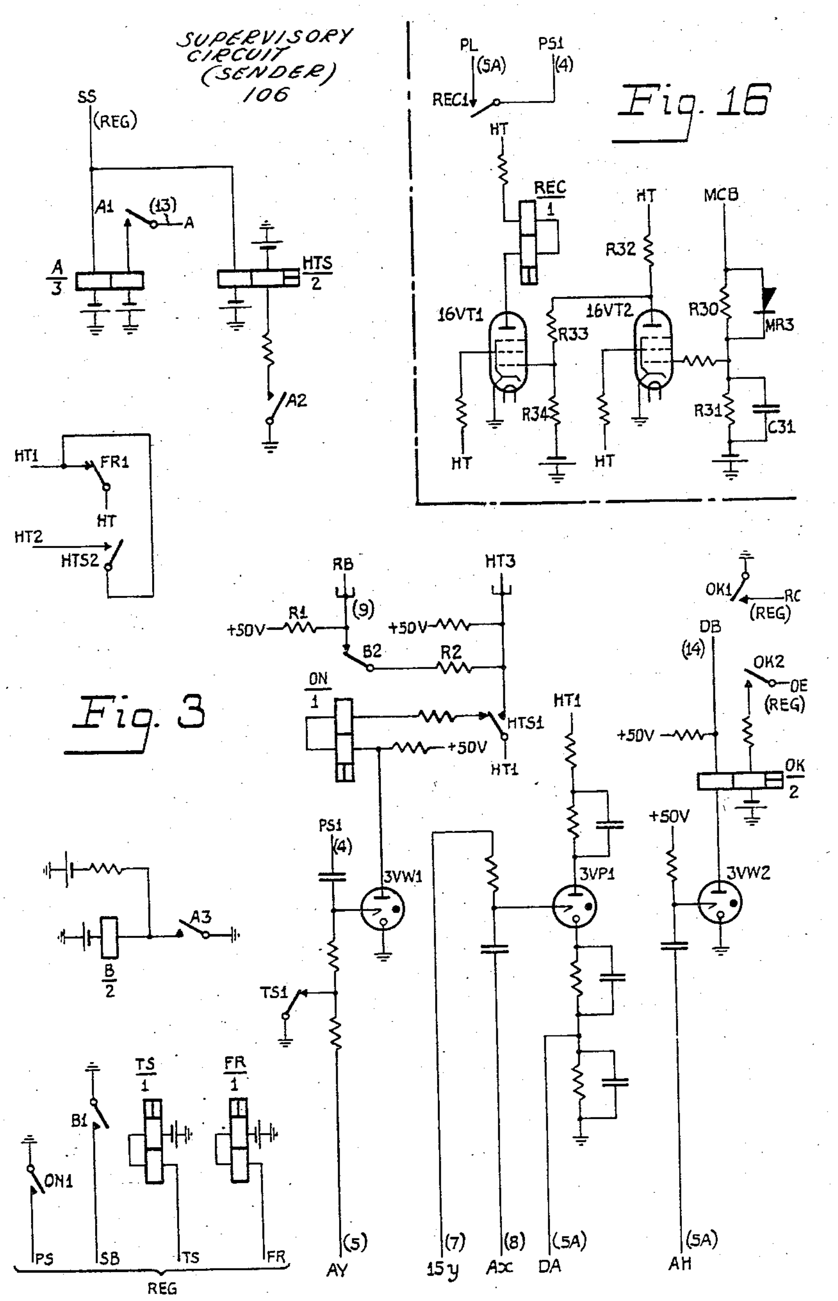

Before proceeding with a detailed description of the operation of the equipment, a description will be given of the individual circuits forming the equipment. Referring first to the Supervisory circuit shown in Figs. 3 and 16, the portion of the circuit shown in Fig. 16 is associated with the leg MCB of the junction line and serves to indicate the idle or busy condition of the junction line. It consists of two tubes 16VT1 and 16VT2 and a relay REC, the arrangement being such that relay REC is operated when the junction line is idle and serves to connect the output PS1 of a pulse source to lead PL. The portion of the Supervisory circuit shown in Fig. 3 consists of the gas discharge tubes 3VW1, 3VP1 and 3VW2 and the relays A, B, HTS, ON, OK, TS and FR. The circuit supplies HT to a number of other circuits over leads HT1, HT2 and HT3 and receives and transmits signals from and to the Register. Relay TS operates when the Sender is taken into use from the Register and is followed by the striking of tube 3VW1. Relay ON returns a "Sender free" signal to the Register. Relays A and HTS operate, the latter connecting HT to leads HT2 and HT3. Relay B is concerned with the transmission of a signal back to the Register and in the removal of reset potential from certain of the other circuits. Tube 3VP1 is concerned with the timing of the return of the "OK" signal from the receiver, indicating that correct reception has take nplace. Tube 3VP1 is controlled from the Level and Contact Counters at a particular stage in the second scanning operation. Tube 3VW2 strikes as a result of the reception of an OK signal from the receiver and serves to transmit an OK signal to the Register. Relay FR which is controlled from the Register is concerned with the forced release of the Sender.

Figure 4:
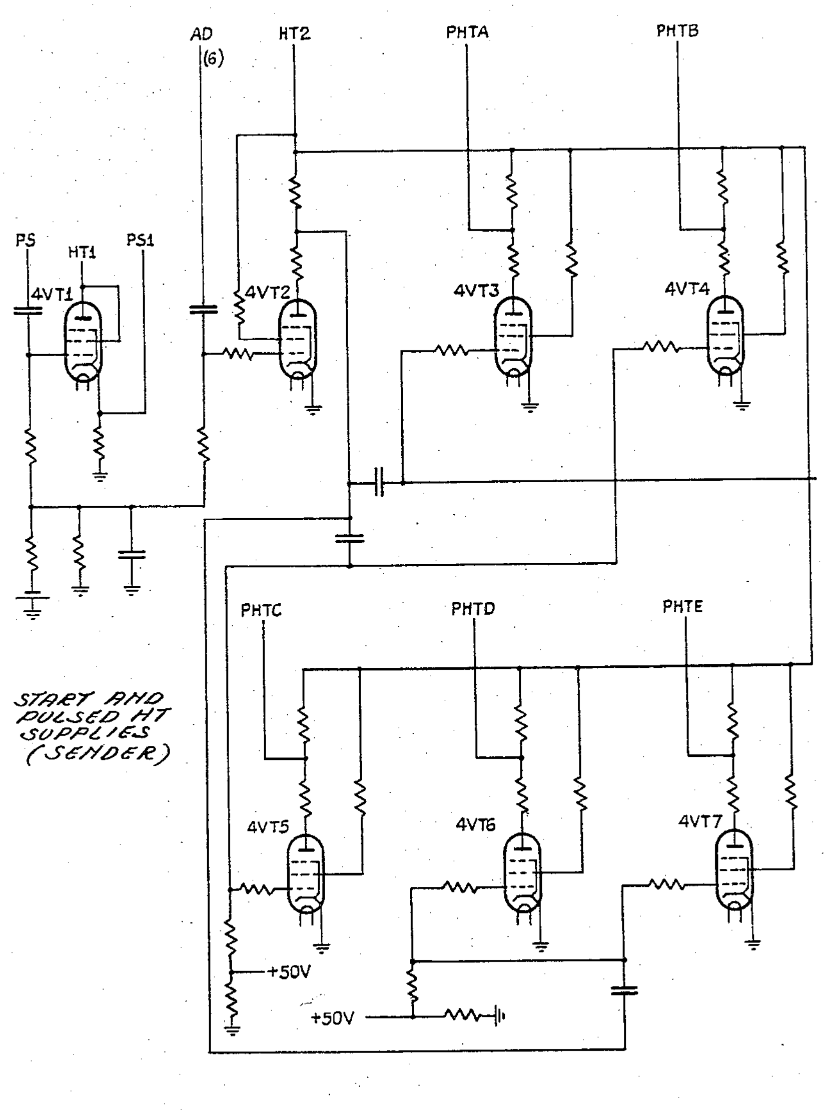
Figure 4A:
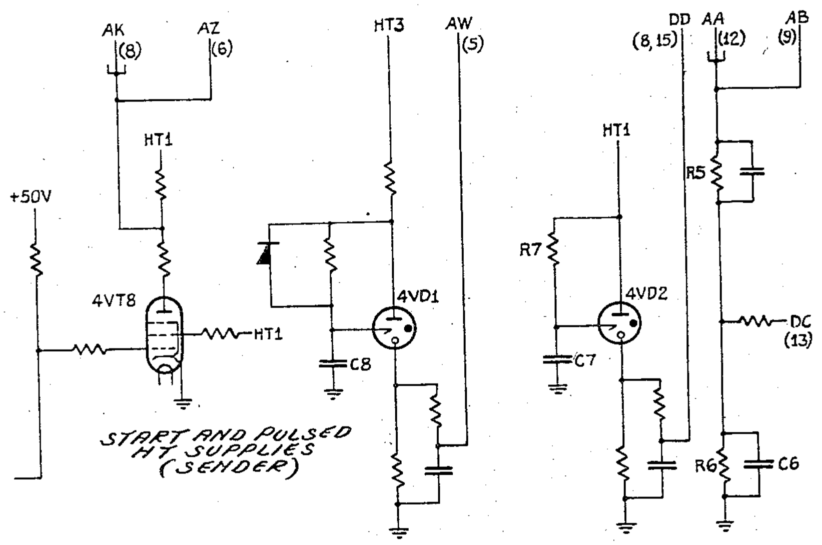
Figure 17:
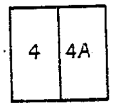
Figure 18:
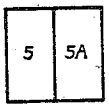
Figure 19:
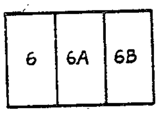

The Start and Pulsed HT supply circuit is shown in Figs. 4 and 4A and comprises the thermionic tubes 4VT1 to 4VT8 and the cold cathode gas discharge tubes 4VD1 and 4VD2. Tube 4VD2 strikes when the high tension supply is connected up and provides a start pulse to the Fault and Resend circuit and the Contact Counter. Tube 4VD1 strikes when the Sender is taken into use by a Register and provides a start pulse for the Sequence Control circuit. The high tension supply to tubes 4VT2 to 4VT7 is connected up when the Sender is taken into use and the tubes are pulse-operated from lead PS to provide the pulsed HT supplies. Tube 4VT8 is also pulse-operated and drives the Contact Counter.

Figure 5:
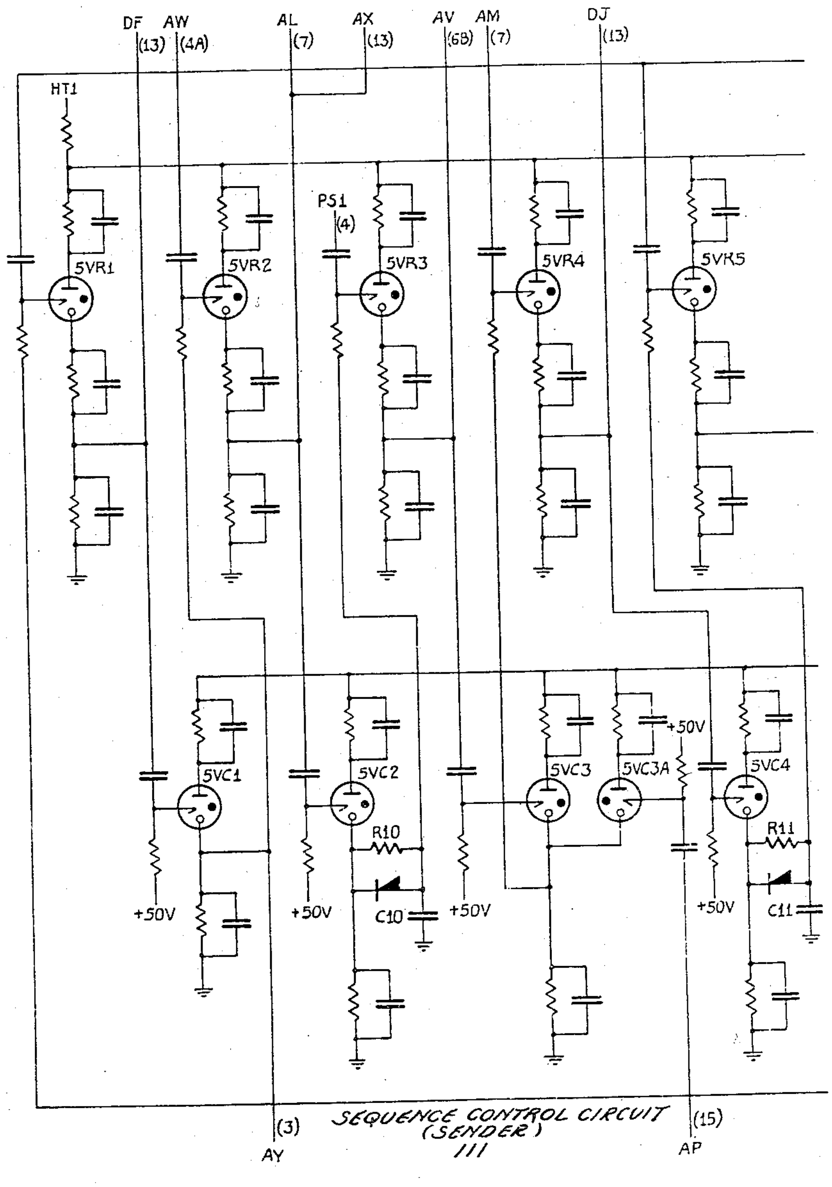
Figure 5A:
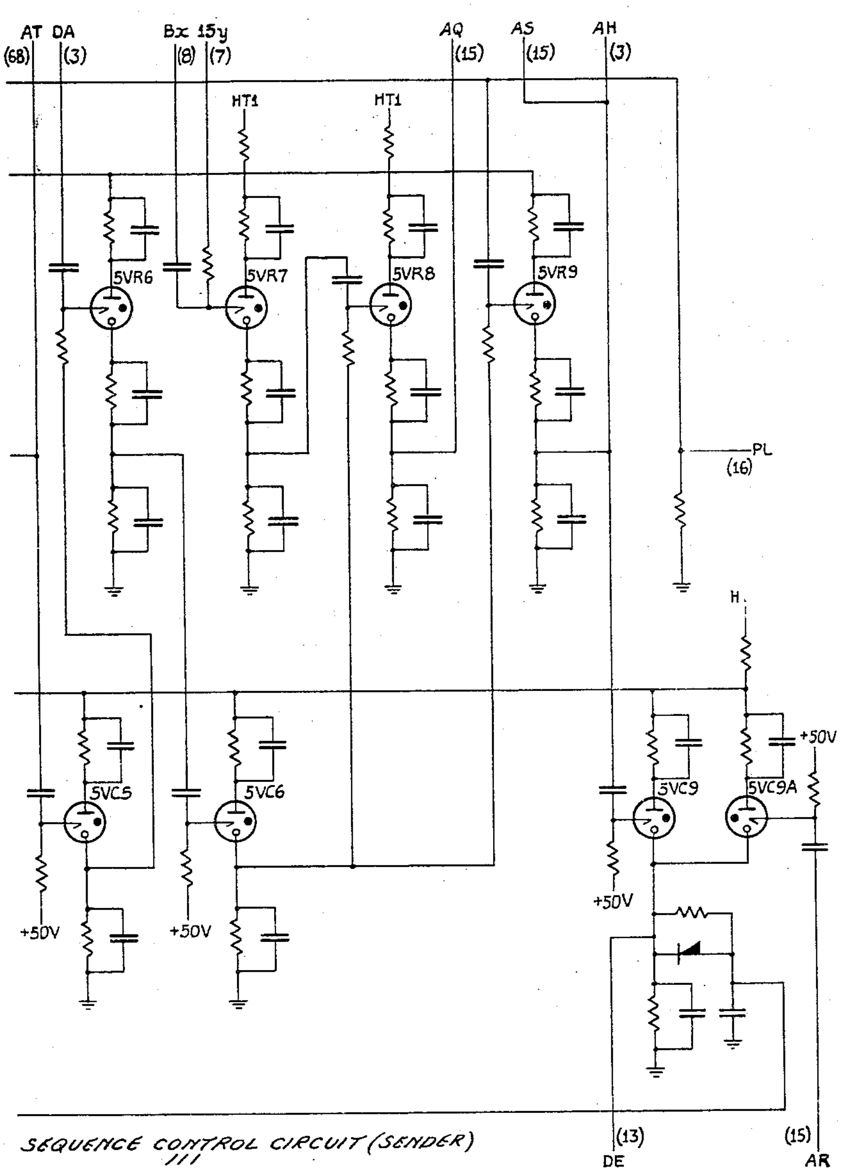

The Sequence Control circuit is shown in Figs. 5 and 5A and comprises the pulse repeating tubes 5VR1 to 5VR9 and the counting tubes 5VC1 to 5VC6 which correspond to repeating tubes 5VR1 to 5VR6 and counting tube 5VC9 which corresponds to repeating tube 5VR9. In addition counting tubes 5VC3 and 5VC9 are each provided with an auxiliary tube 5VC3A and 5VC9A respectively in parallel therewith. Counting tube 5VC9A is struck when the HT is initially connected and biases the "Off" position repeater tube 5VR1. The pulse repeater tubes 5VR1, 5VR5 and 5VR9 are caused to strike at the appropriate times by pulses applied to lead PL while the remaining repeater tubes have individual striking circuits. The "off" position repeating tube 5VR1 strikes followed by counting tube 5VC1 on the first pulse over lead PL after an idle indicating signal has been received from the Sender. Repeater tube 5VR2 is struck followed by tube 5VC2 when the Sender has been taken into use by a Register. The rise of potential at the cathode of 5VC2 is delayed and hence the application of priming potential to tube 5VR3 is delayed. This latter tube is struck by a pulse from a 400 I. P. S. source connected to lead PS1 and is followed by the striking of tube 5VC3 which initiates the first scanning operation. Tube 5VR4 is struck when this operation is completed and strikes tube 5VC4. Tube 5VR5 strikes if the junction is free and is followed by the striking of tube 5VC5 which initiates the second scanning operation i. e. the transmission of the information from the Sender to the Receiver. Tube 5VR6 is struck when the transmitting operation has been completed and is followed by tube 5VC6. Tube 5VC6 primes tubes 5VR8 and 5VR9 which together with tube 5VR7 are concerned with the reception of the OK signal from the Receiver. Tube 5VR7 is arranged to strike a predetermined interval after the end of transmission if no OK signal is received. Tube 5VR9 strikes on the receipt of an OK signal within said predetermined interval and prevents the striking of tube 5VR7. Tube 5VR7 striking strikes tube 5VR8 to cause retransmission to be initiated. Tube 5VR9 striking strikes tube 5VC9 and causes an OK signal to be transmitted to the Register.

Figure 6:
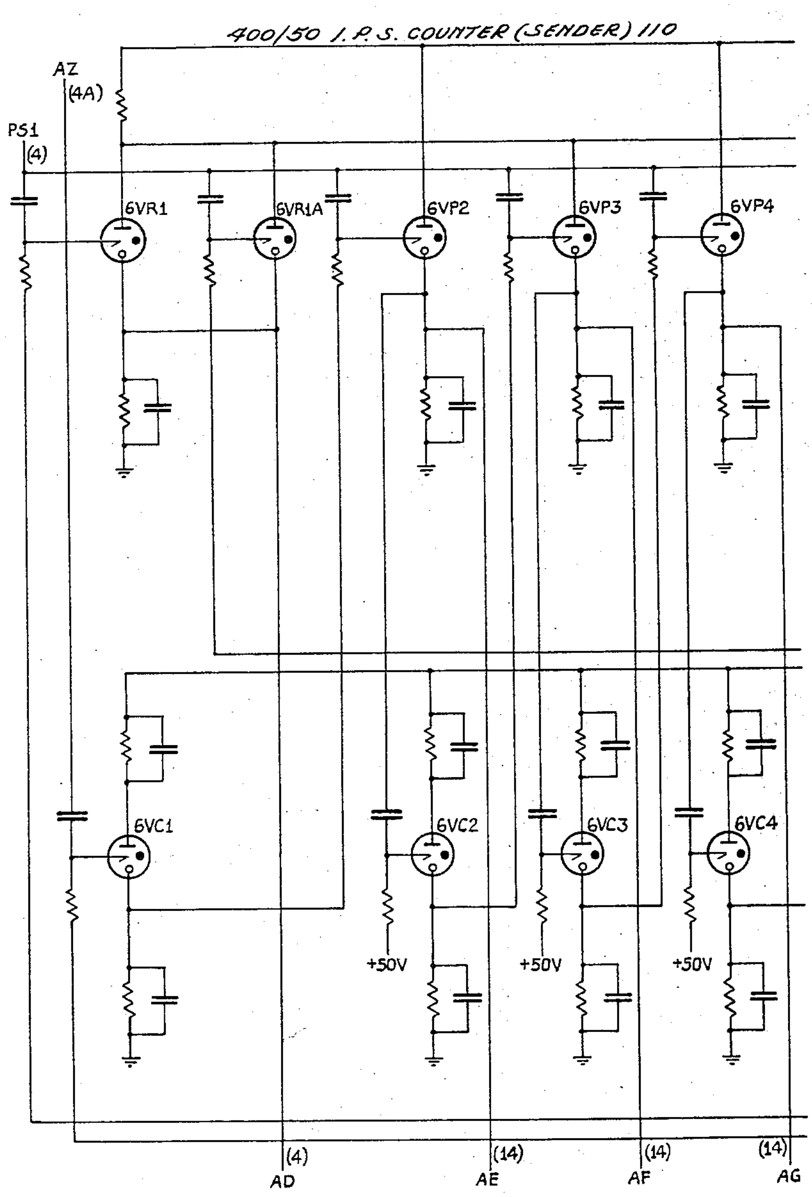
Figure 6A:
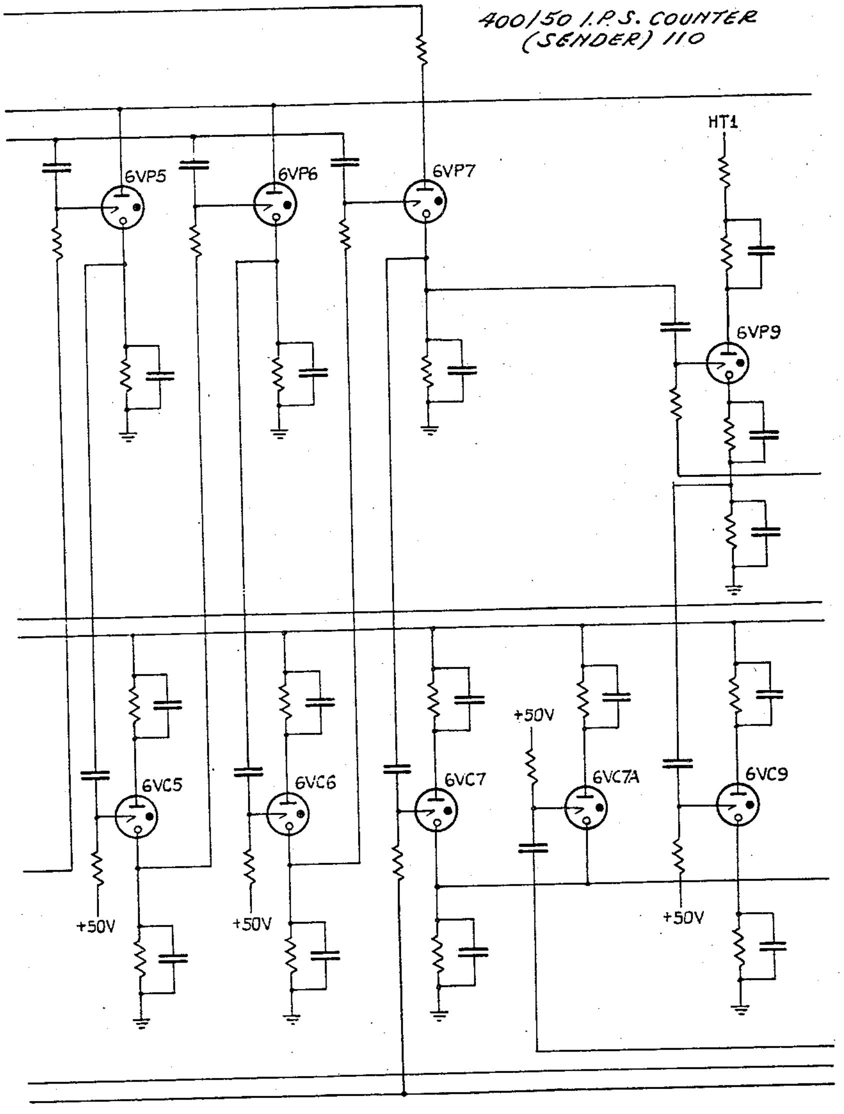
Figure 6B:
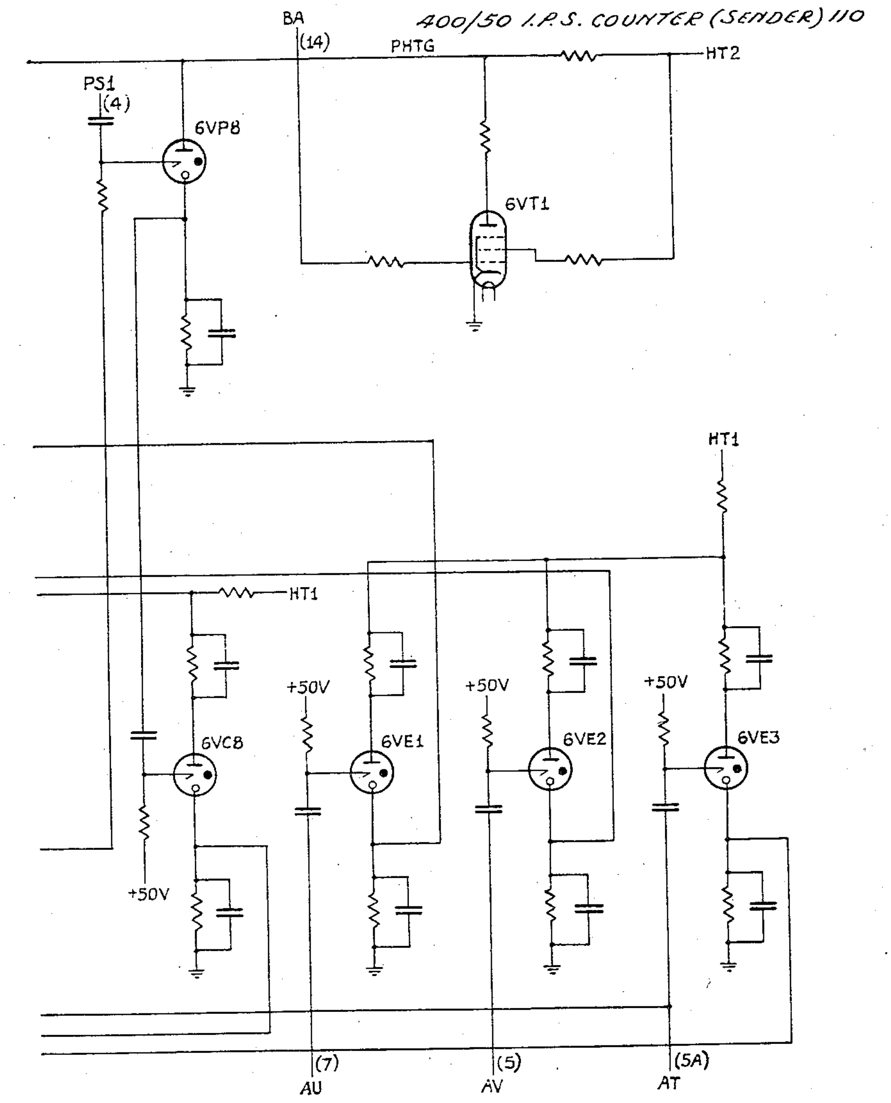

The 400/50 I. P. S. Counter is shown in Figs. 6, 6A and 6B and comprises nine stages each comprising a repeating tube (6VR1 and 6VP2 to 6VP9) and a counting tube (6VC1 to 6VC9). It also includes the thermionic tube 6VT1 which provides a 400 P. P. S. pulse HT supply to the repeater tubes 6VR1 and 6VP2 to 6VP8, and the gas discharge tubes 6VE1 to 6VE3 which are used for converting the Counter from 400 I. P. S. operation to 50 I. P. S. operation. Tube 6VE2 is first struck and applies a priming potential to tube 6VR1A which is connected in parallel with tube 6VR1. A pulse source of 400 I. P. S. is connected to lead PS1 and tube 6VR1A fires to the next pulse and is extinguished due to the pulsed HT supply on lead PHTG, when it has delivered a pulse from its cathode. Tube 6VR1A thus provides pulses at 400 I. P. S. from its cathode as long as it is primed from tube 6VE2. These pulses drive the Contact and Level Counters for the first scanning operation. At the end of the first scanning operation, tube 6VE1 strikes, extinguishing tube 6VE2 whereby the priming potential is removed from tube 6VR1A and hence the train of pulses over lead AD are cut off. When the second scanning operation is to be started, tubes 6VC7A and 6VE3 are struck. Tube 6VE1 is thus extinguished and tube 6VC1 is primed. Tube 6VC7A striking primes tube 6VP8. Tube 6VP8 strikes to the next pulse from the 400 I. P. S. supply connected to lead PS1. The striking of tube 6VP8 is followed by the striking of tube 6VC8 which primes tube 6VR1. The eight stages of the counter are now operated successively by the 400 I. P. S. source connected to lead PS1 and since the stages are connected in a ring, pulses at 50 I. P. S. will be delivered over lead AD.

Figure 7:
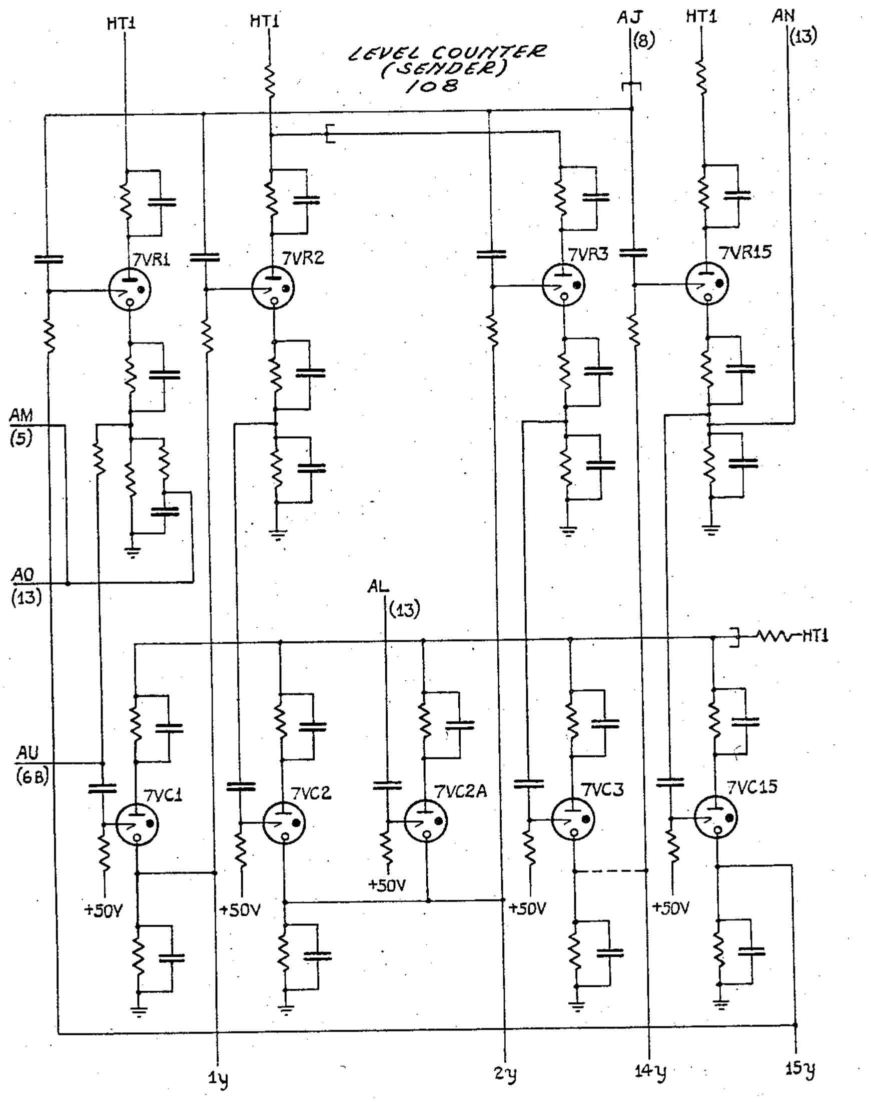

The Level Counter is shown in Fig. 7 and comprises 15 stages of which only stages 1, 2, 3 and 15 are shown. Each stage is provided with a repeating tube such as 7VR1 and a counting tube such as 7VC1. In addition an auxiliary counting tube 7VC2A is provided in parallel with tube 7VC2. When the Sender is taken into use by a Register, tube 7VC2A strikes and the operation of the Counter is controlled by the application of pulses to all the repeating tubes, a pulse being obtained each time the Contact Counter reaches position 10. The first pulse so applied causes tube 7VR3 to strike followed by tube 7VC3 whereupon tube 7VC2 is extinguished. The stages are operated successively in this way so that potentials are applied successively to leads 2*y* to 15*y*. The first scanning operation takes place while the Level Counter moves through stages 2 to 14 in conjunction with the Contact Counter. On the pulse delivered from position 10 of the Contact Counter on level 14, tube 7VR15 fires and the pulse from its cathode over lead AN indicates the end of the first scanning operation. Tube 7VC15 also strikes and primes tube 7VR1. The latter tube is fired from position 10 of the Contact Counter on level 15 and is followed by tube 7VC1. The second scanning operation now takes place and is completed at the end of the level 14 scan. The level 15 scan is employed for control purposes as described in detail subsequently and the pulse from the tenth position of the Contact Counter in the level 15 scan again fires tube 7VR1 which is followed by the striking of tube 7VC1. Under normal conditions of operation the circuit remains in this condition until the next transmission is to take place.

Figure 8:
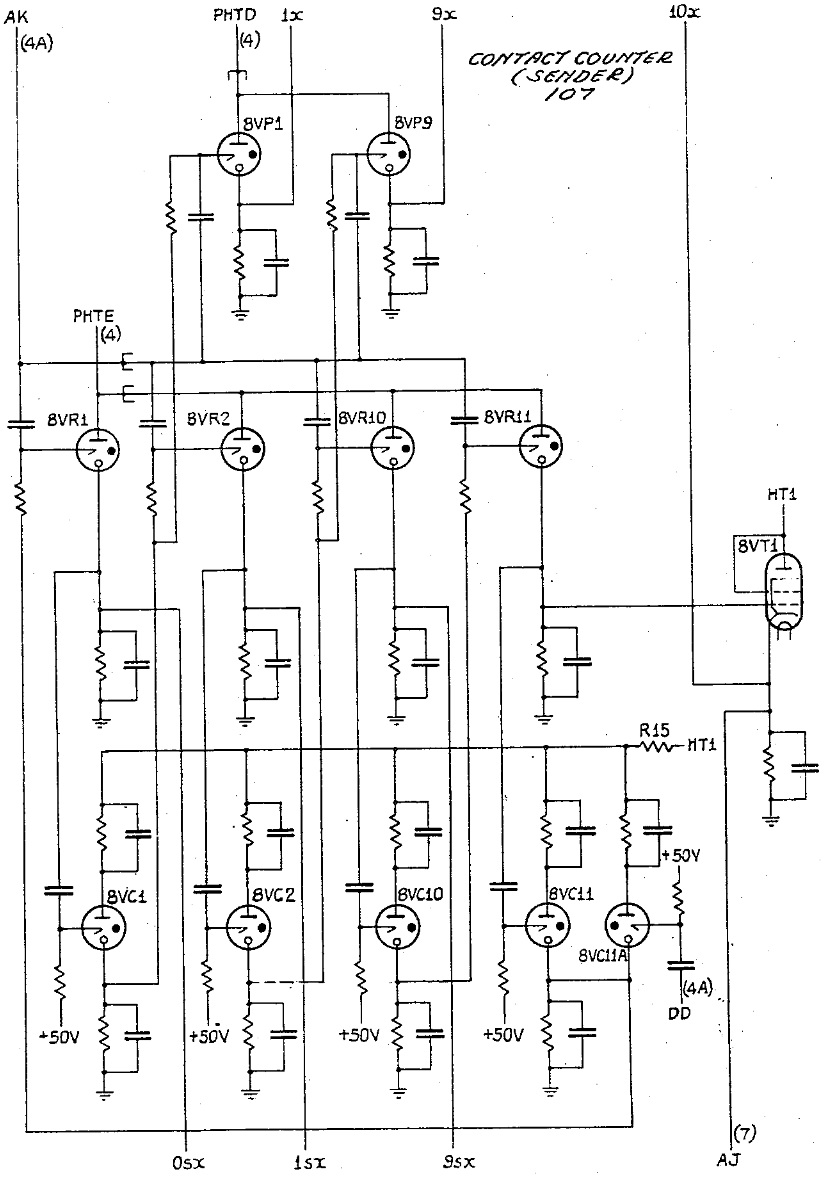

The Contact Counter is shown in Fig. 8 and comprises 11 stages of which stages 1, 2, 10 and 11 only are shown. Each stage includes a pulse repeating tube such as 8VR1 and a pulse counting tube such as 8VC1. In addition stages 1 to 9 each have an additional counting tube of which the first, 8VP1 and the ninth, 8VP9 only are shown. Scanning pulses are delivered over leads 1*x* and 9*x* connected to the cathodes of tubes 8VF1 to 8VF9 while the tenth lead 10*x* is connected to the cathode of the thermionic tube 8VT1 which also provides the drive pulses over lead AJ for the Level Counter. Tube 8VC11A is connected in parallel with tube 8VC11 and is struck when the HT supply is initially connected. Tube 8VC11 striking primes tube 8VR1 and the Counter is ready to receive drive pulses over lead AK to effect the scanning operations. The drive pulses are received at 400 I. P. S. for the first scanning operation and at 50 I. P. S. for the second scanning operation, the stages operating successively in each case.

Figure 9:
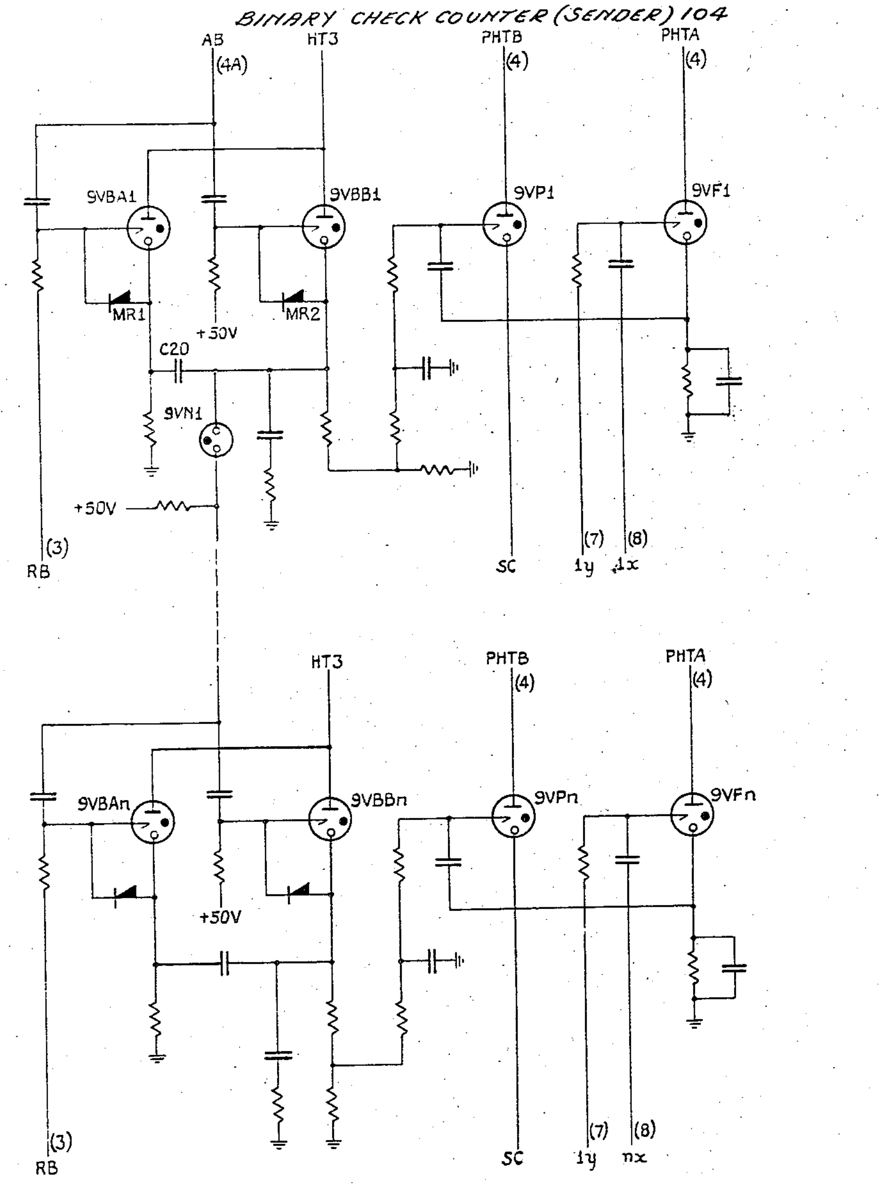

The Binary Check Counter is shown in Fig. 9 and has as many stages as there are storage elements the stages being arranged in cascade. Only the first and the last stages are shown and each consists of a pair of tubes such as 9VBA1 and 9BB1 arranged as a binary circuit. In addition each stage includes a "Send" tube such as 9VP1 and a scanning tube 9VF1. The "off" condition of the binary pairs is for the left-hand tube to be conducting e. g. 9VBA1, and on the transfer of information from the Register to the Sender, the "ones" are counted by the circuit. At the end of the transfer operation, some of the binary pairs will be in the "off" condition and some in the "on" condition as determined by the number of "ones" in the transferred information. A binary pair in the "on" condition e. g. tube 9VBB1 conducting, applies a priming potential to the corresponding "Send" tube e. g. 9VP1 and when during the second scanning operation the scan tube e. g. 9VF1 strikes, the primed "Send" tube strikes and exerts a control on the Sender to cause the appropriate signal i. e. a "space" signal, to be transmitted over the junction.

Figure 10:
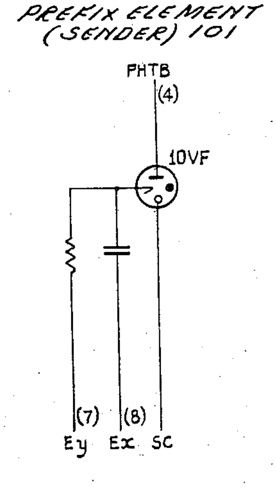

One element of the Prefix circuit is shown in Fig. 10 but it will be understood that more than one may be required. The Prefix signal is transmitted before any other information and is the same for all transmissions. In the system described, the Prefix signal comprises four signal elements and the number of Prefix elements provided depends on the form of the signal. In the particular embodiment a signal is transmitted in the first, second and fourth elements so that three tubes such as 10VF wil be provided and will be fired at the appropriate times during the second scanning operation by the application of pulse and bias voltages over leads E*x* and E*y*. The positive cathode voltage of a conducting tube is applied over lead SC to the Sender circuit to control the transmission of a signal in the appropriate signal element.

Figure 11:
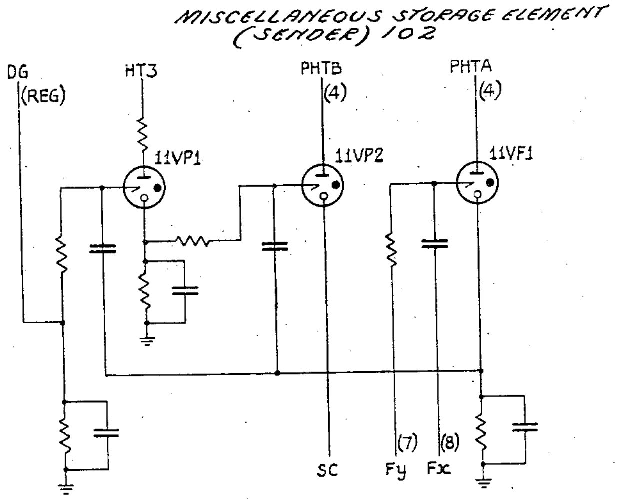

One element of the Miscellaneous Storage circuit is shown in Fig. 11 and it consists of the three gas discharge tubes 11VP1, 11VP2 and 11VF1. It will be understood that there will be a number of such elements provided depending on the code used and the storage capacity required. One display lead DG extends from the Register to each one of the Miscellaneous storage elements and as previously a potential may or may not be applied to the display lead. Assuming that a potential is applied to lead DG, tube 11VP1 will be primed and when tube 11VF1 is struck during the first scanning operation by the application of pulse and bias potentials to leads F*x* and F*y*, a pulse potential will be applied to tube 11VP1 which strikes. Tube 11VP1 in striking primes tube 11VP2. Tube 11VF1 is extinguished due to the pulsed HT supply over lead PHTA, when it has delivered a pulse to tube 11VP1. Tube 11VF1 is again struck on the second scanning operation and causes tube 11VP2 to strike since it is now primed. The positive potential at the cathode of tube 11VP2 is applied over lead SC to the Sender circuit to cause the transmission of the appropriate signal. If there is no potential applied to the display lead, the striking of tube 11VF1 in both the first and the second scanning operations will be ineffective since tube 11VP1 will not be primed during the first operation and tube 11VP2 will not be primed during the second operation. No potential is therefore applied to the Sender circuit over lead SC.

Figure 12:
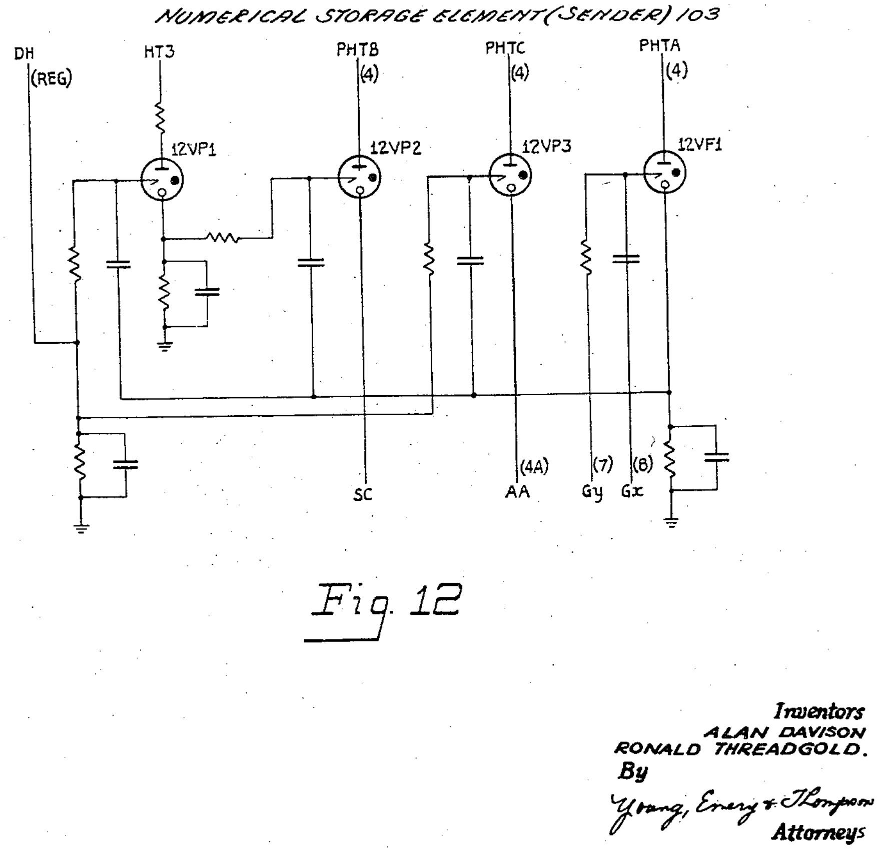

One element of the Numerical Storage circuit is shown in Fig. 12 and, as with the Miscellaneous Storage element, a number of these will be provided, again depending on the code used and the required storage capacity. The Numerical Storage element is similar to the Miscellaneous Storage element shown in Fig. 11 and in fact consists of the same circuit with the addition of tube 12VP3, tubes 12VP1, 12VP2, 12VF1 corresponding respectively to tubes 11VP1, 11VP2, 11VF1 of the Miscellaneous Storage circuit. It will be seen that tube 12VP3 in the Numerical Storage element strikes if tube 12VP1 strikes, that is to say, tubes 12VP3 strikes if a signal is present on the transfer lead DH extending from the Register. The positive potential obtained from the cathode of tube 12VP3 is applied over lead AA to the Binary Check Count circuit and serves to add "1" to this counting circuit in the manner previously explained.

Figure 13:
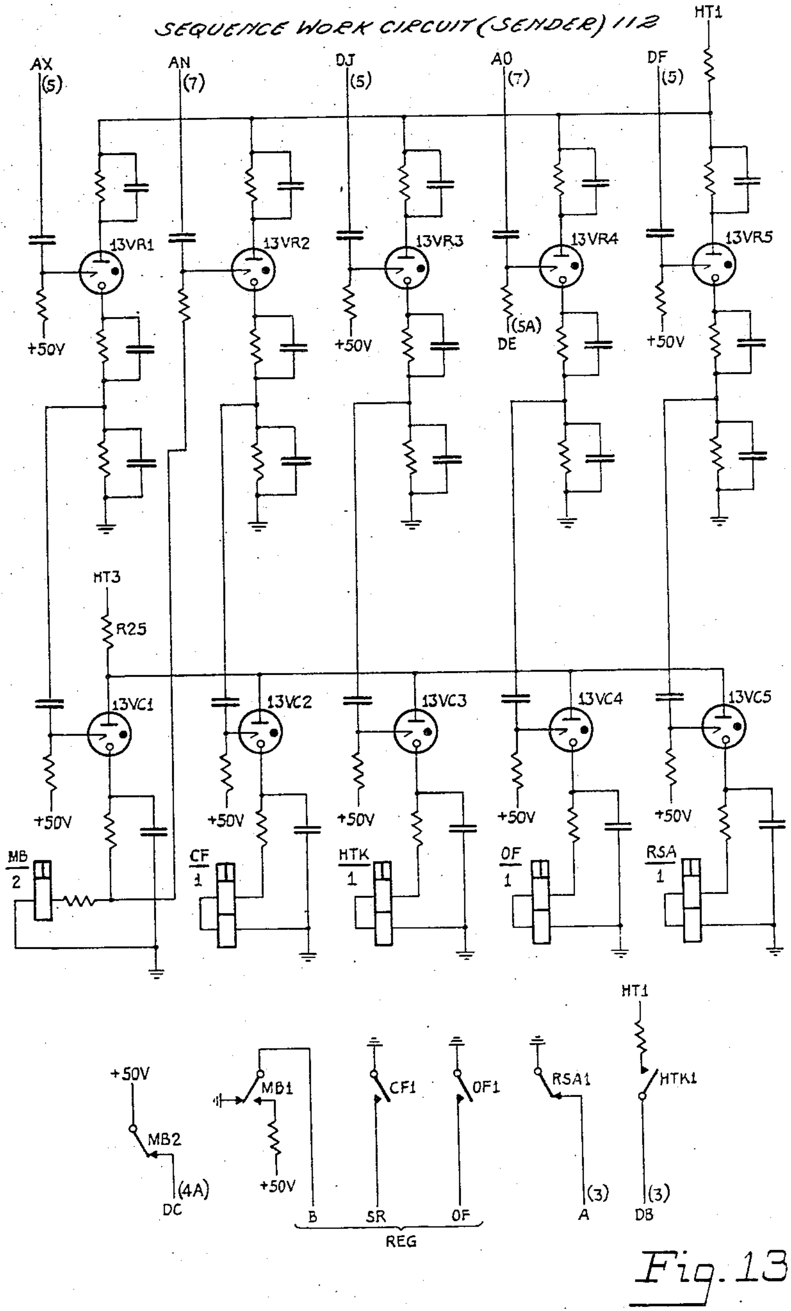

The Sequence Work circuit is shown in Fig. 13 and consists of five stages each including a pulse repeating tube (13VR1 to 13VR5) and an associated counting tube (13VC1 to 13VC5). The stages of the Sequence Work circuit are rendered effective by pulses applied to the individual input leads AX, AN, DJ, AO and DF. The first stage is rendered effective when the sender is ready to receive a display from the Register. The operation of this stage is effective in operating relay MB which at contacts MB1 extends a signal to the register calling for the display. At contacts MB2 relay MB prepares the Sender for numerical storage. The second stage of the Sequence Work circuit is rendered effective when storage is completed in the sender. Relay CF is operated when the counting tube 13VC2 strikes and at contacts CF1 extends earth from lead SR to the register to indicate that storage has been effected. Stage 3 of the Sequence Work circuit is effective, due to the operation of relay HTK, in preparing the Supervisory circuit for the reception of the "OK" signal. Stage 4 of the Sequence Work circuit is rendered effective if no "OK" signal is returned from the receiver. Relay OF operates and at contacts OF1 extends earth to the Register. Finally stage 5 of the Sequence Work circuit is rendered effective when transmission has been completed and the operation of relay RSA associated with this stage initiates the release of the sender.

Figure 14:
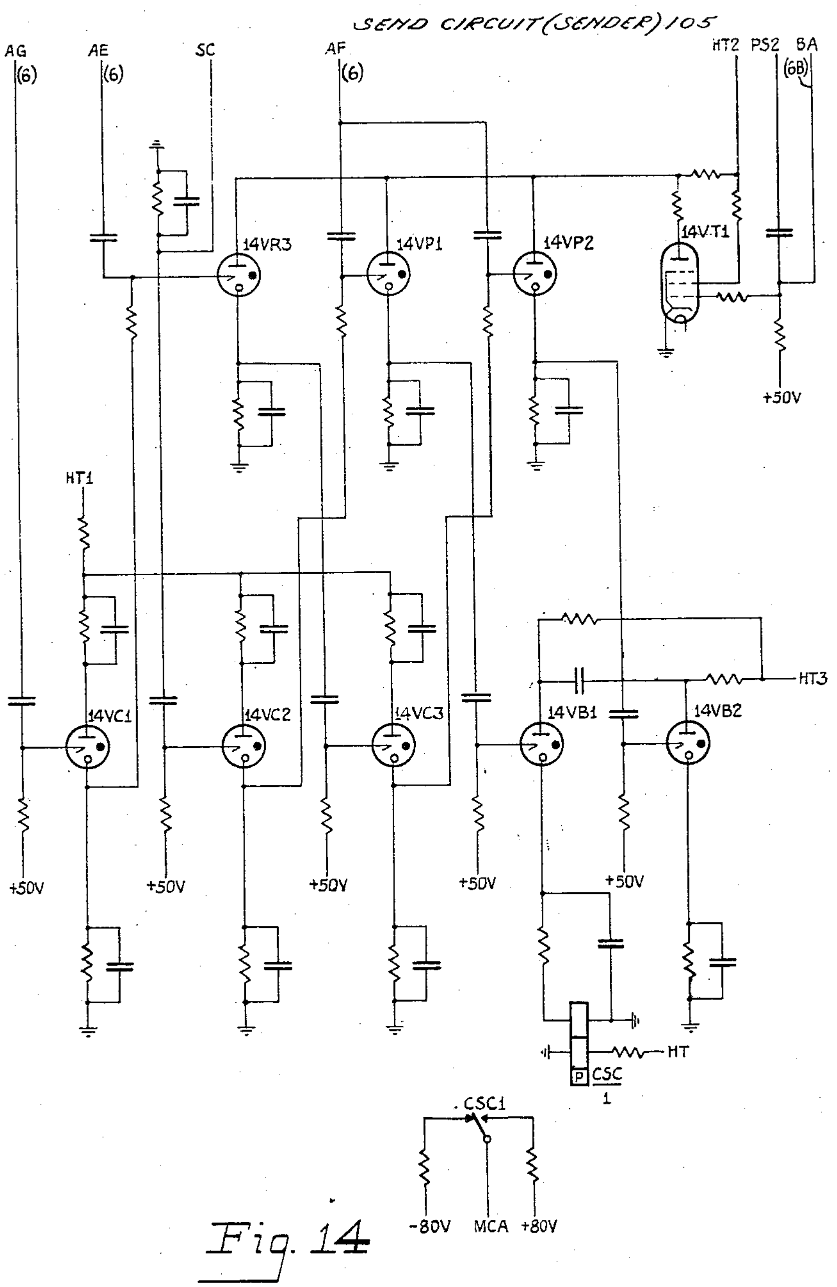

The Send circuit is shown in Fig. 14 and consists of the pulse repeating tubes 14VR3, 14VP1 and 14VP2 and their associated counting tubes 14VC1, 14VC2 and 14VC3 respectively. In addition the circuit includes a thermionic tube 14VT1 which provides a pulsed H. T. supply for the repeating tubes, tubes 14VB1 and 14VB2 which are connected as a binary pair and the telegraph relay CSC which has one winding in the cathode circuit of tube 14VB1 of the binary pair. The telegraph relay controls at its contacts CSC1 the application of positive or negative 80 v. to the MCA leg of the junction line. These contacts are normally in the position shown in the drawing so that −80 v. is applied to the MCA leg and this is referred to as the "mark" condition. The Send circuit is controlled from the 400/50 I. P. S. counter during the time that the counter is delivering 50 impulses per second. Between consecutive pulses delivered by the 400/50 I. P. S. counter, each stage of the counter becomes effective in turn and when the first stage becomes effective a potential will be applied to lead SC from a storage element if this storage element carries a "one." This causes tube 14VC2 to strike thereby priming tube 14VP1. When the second stage of the 400/50 I. P. S. counter becomes effective a pulse is applied to lead AE but is without effect at this time. The third stage in becoming effective applies a pulse to tubes 14VP1 and 14VP2 but since tube 14VC2 is conducting, tube 14VP1 only will fire. The striking of tube 14VP1 is followed by the striking of tube 14VB1 whereupon the upper winding of the telegraph relay CSC is energised and the relay contacts are changed over to connect +80 v. to the MCA leg. With the 400/50 I. P. S. counter in the fourth position a pulse is applied to lead AG to cause tube 14VC1 to strike thereby extinguishing tube 14VC3 and priming tube 14VR3. No further operation takes place until the first stage of the counter is effective in the next cycle.

If the storage element now scanned also carries a "one" tube 14VC2 will again strike, prime tube 14VP1 and extinguish tube 14VC1. The "space" condition is accordingly maintained on the MCA leg. If, however the storage element does not carry a "one," no potential will be applied over lead SC and tube 14VC1 remains conducting. Consequently when a pulse is applied over lead AE from the second stage of the 400/50 I. P. S. Counter, tube 14VR3 will strike followed by tube 14VC3. Tube 14VC1 is thus extinguished and tube 14VP2 is primed. Hence when a pulse is applied over lead AF from the third stage of the 400/50 I. P. S. Counter, tube 14VP2 strikes and causes tube 14VB2 to strike, thereby extinguishing tube 14VB1 whereupon the upper winding of the telegraph relay CSC is deenergised and the contacts CSC1 are changed over to apply −80 v. to the MCA leg. When the fourth stage of the counter is effective tube 14VC1 again strikes, thereby extinguishing tube 14VC3 and priming tube 14VR3. The circuit operates in this way as long as the 400/50 I. P. S. Counter continues to operate.

Figure 15:
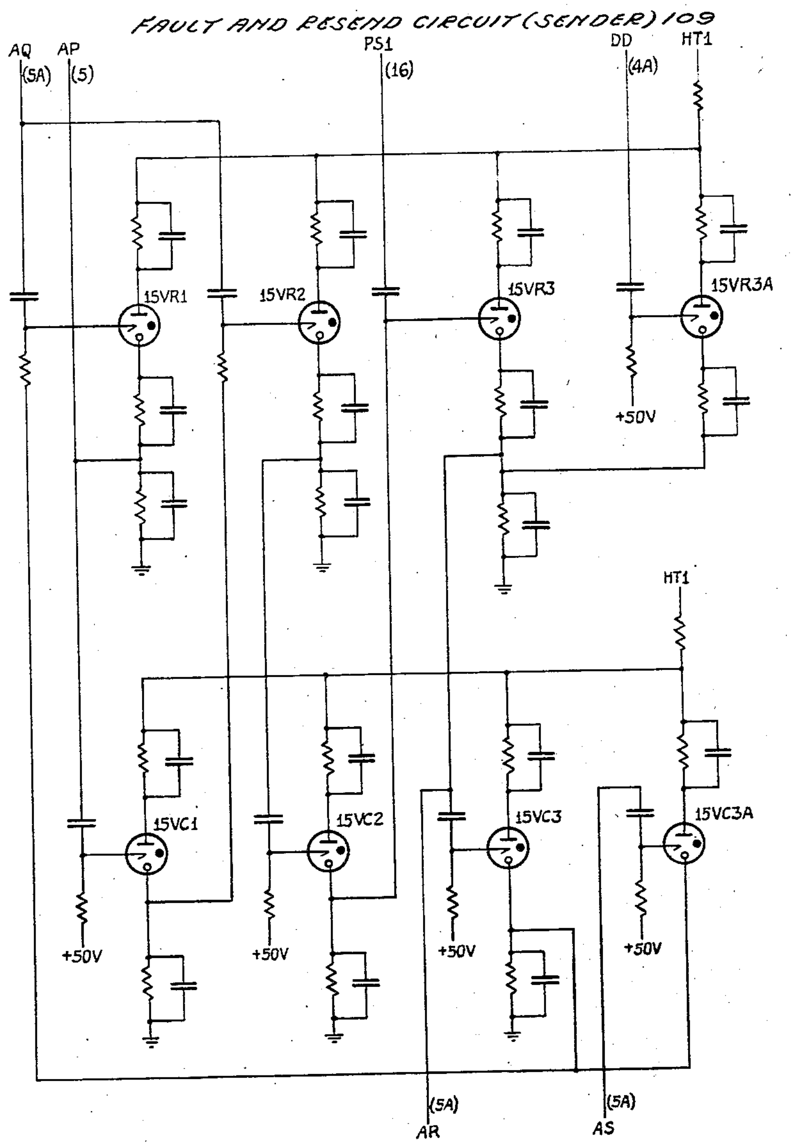

The Fault and Resend circuit is shown in Fig. 15 and consists of three stages each having a pulse repeating tube (15VR1–15VR3) and an associated pulse counting tube (15VC1–15VC3). In addition an auxiliary pulse repeating tube 15VR3A is connected in parallel with tube 15VR3 and an auxiliary pulse counting tube 15VC3A is connected in parallel with tube 15VC3. Tube 15VR3A strikes when the H. T. supply is connected to the sender and is followed by the striking of tube 15VC3. Tube 15VC3 serves to prime tube 15VR1 and the circuit remains in this condition as long as satisfactory transmission takes place. If, however, retransmission is required due to the fact that no "OK" signal has been returned from the Receiver, a pulse is applied to lead AQ which serves to strike tube 15VR1 and this is followed by the striking of tube 15VC1. Tube 15VR1 in striking applies a pulse to lead AP extending to the Sequence Control circuit indicating that retransmission is required. The striking of tube 15VC1 primes tube 15VR2 and if no "OK" signal is returned after the second transmission a pulse on lead AQ strikes tube 15VR2. The striking of tube 15VR2 brings about the striking of tube 15VC2 which primes tube 15VR3. This latter tube is fired by the next pulse from the pulse source connected to lead PS1 and in firing causes tube 15VC3 to fire. The circuit is now back in its original condition. It is to be noted that if the "OK" signal is returned after the second transmission, tube 15VR2 will not be fired and in order to return the circuit to its initial condition with tube 15VR1 primed, a pulse is applied to lead AS in order to strike tube 15VC3A.

Figure 20:
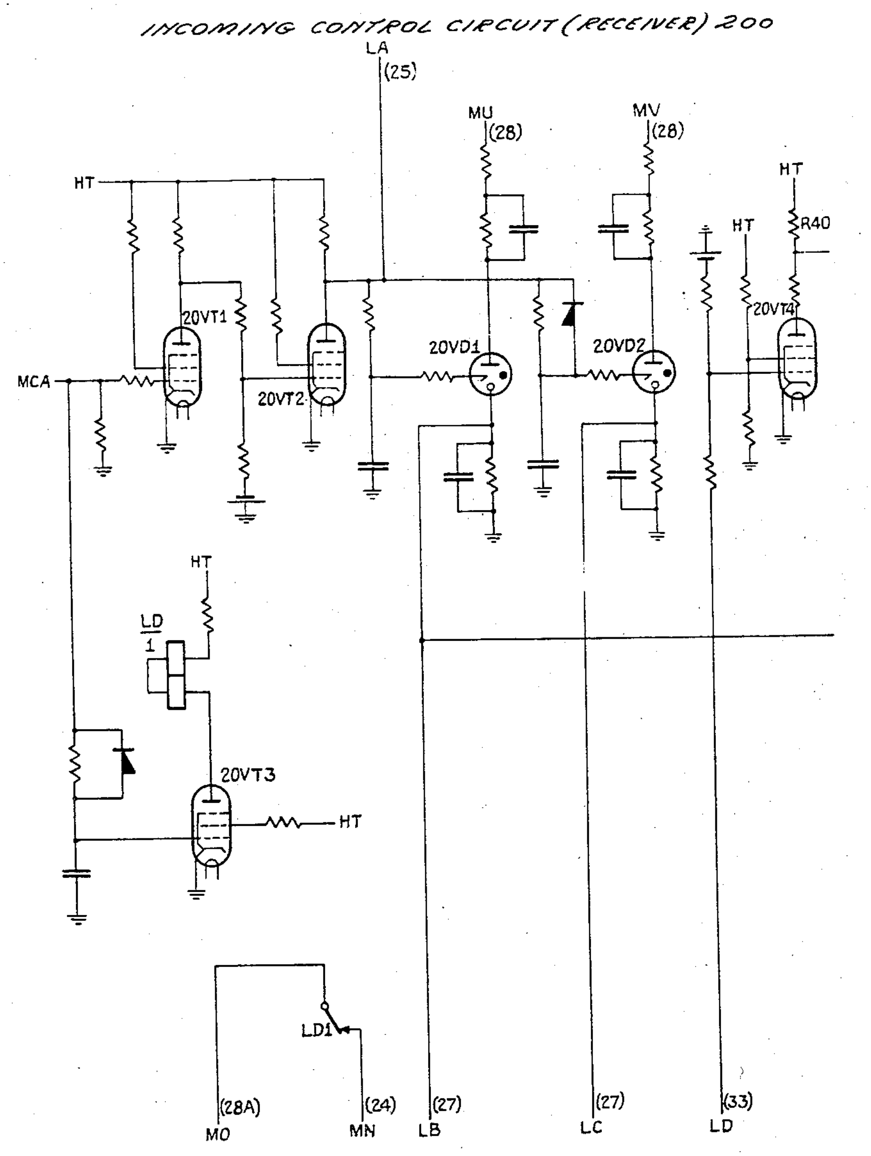
Figure 20A:
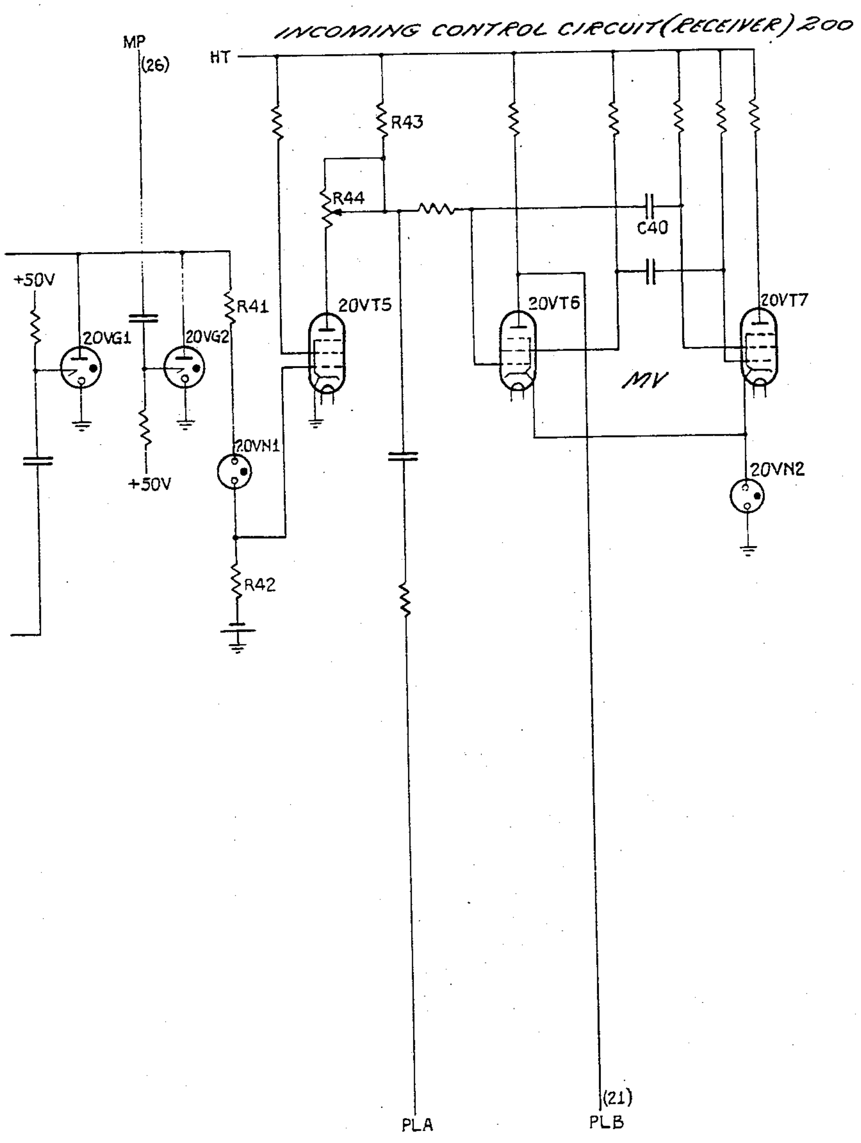
Figure 21:
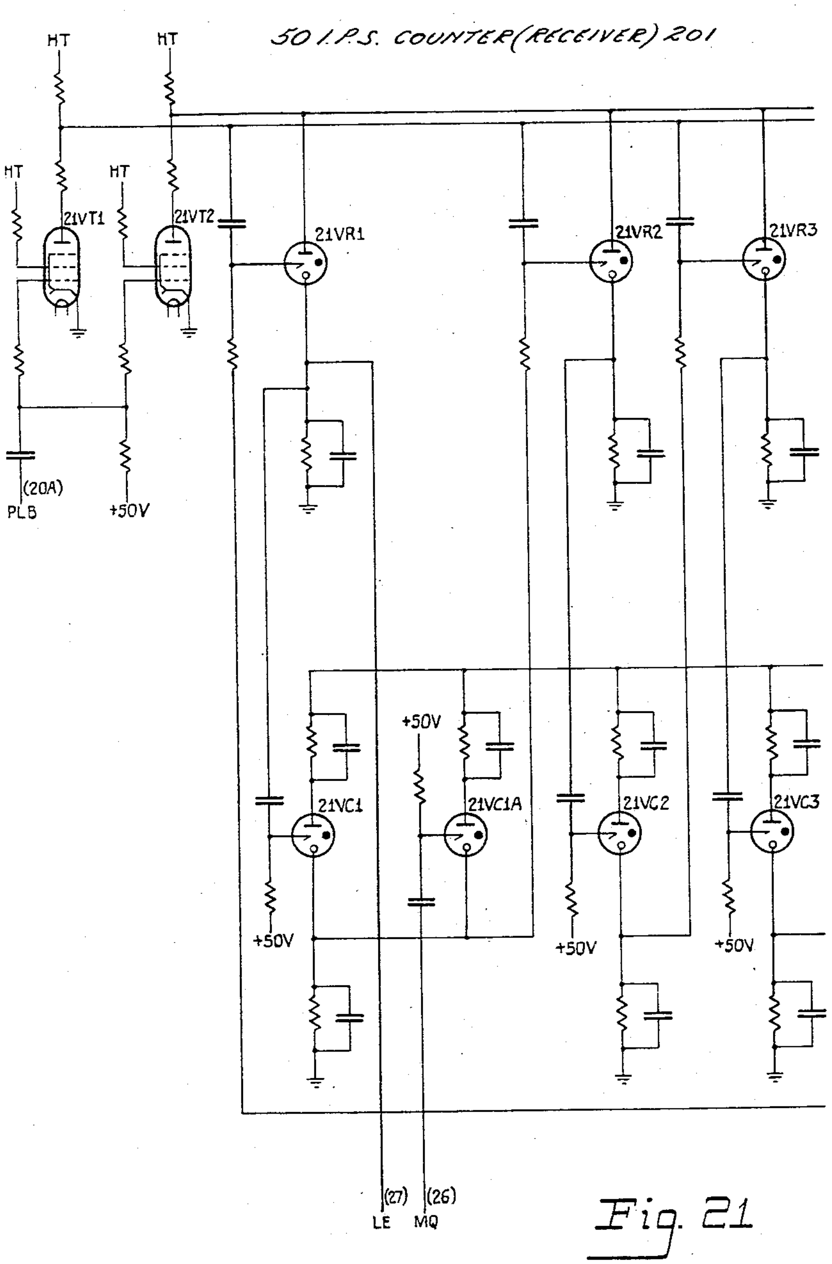

Reference will now be made to the individual circuits which make up the Receiver and a description will first be given to the Incoming Control circuit shown in Figures 20 and 20A. This circuit comprises the thermionic tubes 20VT1 to 20VT7, gas discharge tubes 20VD1, 20VD2, 20VG1, 20VG2, and the diodes 20VN1 and 20VN2. This circuit includes the drive means for the receiver and comprises the cathode-coupled multivibrator formed by the tubes 20VT6 and 20VT7 together with the diode 20VN2, the multivibrator being synchronised over lead PLA by the output of a crystal-controlled oscillator having a frequency of 2 kc./s. The output from the multivibrator is taken from the anode of 20VT6 over a lead PLB to the 50 I. P. S. Counter (Fig. 21). Control of the operation of the multivibrator is effected by tubes 20VT4, 20VT5, 20VG1, 20VG2 and 20VN1. The diode 20VN1 conducting when all the tubes 20VT4, 20VG1 and 20VG2 are non-conducting and when conducting tube 20VN1 causes tube 20VT5 to conduct thereby preventing the operation of the multivibrator. Tube 20VN1 is extinguished when any one of the tubes 20VT4, 20VG1 and 20VG2 are conducting and tube 20VT5 is then cut off and the multivibrator operates. Either of tubes 20VG1 and 20VG2 are extinguished by momentarily causing tube 20VT4 to conduct. Tubes 20VG1, 20VG2 and 20VT4 are caused to conduct by suitable control potentials applied thereto at appropriate times in the operation of the circuit.

The MCA leg of the junction is connected to the control grid of tube 20VT1 and as previously explained a potential of −80 v. is normally applied to the MCA leg so that tube 20VT1 is normally non-conducting and tube 20VT2 is normally conducting thus preventing either of the tubes 20VD1 and 20VD2 from conducting. When a space signal is received over the MCA leg, that is to say, when the potential changes from −80 v. to +80 v., tube 20VT1 conducts and tube 20VT2 is cut off. This causes both tubes 20VD1 and 20VD2 to conduct and, after a delay, to supply potential over leads LB and LC to the Sequence Counter circuit. In addition a positive pulse at the anode of tubes 20VT2 when this ceases to conduct, is applied over lead LA to a gating circuit, the purpose of which will be described subsequently. Tube 20VT3 and lead LD are provided to take care of the case where an interfering signal simulating a long space condition is received. The control grid circuit of tube 20VT3 includes a delay network and only when a long space condition occurs does tube 20VT3 conduct to operate relay LD which releases the busy relay RC in the Supervisory circuit.

Figure 21A:
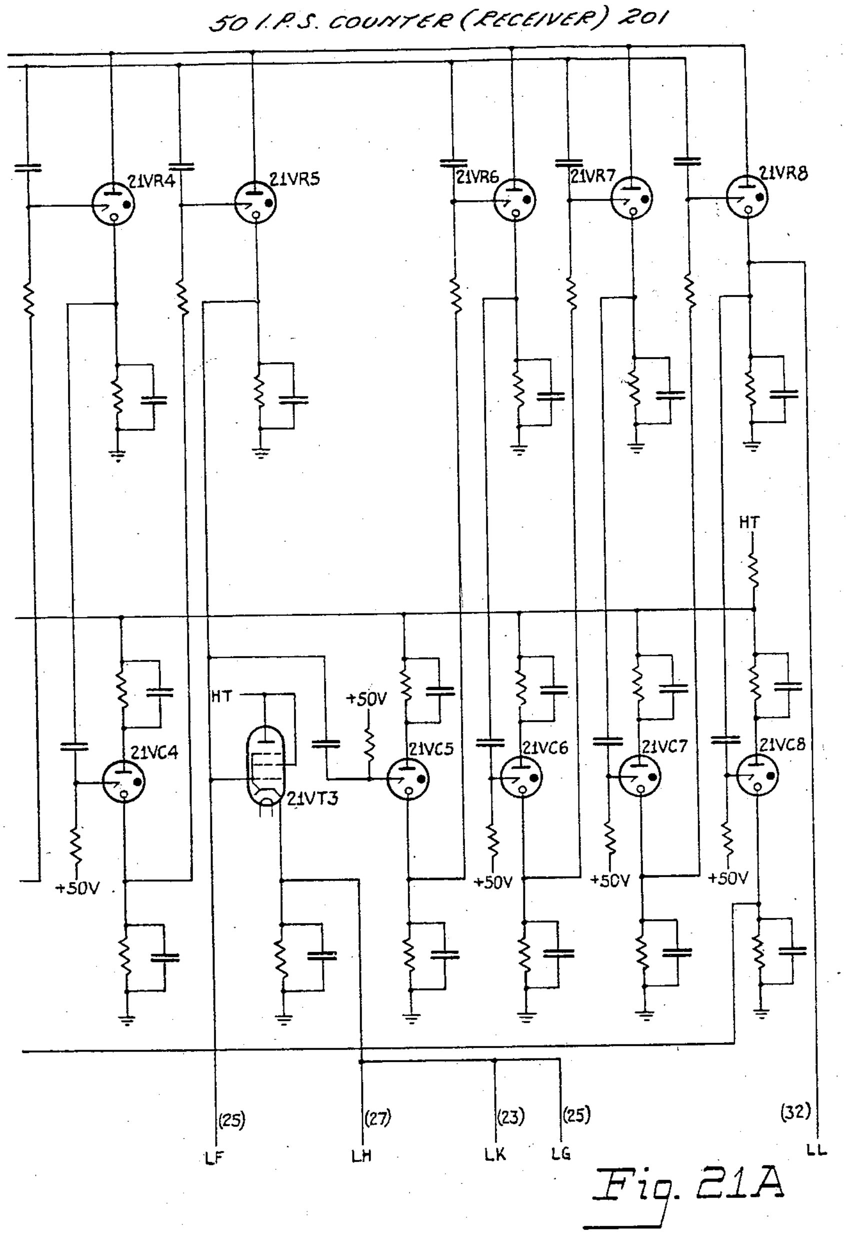

Reference will now be made to the 50 I. P. S. Counter circuit which is shown in Figs. 21 and 21A. This circuit is similar to the 400/50 I. P. S. counter used in the sender except that it generates pulses of only one frequency. The circuit is operated from the multivibrator output of the incoming control circuit which is applied over lead PLB to both the thermionic tubes 21VT1 and 21VT2, of which the first provides the drive for the counter while the second provides the pulsed H. T. supply for the pulse repeating tubes. The counter is provided with eight stages each of which consists of a pulse repeating tube (21VR1 to 21VR8) and a pulse counting tube (21VC1 to 21VC8). In addition the first stage of the counter is provided with an auxiliary counting tube 21VC1*a* connected in parallel with tube 21VC1. Further stage 5 of the counter includes a thermionic tube 21VT3 arranged as a cathode follower and which supplies drive pulses from the repeating tube 21VR5 to the various controlled circuits over leads LH, LK and LG. In addition a further drive is taken directly from the cathode to the tube 21VR5 to the Pulse circuit over lead LF. Initially tube 21VC1A is first struck by a pulse from the Miscellaneous circuit (Fig. 26) and the first pulse received from the multivibrator after the striking of tube 21VC1A will cause the pulse repeating tube of the second stage to strike whereupon the stages will become effective successively in response to the successive pulses received from the multivibrator circuit. At the end of the first cycle of operations, tube 21VR8 will strike followed by tube 21VC8. Tube 21VR8 in striking applies a pulse over lead LL to the Check Miscellaneous circuit (Fig. 32) while tube 21VC8 in striking primes the repeating tube 21VR1 of the first stage whereby this tubes strikes in response to the next pulse from the multivibrator and the circuit continues to operate as long as pulses are transmitted thereto from the multivibrator.

Figure 22:
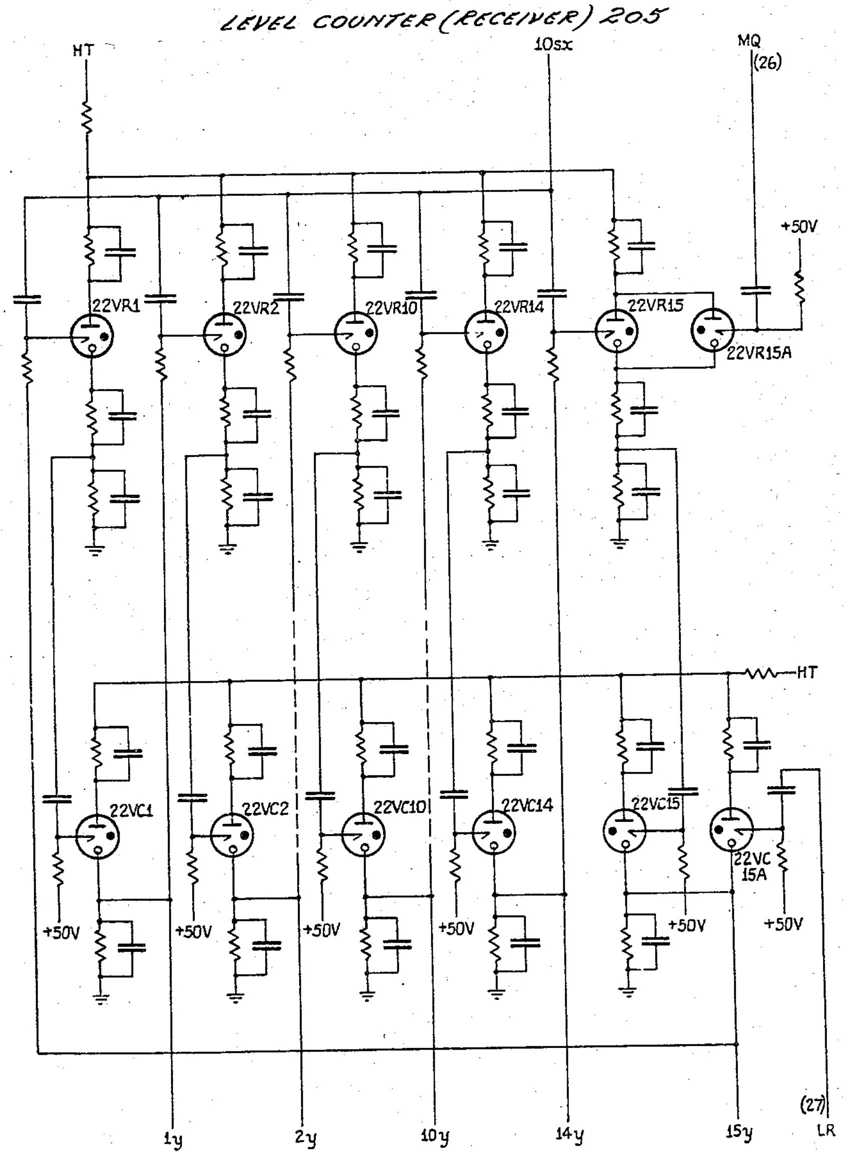
Fig. 22 shows the circuit of the Level Counter of the Receiver.

The Level Counter of the receiver is shown in Fig. 22 and is similar to the Level Counter described in connection with the Sender. The Level Counter shown in Fig. 22 has 15 stages each comprising a pulse repeating tube (22VR1 to 22VR15) and a pulse counting tube (22VC1 to 22VC15). In addition an auxiliary tube 22VR15A is connected in parallel with tube 22VR15 and tube 22VC15A is connected in parallel with tube 22VC15. Initially tube 22VC1 is conducting whereby a positive potential is applied to scanning lead 1*y* and a priming potential is applied to tube 22VR2. The level counter is driven from the contact counter by pulses applied over lead 10*sx*, a pulse being applied to this lead each time the contact counter completes one operative cycle. The stages of the Level Counter are rendered effective successively and positive potential is applied successively to the scanning leads 1*y* to 15*y*. A complete operative cycle of the Receiver takes place during the scan over the 15 levels, the scan over levels 1 to 14 being concerned with scanning the storage circuits while the scan over level 15 serves to reset the Receiver. At the end of the level 15 scan, the pulse from the Contact Counter over lead 10*sx* serves to strike tube 22VR1 followed by 22VC1 and the Level Counter is thus reset. Tube 22VC15A is concerned with the operation of the receiver if an incorrect Prefix signal is received and serves to move the Level Counter from level 1 to level 15 so that the Receiver is reset without scanning the storage circuit. Tube 22VR15A is struck when the HT supply is connected to the Receiver and enables the initial level 15 scan to take place.

Figure 23:
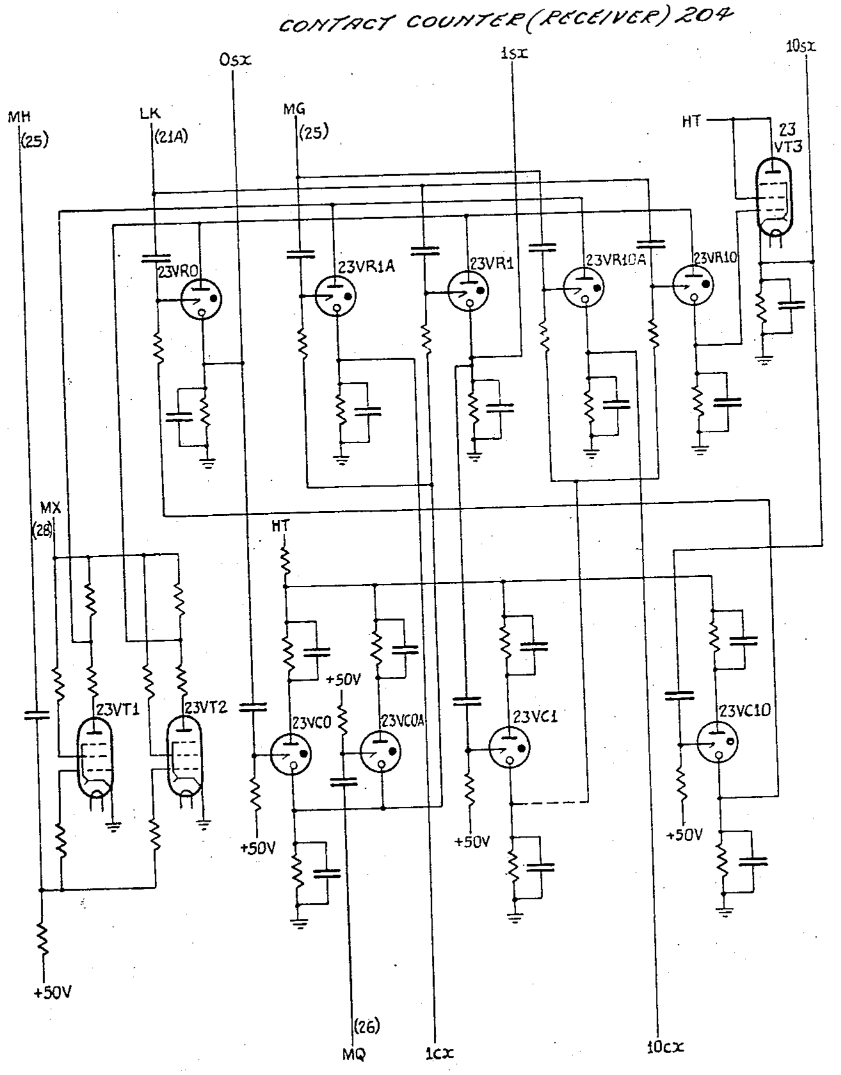
Fig. 23 shows the circuit of the Contact Counter of the Receiver.

The Contact Counter in the Receiver is shown in Fig. 23 and consists of 11 stages each of which include two pulse repeating tubes (23VR0 to 23VR10 and 23VR1A to 23VR10A) and one pulse counting tube (23VC1 to 23VC10). In addition a counting tube 23VC0A is connected in parallel with the counting tube 23VC0 and this tube 23VC0A is initially struck by a pulse from the Miscellaneous circuit (Fig. 26). The striking of tube 23VC0A applies a priming potential to the two pulse repeating tubes 23VR1 and 23VR1A of the first stage. Pulses are applied separately and synchronously to the two sets of pulse repeating tubes, the pulses being applied to tubes 23VR0 to 23VR10 over lead LK from the 50 I. P. S. Counter and to tubes 23VR1A to 23VR10A from a gating circuit in the Pulse circuit (Fig. 25) as will be described subsequently. The tubes of the first set 23VR0 to 23VR10 provide a series of eleven special *sx* pulses while the other set of tubes 23VR1A to 23VR10A provide the scanning potentials over leads 1*cx* to 10*cx*. The cathode follower tube 23VT3 is driven from the pulse repeating tube 23VR10 and serves to apply drive pulses to the Level Counter (Fig. 22), in addition to a striking potential to tube 23VC10. The thermionic tubes 23VT1 and 23VT2 provide the pulsed HT supply separately to the two sets of pulse repeating tubes. The stages of the Contact Counter are rendered effective successively to deliver the special pulses over leads 0*sx* to 10*sx* and scanning potentials over leads 1*cx* to 10*cx*.

Figure 24:
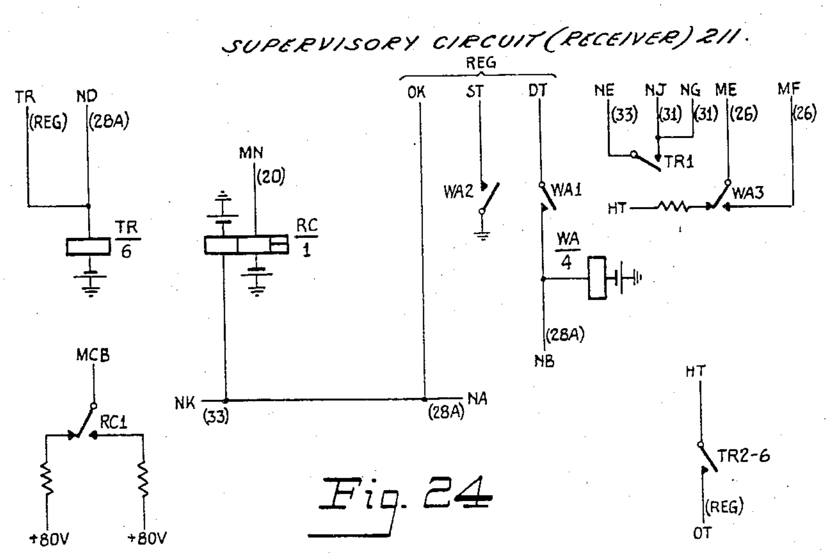
Fig. 24 shows the supervisory circuit of the Receiver.

The Supervisory Circuit shown in Fig. 24 is concerned with the transmission of supervisory signals from the Receiver to the Sender over the MCB leg of the junction. The circuit consists of three relays TR, RC and WA and when the receiver is not in use, relay RC is operated and −80 v. is connected to the MCB leg. When the receiver is taken into use by the Sender, relay RC is released and the busy voltage of +80 v. is applied to the MCB leg. Relay RC is operated together with relay WA when it has been ascertained that the transmitted information has been correctly received. This causes the connection of −80 v. again to the MCB leg to cause the transmission of the OK signal to the Sender. Relay WA in operating at this time also serves to indicate to the I/C Register that the Sender has information to be transferred to the Register and when the Register is ready to receive this information, relay TR is operated to enable the transfer of information from the storage circuits in the Receiver to the Register to take place.

Figure 25:
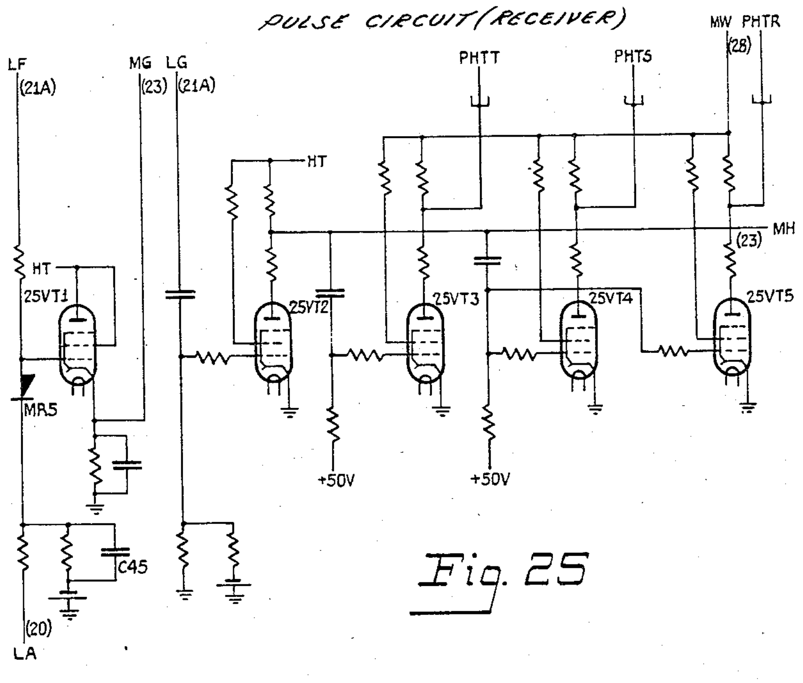
Fig. 25 shows a Pulse circuit.
Figure 26:
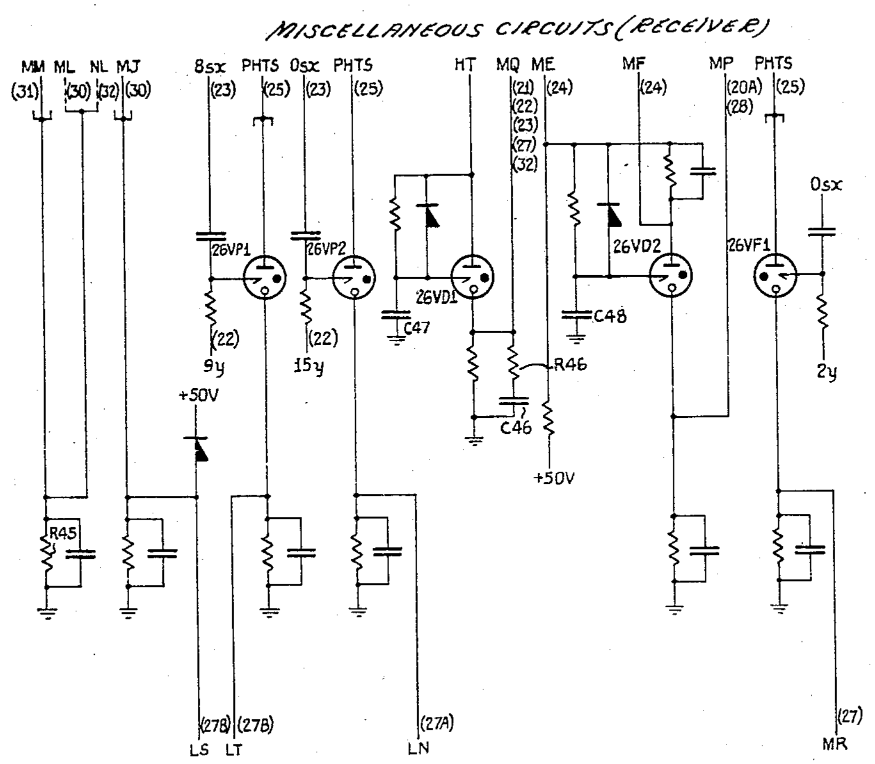
Fig. 26 shows a group of Miscellaneous circuits.
Figure 34:
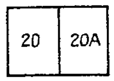
Figs. 34, 35, 36 and 37 show how certain of the drawings relating to the Receiver should be arranged.
Figure 35:
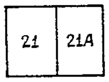
Figure 36:
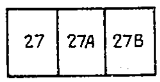
Figure 37:
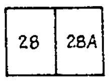

The Pulse circuit which is shown in Fig. 25 comprises five thermionic tubes 25VT1 to 25VT5. Tubes 25VT2 to 25VT5 are concerned with the provision of pulsed HT supplies over leads PHTT, PHTS, PHTR, pulses being provided over lead LG from the 50 I. P. S. Counter. Tube 25VT1 forms a gating circuit which prevents the transmission of *cx* pulses from the Contact Counter except when a space signal is received over the MCA leg of the junction coincident with a particular *cx* pulse. Pulses are fed to the control grid of tube 25VT1 over lead LF from the 50 I. P. S. Counter but are without effect on the control grid owing to the connection of the rectifier MR5. If, however, a positive potential is applied to lead LA indicating the reception of a space signal, the rectifier MR5 will be blocked to a pulse applied over lead LF and this pulse will therefore be transmitted by tube 25VT1 over lead MG to the Contact Counter where it will enable the *cx* potential to be effective over the appropriate *cx* lead.

Various Miscellaneous circuits are shown in Fig. 26 and these include the gas discharge tubes 26VP1, 26VP2, 26VD1, 26VD2 and 26VF1. The circuits of these tubes are independent of one another and become effective at specific times during the operation of the receiver. Thus tubes 26VD1 and 26VD2 strike when the HT supply is switched on at the receiver. Tube 26VD1 in striking applies a starting pulse to a number of other circuits in the receiver while tube 26VD2 controls through tube 20VG2 (Fig. 20A), the starting and stopping of the multivibrator. Tube 26VF1 is concerned with the Prefix signal reception and strikes when this signal has been received. Tube 26VP1 is concerned with the check which is made on the reception of the numerical information while tube 26VP2 is struck when the miscellaneous and numerical information has been received, and initiates the switching operation which eventually results in an OK signal being transmitted.

Figure 27:
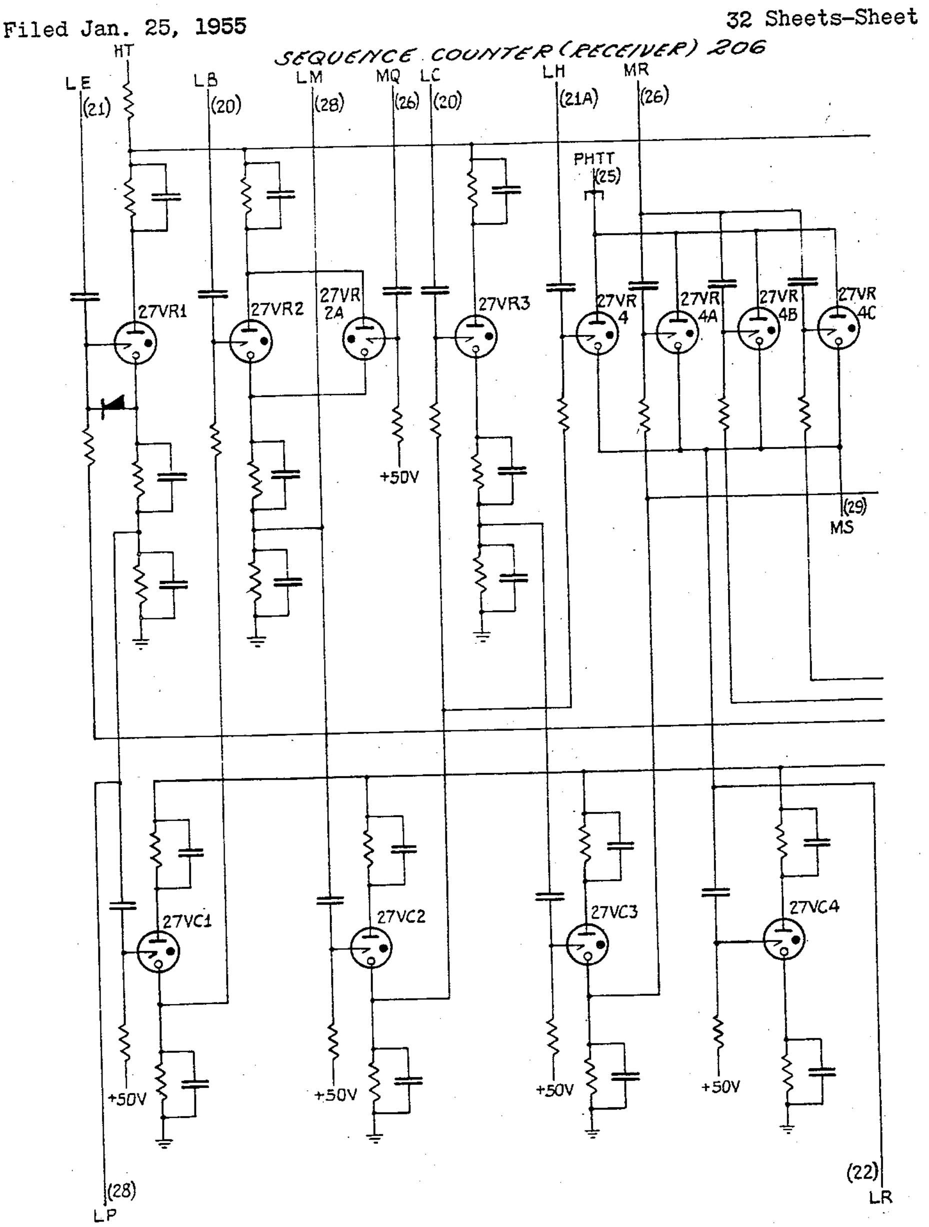
Figs. 27, 27A and 27B show the circuit of the Sequence Counter.

The Sequence Counter is shown in Fig. 27 and comprises ten stages each consisting of one or more pulse repeating tubes and one counting tube. The Sequence Counter is primarily concerned with advancing or stopping the Receiver as determined by a number of checking operations which take place while information is being received from the Sender. Secondly, the Sequence Counter is concerned with advancing the operation of the receiver for the checks which are made on the incoming information to show that this is correct. Alternatively, if the information is incorrect, count tube 27VC9, which may be termed a fault tube, strikes and further operation of the receiver is prevented. During the preliminary scan over level 15 repeating tube 27VR2A is first fired and is followed by its associated counting tube 27VC2. The firing of tube 27VR2A also applies a pulse to the sequence work circuit over lead LM. Tube 27VC2 in striking, applies a priming potential to tubes 27VR3 and 27VR4 and tube 27VR4 is struck on the next pulse applied to lead LH by the 50 I. P. S. counter. The striking of tube 27VR4 is followed by the striking of tube 27VC4 and the extinguishing of tube 27VC2. In addition a pulse is applied over lead LR. At the end of the scan of level 15 tube 27VR10 is fired by the pulse and bias applied from the contact and level counters respectively and this causes tube 27VC10 to strike thereby extinguishing tube 27VC4 and applying a positive potential over lead LY to terminate the preliminary scan. When the Sender is taken into use tube 27VC10 is conducting and consequently tube 27VR1 of the first stage is primed. Tube 27VR1 is fired on the next pulse applied to lead LE by the 50 I. P. S. counter. Tube 27VC1 therefore strikes, extinguishing tube 27VC10 and applying a priming potential to tube 27VR2. Tube 27VR2 strikes on the reception of the first space signal by the positive potential applied to lead LB and causes tube 27VC2 to strike. Tube 27VC2 extinguishes tube 27VC1 and applies priming potential to tubes 27VR3 and 27VR4. These two tubes are concerned with the timing of the first space signal and it is arranged that if the space signal is of the correct duration tube 27VR3 will be struck by a pulse over lead LC before the next pulse from the 50 I. P. S. Counter is applied to lead LH. If this occurs tube 27VC3 will strike thereby extinguishing tube 27VC2 and removing the priming potential from tube 27VR4 so that this tube will not be struck when eventually the pulse is applied to lead LH. If, however, the space signal is a spurious one, tube 27VR4 will strike followed by tube 27VC4 so that tube 27VC2 is extinguished. The striking of tube 27VR4 also applies a pulse over lead LR to the Level Counter to advance the counter to level 15 as previously described to reset the Receiver. However, assuming the space signal to be genuine the striking of tube 27VC3 causes a priming potential to be applied to tubes 27VR4 and 27VR5. Tubes 27VR4A, 27VR4B and 27VR4C together with tubes 27VR5, 27VR6, 27VR7 and their associated counting tubes 27VC5, 27VC6, 27VC7 are concerned with the correct reception of the Prefix signal. As previously explained, the Prefix signal in the present embodiment consists of two spaces followed by a mark and then a space. The reception of a space signal causes a pulse to be applied to each of the tubes 27VR5, 27VR6 and 27VR7 and it will thus be seen that the reception of three space signals will cause these three tubes to strike in turn so that at the end of the reception of the Prefix signal, tube 27VC7 will be conducting and will prime tube 27VR8. If, however, a lesser number of space signals are received then only tube 27VC5 or 27VC6 will remain conducting and will prime tube 27VR4B or 27VR4C respectively. Further if no space signals are received tube 27VR4A will remain primed. Finally if all the signal elements carry a space signal, the tube in the third Prefix element will be struck as described subsequently. At the termination of the Prefix signal reception a pulse is applied to lead MR and thence to the tubes 27VR4A, 27VR4B and 27VR4C. If any of these tubes have been primed indicating incorrect reception of the Prefix signal, the primed one will now strike and pulse tube 27VC4 and the Level Counter over lead LR with results as previously described. A similar operation will take place if the tube of the third Prefix element strikes except that the pulse of tube 27VC4 and the Level Counter takes place as soon as the third tube strikes. If, however, Prefix signal reception is correct, tube 27VR8 is primed as previously described and the scanning of the storage circuits takes place. Tube 27VR8 is struck by a pulse on lead LN after the scanning operation and causes tube 27VC8 to strike. Tubes 27VR9, 27VR9A and 27VR9B are concerned with the checking of the miscellaneous information and the numerical information. In the embodiment described the miscellaneous information is transmitted in a coded form in which one signal only i. e. a space, is transmitted in any of four successive signal elements. The circuit by which this is checked will be described subsequently but as far as the present circuit is concerned, if no signals are received during a succession of four signal elements tube 27VR9B strikes, while if more than one signal is received during the four signal elements, tube 27VR9A is struck. In either case tube 27VC9 strikes to indicate a fault. As regards tube 27VR9 this tube only strikes if the Binary Check circuit is not counted-out on the reception of the numerical information and the striking of this tube again causes the striking of tube 27VC9. If, however, the various checks show that the information has been correctly received, none of tubes 29VR9, 29VR9A or 29VR9B will strike and neither will tube 27VC9. The circuit therefore remains in the condition with tube 27VC8 conducting until the level 15 scan has ended. The 0*sx* pulse on level 1 then causes tube 27VR10 to strike and this is followed by the striking of tube 27VC10 which applies a positive potential to lead LY to maintain the multivibrator in operation, and to prime tube 27VR1. Tube 27VR1 strikes to the next pulse received from the 50 I. P. S. Counter over lead LE and is followed by tube 27VC1. The latter tube in striking extinguishes tube 27VC10 whereby positive potential is removed from lead LY and the operation of the multivibrator is stopped. The scan is therefore stopped on level 1 before position 1 is reached.

Figure 28:
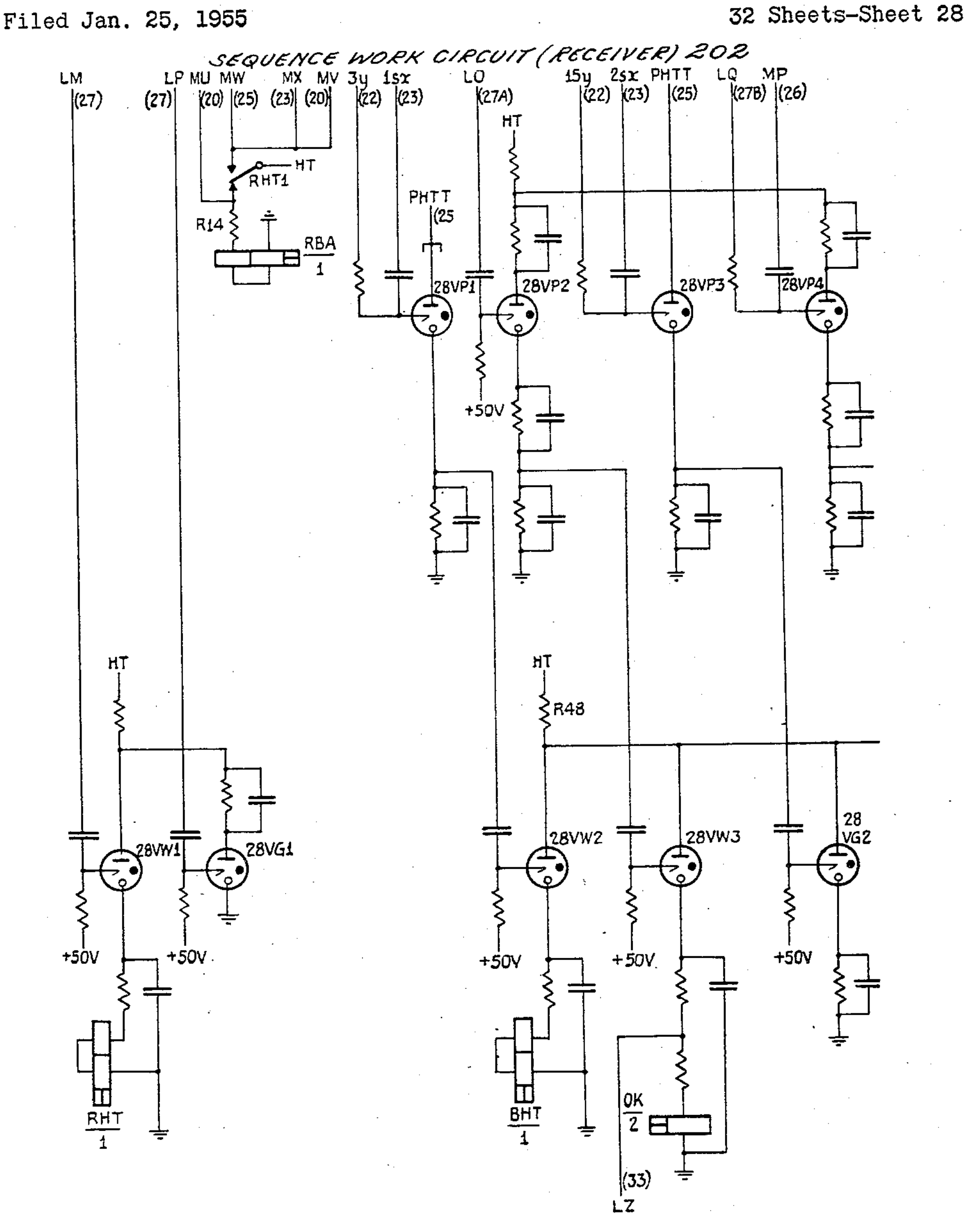
Figs. 28 and 28A show the circuit of the Sequence Work Counter.
Figure 28A:
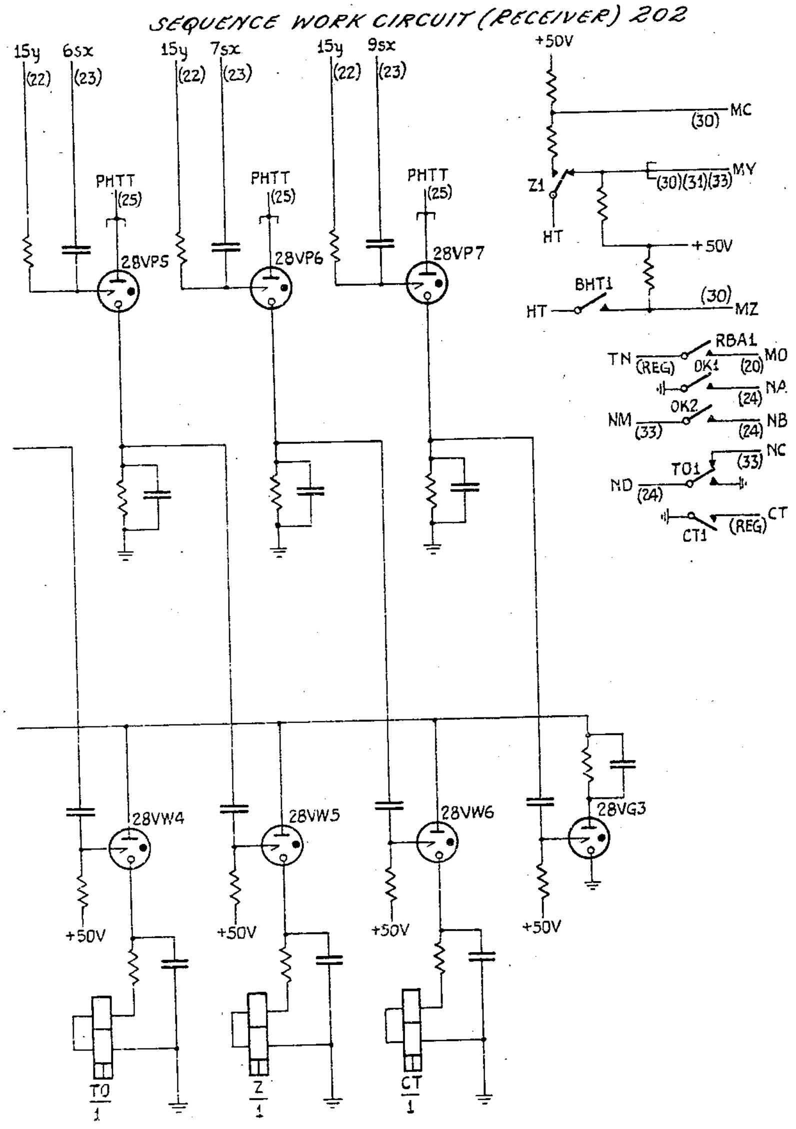

The Sequence Work circuit is shown in Figs. 28 and 28A and as with the Sequence Work circuit of the Sender, the circuit shown in Figs. 28 and 28A includes a number of stages each having a pulse repeating tube (28VP1–28VP7) and an associated pulse counting tube (28VW2, 28VW3, 28VG2, 28VW4 to 28VW6 and 28VG3). The first, second, fourth, fifth and sixth pulse counting tubes each have a relay connected in the cathode circuit, the relay being energised when the corresponding tube is struck. In addition, the circuit includes the tubes 28VW1 and 28VG1, the former having the relay RHT in its cathode circuit. When the Receiver is not in use, relay RBA is energised and at contacts RBA1 applies earth from the register to lead MO thereby maintaining relay RC operated in the Supervisory circuit to indicate that the Sender is available. When the first space signal of a message is received, tube 28VW1 strikes to a pulse on lead LM, and relay RHT operates. Relay RHT in operating at contacts RHT1 applies H. T. potential to various circuits over leads MW, MX and MV. Also at the same contacts relay RHT de-energised relay RBA which at contacts RBA1 opens the circuit for relay RC in the supervisory circuit. The sequence work circuit remains in this condition until the scanning operation has reached level 3. Tube 28VP1 strikes on the first scanning pulse on level 3 and causes the striking of tube 28VW2 followed by the operation of relay BHT. Relay BHT at contacts BHT1 connects one of the H. T. supplies to the Binary Check circuit. The next operation to take place in the Sequence Work circuit occurs when the scan of the Miscellaneous and Numerical storage circuits has been completed. Tube 28VP2 is then struck by a pulse on lead LO provided that the information has been correctly received. The striking of tube 28VP2 is followed by the striking of tube 28VW3 and the operation of relay OK. The striking of tube 28VW3 also extinguishes tube 28VW2 whereupon relay BHT releases and removes the H. T. supply from the Binary Check circuit. Relay OK in operating at contacts OK1 operates relay RC in the supervisory circuit (Fig. 24) to send the OK signal and at contacts OK2 transmits a signal to the I/C Register to indicate that the Receiver is ready to transfer the stored information to the Register. Tube 28VP3 strikes on the second *sx* pulse on level 15 and is followed by the striking of tube 28VG2. This extinguishes tube 28VW3 whereupon relay OK releases to terminate the OK signal. When the I/C Register is ready to receive the stored information tube 28VP4 strikes followed by tube 28VW4 and relay TO. Relay TO at contacts TO1 applies earth to lead ND to operate relay TR in the Supervisory circuit (Fig. 24) to initiate the transfer of the information. Tubes 28VP5, 28VP6 and 28VP7 are now operated successively by the sixth, seventh and ninth *sx* pulses in level 15 and are effective in causing the successive striking of tubes 28VW5, 28VW6 and 28VG3. Relay Z operates following the operation of tube 28VW5 and at contacts Z1 removes the H. T. supply from certain of the tubes in the Binary Check circuit and the storage circuits and applies H. T. over lead MC to tubes 30VB2 of the Binary Check circuit (Fig. 30) to reset this circuit. Relay CT operates when tube 28VW6 strikes and at contacts CT1 extends a clearance signal to the I/C Register. Finally the striking of tube 28VG3 which is itself self-extinguishing serves to extinguish tube 28VW6.

Figure 27A:
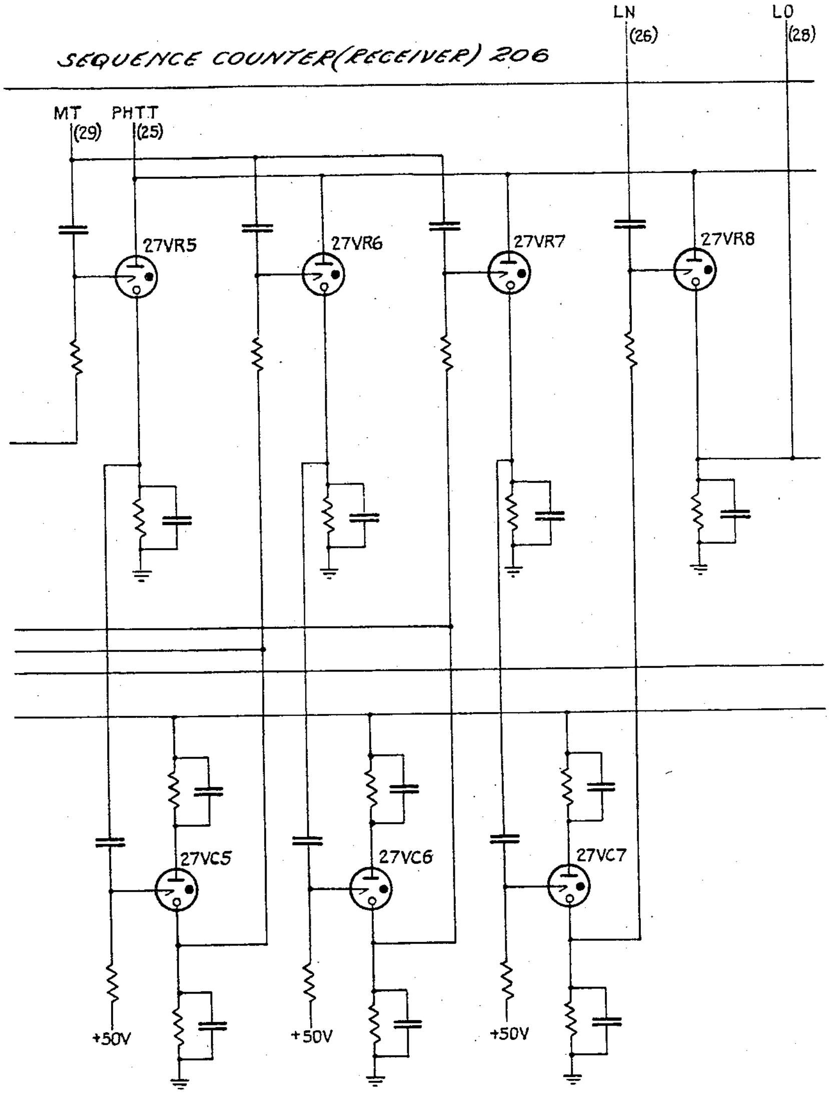

One of the Prefix elements consisting of tube 29VF1 is shown in Fig. 28 and it will be understood that four of these Prefix elements are provided. As previously mentioned the first two signal elements of the Prefix signal are occupied by a space signal. The third is occupied by a mark signal and the fourth again by a space signal. The four tubes have a common cathode load and the cathode of tubes 1, 2 and 4 is connected by lead MT to the Sequence Counter (Fig. 27A) while the cathode of the third prefix tube is connected by lead MS through the Sequence Counter and lead LR to the Level Counter. If the correct Prefix signal is received the first, second and fourth tubes will strike and three pulses will be applied in succession over lead MT to the Sequence Counter. If, however, the third prefix tube is also struck, the pulse will be applied through the Sequence Counter to operate the level 15 counting tube in the Level Counter so that the scan will immediately proceed over level 15 to reset the receiver without scanning the intermediate levels.

Figure 30:
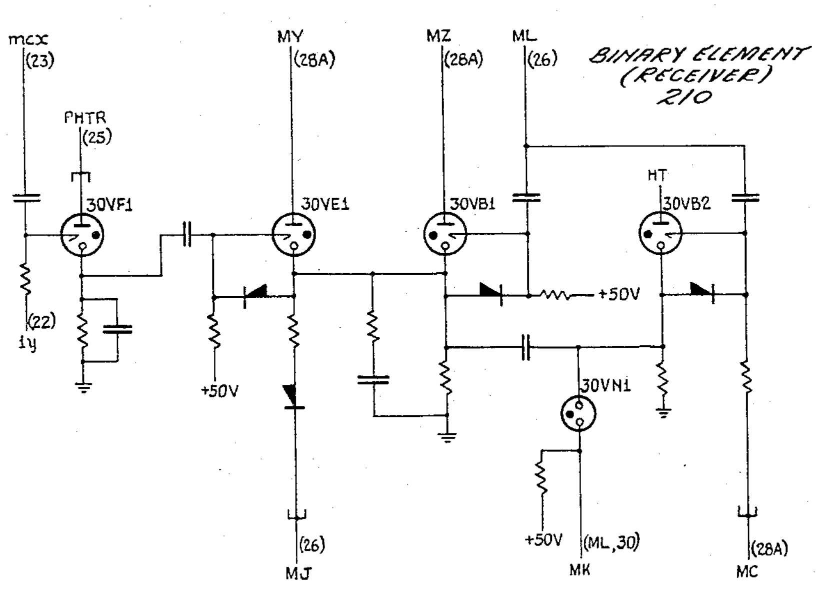
Fig. 30 shows the circuit of a Binary Element of the Receiver.

One stage of the Binary Check circuit is shown in Fig. 30 and comprises the four tubes 30VF1, 30VE1, 30VB1 and 30VB2. Normally tubes such as 30VB2 in all stages are conducting so that tubes such as 30VN1 are also conducting in all stages. Further no H. T. supply is connected to tubes 30VB1. At the time when tubes 30VB2 strike the H. T. supply to tubes such as 30VB1 is disconnected so that the striking of tubes 30VB2 is without effect as regards tubes 30VB1. As previously described the information following the Prefix signal consists of a number provided by the Binary Check Counting circuit in the sender and which represents the number of "ones" in the completed message. The tubes such as 30VF1 in all the stages of the Binary Check circuit can have successive *cx* pulses in the level 1 scan applied to them, the determination as to whether the *cx* pulse is in fact applied being dependent upon the reception of a space signal coinciding with the particular *cx* pulse. This determination is effected by the gating tube 25VT1 in the Pulse circuit, Fig. 25, as previously described. If a *cx* pulse is applied to tube 30VF1, the tube strikes and applies a pulse to tube 30VE1 which also strikes. The striking of tube 30VE1 causes tube 30VB2 to be extinguished so that considering the Binary Check circuit as a whole, tube 30VB2 will remain conducting in some of the stages while in others they will be extinguished. Since the initial condition of the stages of the Binary Check circuit is with the right-hand tube of the binary pair (30VB1 and 30VB2) conducting while the initial condition of the Binary Check Counting circuit in the Sender is with the left-hand tube of the binary pair conducting, it will be seen that the number injected into the Binary Check circuit will be the complement of the number received. On the completion of the reception of this number, the H. T. supply is connected to the tubes 30VB1 and the circuit can now operate as a normal binary counter to count the "ones" in the received message. The number of "ones" received should count out the counter, that is none of the tubes 30VE1 should remain conducting. If one of these tubes remains conducting, tube 27VR9 strikes in the Sequence Control circuit with results as previously described.

Figure 31:
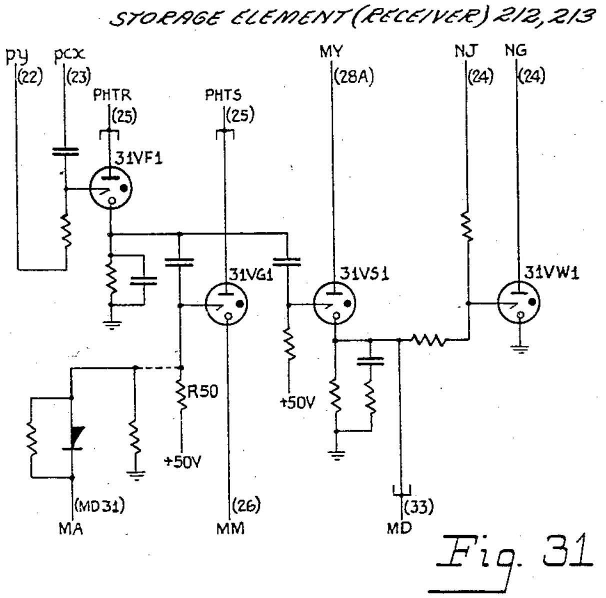
Fig. 31 shows the circuit of a Storage Element of the Receiver.

One Storage element is shown in Fig. 31 and it will be understood that as many of these are provided in the Miscellaneous and Numerical Storage circuits as are required to make up the capacity of these circuits. Each storage element is scanned in turn and if a space signal coincide with a *cx* scan, tube 31VF1 will strike and will be followed by tubes 31VG1 and 31VS1. Tube 31VG1 in striking causes a pulse to be applied to the Binary Check circuit (Fig. 30) as regards the numerical information and to the Check Miscellaneous circuit as regards the miscellaneous information. Tube 31VS1 in striking applies a priming potential to tube 31VW1 but this tube does not strike at this time. When all the incoming information has been stored and the I/C Register has signalled that it is ready for the information to be transferred from the Receiver, the H. T. supply is connected to tubes 31VW1 on the operation of relay TR in the Supervisory circuit (Fig. 24). Those 31VW1 tubes which have been primed now strike and in striking operate their corresponding storage relays in the I/C Register.

As regards supervisory signals, these are arranged to receive a double check because of their importance. The signals receive a check from the Check Miscellaneous circuit (Fig. 32) as will be described later. An additional check can however be incorporated in the storage circuit. A supervisory signal is transmitted by a pulse appearing in the same pulse position in two successive groups of pulse positions and the Miscellaneous Storage circuits which deal with supervisory signals are arranged so that the striking of a 31VG1 tube in a storage element in response to a pulse in a particular position of the first group serves to prime the 31VG1 tube of the corresponding storage element of the second group. This is effected by disconnecting the trigger electrodes of the 31VG1 tubes of the second group and connecting them instead via leads MA and MD to the cathodes of the tubes 31VS1 of the corresponding storage elements of the first group. A pulse would then only be transmitted to the Check Miscellaneous circuit over lead MM in response to the second group if the pulse positions in the two groups coincide.

Figure 27B:
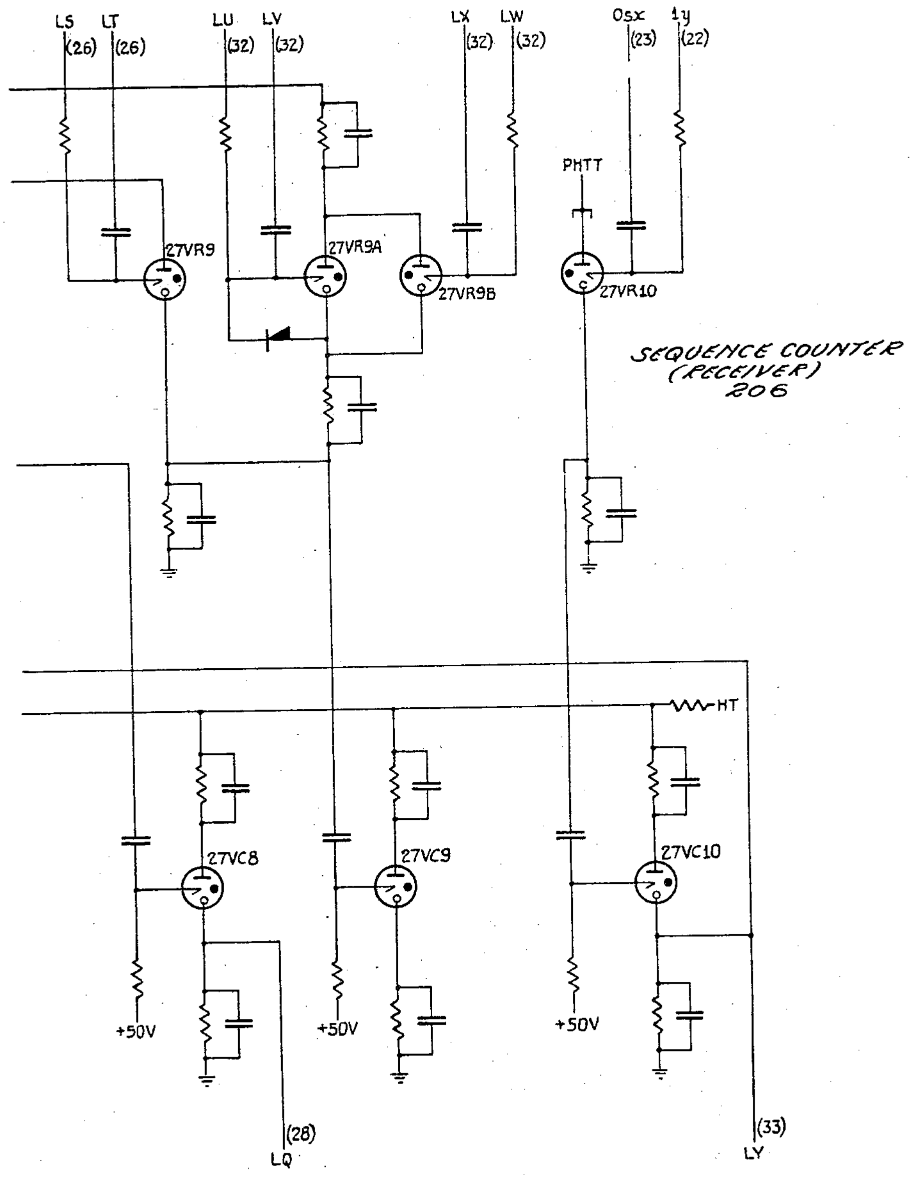
Figure 32:
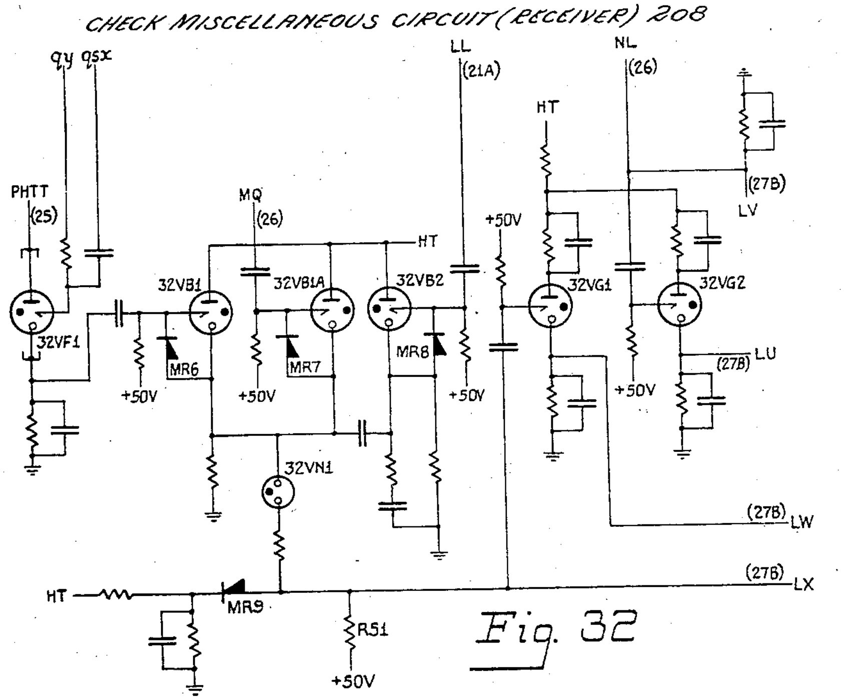
Fig. 32 shows a Check Miscellaneous circuit.

The Miscellaneous information is represented in coded form such that a signal consists of a group of four pulse positions and a single pulse appears in a group, the information being contained in a plurality of groups. The Check Miscellaneous circuit shown in Fig. 32 is individual to a group of signal elements and comprises the tubes 32VF1, 32VB1, 32VB1A, 32VB2, 32VG1, 32VG2 and the diode 32VN1. Tubes 32VB1 and 32VB2 form a binary pair, tube 32VB1A being connected in parallel with tube 32VB1 and when the Receiver is taken into use, tube 32VB2 is conducting i. e. the binary pair is in the "right-hand" position. Tube 32VG1 is also conducting. A priming potential is thus applied over lead LW to tube 27VR9B in the Sequence Counter (Fig. 27B). Now assume that a signal is received in the first signal element of the group. A pulse will then be applied to the Check Miscellaneous circuit from the appropriate storage element of the Miscellaneous Storage circuit over lead NL to the trigger electrode of tube 32VG2 and to the trigger electrode of tube 27VR9A (Fig. 27B). Tube 32VG2 strikes but tube 27VR9A does not since its priming potential is obtained from tube 32VG2 which has not yet fired. However tube 32VG2 now strikes and primes tube 27VR9A and also extinguishes tube 32VG1 thereby removing the priming potential from tube 27VR9B.

It will be assumed that no further pulse is applied to lead NL. Coincident with the *cx* pulse corresponding to the fourth signal element, an *sx* pulse is applied to the common tube 32VF1. This tube strikes and strikes tube 32VB1, thereby extinguishing tube 32VB2. Subsequently a pulse from the 50 I. P. S. Counter is applied to lead LL and tube 32VB2 again strikes. The cathode pulse resulting from the striking of tube 32VB2 causes the diode 32VN1 to conduct and the consequent positive potential at resistor R51 causes tube 32VG1 to strike. A positive pulse is also applied over lead LX to tube 27VR9B (Fig. 27B) but this does not strike since it is primed from tube 32VG1 which at this time is non-conducting. Tube 32VG1 in striking extinguishes tube 32VG2 which removes the priming potential from tube 27VR9A. Also tube 32VG1 in striking again applies a priming potential to tube 27VR9B. Hence neither of tubes 27VR9A are struck to indicate correct reception.

If however a second pulse is received over lead NL during a group of four pulse positions, tube 32VG2 will be conducting from the previous pulse and tube 27VR9A (Fig. 27B) will be primed over lead LU. Also the second pulse will be applied over lead LV and will strike tube 27VR9A whereupon the Sequence counter will move to the fault position.

If no pulses are applied to lead NL during a four pulse position group, tube 32VG1 will remain conducting and tube 27VR9B will be primed over lead LW. Hence when the diode 32VN1 strikes as previously explained tube 27VR9B (Fig. 27B) will strike and the Sequence counter will again move to the fault position.

Under certain circumstances, some of the information received may be transferred to the I/C Register while the remainder of the information is still being received. To enable this to be effected an "early transfer" signal is inserted in the message and the storage circuit concerned will when this signal is received cause a potential to be applied over lead MD (Fig. 31). Diode 33VN1 in the Early Transfer circuit (Fig. 32) will now strike and will cause tube 33VT1 to conduct thereby operating relay ETA. Relay ETA in operating operates relay ET and connects up relay SHT. Relay ET at contacts ET1, ET2 and ET4 and relay ETA at contacts ETA3 control certain of the other circuits of the receiver to enable early transfer to take place while contacts SHT1 of relay SHT are connected in parallel with contacts TR1 of relay TR in the Supervisory circuit.

When all the storage circuits whose information is subject to early transfer have been scanned, tube 33VP1 is fired by pulse 1*sx* of level 5. Tube 33VW1 is consequently fired and relay SHT operates. Early transfer is completed on two steps of the Contact Counter when tube 33VP2 is struck by pulse 3*sx* of level 5. Tube 33VG1 then fires, extinguishing tube 33VW1 and releasing relay SHT.

Having now described in detail the individual circuits forming the Sender and Receiver, a description will now be given of the way in which the circuits are cooperative during the transmission and reception of a message.

*Sender*

When the H. T. supply of a Sender is connected, parts of the circuit are energised by the application of +180 v. to all points marked HT1 from contacts FR1 (Fig. 3). A starting tube 4VD2 (Fig. 4A) fires when capacitor C7, charging through resistor R7 has raised the trigger electrode of the tube to a high enough potential. A pulse is applied from the cathode circuit of the tube over lead DD to the pulse repeating tube 15VR3A in the Fault and Resend circuit (Fig. 15) and to an auxiliary tube 8VC11A of the Contact Counter (Fig. 8). The pulse repeater tube 15VR3A of the Fault and Resend circuit (Fig. 15) fires, and extinguishes itself after applying a pulse from its cathode to tube 15VC3 which strikes and over lead AR to tube 5VC9A in the Sequence Control circuit (Fig. 5A). Tube 15VC3 in striking primes tube 15VR1. Tubes 8VC11A and 5VC9A both fire, and bias potentials from their cathodes prime the self-extinguishing pulse-repeating tubes of the "off" position of their respective circuits, i. e. tubes 8VR1 and 5VR1. In addition tube 5VC9A in striking primes tube 13VR4 of the Sequence Work circuit (Fig. 13) over lead DE.

It should be mentioned that pulse repeating tubes such as tubes 15VR1 are of the self-extinguishing type. When they are initially fired by the combination of a bias and a pulse on their trigger electrodes, current through the tube charges the capacitors in their anode and cathode circuits. When these capacitors reach a certain state of charge, the current through the tube is limited by its series resistors, and these are made of such a value that the current flowing through them is insufficient to maintain the discharge. The tube therefore extinguishes after delivering a pulse from its cathode.

The busy or idle condition of the junction line to which the sender is connected is indicated by the application at the incoming end of the junction of or —80 v. respectively to the return leg MCB (Fig. 16) of the junction. Assuming that the junction is free, tube 16VT2 of the Receiver Supervisory circuit is biased beyond cut-off and the potential distribution across the potential divider R32, R33, R34 allows tube 16VT1 to conduct. Relay REC therefore operates and at contacts REC1 connects lead PS1 to lead PL. Lead PS1 is connected to the cathode of the cathode follower tube 4VT1 of the Start and Pulsed H. T. supply circuit (Fig. 4), a pulse source delivering 400 pulses per second being applied to a control grid of the tube over lead PS. Hence as a result of the operation of relay REC, pulses are fed over lead PL at the rate of 400 per second.

The first pulse delivered over lead PL causes the striking of tube 5VR1 (Fig. 5) which is primed as previously described and this tube in striking causes its corresponding counter tube 5VC1 to strike. Further tube 5VR1 in striking causes a pulse to be applied to tube 13VR5 of the Sequence Work circuit (Fig. 13) to cause this tube to strike. The striking of tube 5VC1 causes tube 5VR2 to be primed and causes a positive potential to be applied to lead AY which is connected to the trigger electrode of tube 3VW1 of the Supervisory circuit (Fig. 3). However, the potential applied to lead AY is without effect as regards tube 3VW1 since relay TS is at present unoperated and consequently contacts TS1 connect earth to the trigger electrode of tube 3VW1. The striking of tube 13VR5 (Fig. 13) causes a pulse to be applied to its corresponding counter tube 13VC5 but this tube does not strike since the H. T. supply has not yet been connected thereto.

The circuit remains in this condition until a Register requires to make use of the Sender for transmitting a message. A Register tests whether a Sender is free by extending an earth signal over lead TS (Fig. 3) to operate relay TS. At contacts TS1 this relay removes the earth connection from the trigger electrode of tube 3VW1 of the Supervisory circuit. As the Sequence Control circuit (Fig. 5) is resting in the "off" position i. e. tube 5VC1 is conducting, signifying that the Sender is free, a bias from the cathode of the "off" position counter tube 5VC1 now primes tube 3VW1 (Fig. 3) over lead AY, and if relay HTS is also unoperated, the tube fires in response to the next pulse from 400 I. P. S. pulse source applied to its trigger electrode subsequent to the operation of relay TS. Relay ON is thereby operated, and returns a "Sender free" signal over lead PS to the Register.

Energisation of the Sender is completed when in the Supervisory circuit, an earth signal applied over lead SS from the Register operates relays A and HTS over their left-hand windings. Relay A locks over its self-hold contact A1 and its right-hand winding to earth applied from contacts RSA1 in the Sequence work circuit (Fig. 13) over lead A. Relay HTS locks over contact A2 and its right-hand winding.

Relay HTS at contacts HTS1 applies +180 v. over lead HT3 to the storage tubes 11VP1 (Fig. 11) and 12VP1 (Fig. 12) of the Miscellaneous and Numerical Storage circuits, to the Sequence Work Circuit counter tubes 13VC1 to 13VC5 of the Sequence Work circuit, to the Mark/space binary pair 14VB1, 14VB2 in the Send circuit (Fig. 14), to the binary pairs 9VBA, 9VBB of the Check Count Circuit (Fig. 9), and to the reset bias leads of these binary pairs via contacts B2 and lead RB (Fig. 3). The reset bias potential is approximately +160 v., obtained from the potential divider comprising resistors R1 and R2. This potential, applied to the trigger electrodes of tubes 9VBA1 to **9VBA*n*** (Fig. 9) of the Binary Check Counter elements, is sufficient to strike all these tubes.

It should be explained only one element of the Prefix elements (Fig. 10), Numerical and Miscellaneous storage circuits (Figs. 12 and 11) have been shown in the drawings for simplicity but there will, of course, be a number of each of these elements depending on the code used and the required storage capacity of the circuits. In the particular embodiment, four Prefix elements are used and the first, second and fourth are energised to give a signal the pattern of which is:

space—space—mark—space the normal condition of the line between the Sender and Receiver being "mark." As previously mentioned routing and supervisory information i. e. Miscellaneous information is provided by a marking on one of a group of display leads and each display lead will have a Miscellaneous storage circuit connected thereto. The number of Miscellaneous storage circuits provided will thus depend on the number of marking leads necessary to convey the Miscellaneous information.

As regards the Numerical information, this is provided in binary form and a Numerical storage element is provided for each binary digit. Here again the number of Numerical storage elements will depend upon the amount of Numerical information to be transmitted, and the same applies to the number of Binary Check Count elements provided. For instance, the Numerical information may consist of one or more numbers in binary form and each number may represent any number on a decimal basis.

Further relay HTS (Fig. 4) at contacts HTS2 applies +180 v. to the anodes of thermionic tubes 4VT2 to 4VT7 of the Pulsed-HT Supply circuit (Fig. 4) and to similar tube 14VT1 (Fig. 14) and 6VT1 (Fig. 6) in the Send and 400/50 I. P. S. Counter circuit respectively. The anode supply to tube 4VT8 (Fig. 4A) cannot be applied from contacts HTS2 because a spurious pulse developed at leads AK and AZ in its anode circuit would cause the Position Counter and 400/50 I. P. S. Counter each to take a step. The tube, therefore, has its HT supplied from contacts FR1 (Fig. 3) before these two Counter circuits are energised.

In the Supervisory circuit (Fig. 3) contacts A3 close to operate relay B. Contacts B2 operate to open the +180 v. supply to the reset bias leads RB of the Binary Check Count circuit (Fig. 9), and the trigger electrodes of the tubes 9VBA1 to **9VBA*n* of this circuit revert to +50 v. applied via resistor R1**.

The operation of contacts HTS1 also apply HT to the anode and trigger electrode of tube 4VD1 (Fig. 4A), and this tube fires when capacitor C8 has charged. This is arranged to take place after relay B has operated. Tube 4VD1 in firing applies a pulse from its cathode circuit over lead AW to fire pulse repeater tube 5VR2 of the Sequence Control circuit (Fig. 5) which was primed when the "off" position counter tube 5VC1 fired as previously described. The Sequence Control circuit and the other counter type circuits each comprise a chain of mutually extinguishing counter tubes which are normally primed and which are fired from associated auxiliary pulse repeaters to which the operating pulses are applied. The pulse repeaters are arranged to be primed from the preceding counter stage, and are extinguished after delivering a pulse. In this case, which is typical of the other counter circuits, the pulse repeater tube 5VR2 fires and extinguishes, and in doing so applies a pulse to the corresponding counter tube 5VC2 which fires a pulse over lead AL to the auxiliary tube 7VC2A of the Level Counter (Fig. 7), which fires, and a pulse over lead AX to pulse repeater 13VR1 of the Sequence Work circuit (Fig. 13), which also fires and extinguishes. This latter tube applies a pulse to the corresponding counter tube 13VC1, which fires and operates relay MB.

The firing of tube 7VC2A (Fig. 7) primes the third Level pulse repeater tube 7VR3 of the Level Counter. Relay MB (Fig. 13) in operating applies a +50 v. bias over contacts MB1 to the Register over lead B. This causes the Register to display a bias over lead DG (Fig 11) to the trigger electrode of the store tube 11VP1 in every Miscellaneous Storage circuit, and over lead DH (Fig. 12) to the store tube 12VP1 and "Count" tube 12VP3 in every Numerical Storage circuit which corresponds to an operated storage device in the Register. At contacts MB2 (Fig. 13) the +50 v. bias is removed from lead DC, and the junction point of resistors R5 and R6 (Fig. 4A) reverts to earth potential. This removes the backing-off potential on lead AA from the cathodes of the "Count" tubes 12VP3 (Fig. 12) of the Numerical Storage circuit. The Storage circuits are now ready for the high speed scan.

It was previously mentioned that the tube 5VC2 (Fig. 5) of the Sequence Control circuit fired on receipt of a pulse from its corresponding pulse repeater. There is a delay in the rise of its cathode potential due to the time required to charge capacitor C10 through resistor R10 in its cathode circuit, and the high speed count initiating pulse repeater tube 5VR3 of the Sequence Control circuit is therefore not primed immediately when tube 5VC2 fires. The delay covers the interval which elapses before the marking biases are returned from the Register after relay MB operates. Tube 5VR3 has a source of 400 I. P. S. pulses PS1 connected to its trigger electrode, and will therefore fire when its priming bias has reached a sufficiently high potential.

On firing, tube 5VR3 applies a pulse from its cathode to fire its corresponding counting tube 5VC3, and also applies a pulse via lead AV to tube 6VE2 (Fig. 6B) of the 400/50 I. P. S. Counter. This tube fires and the rise in cathode potential is applied as a priming bias to the pulse repeating tube 6VR1A (Fig. 6). Tube 6VR1A is fired by the next pulse applied from the 400 I. P. S. pulse source over lead PS1 which is connected to its trigger electrode. Its anode is supplied over lead PHTG from the anode circuit of the pulsed-HT tube 6VT1 (Fig. 6B), whose grid is controlled from the 400 I. P. S. source over lead BA. Tube 6VR1A is extinguished between successive positive pulses applied to its trigger electrode, due to the fall in potential at its anode when tube 6VT1 conducts, this method of operation is typical of other pulse repeating tubes whose anodes are controlled by a pulsed-HT source. Tube 6VR1A therefore delivers pulses at the rate of 400 I. P. S. from its cathode to lead AD for as long as a priming bias is maintained from tube 6VE2. Lead AD extends to the grid of the pulse inverting tube 4VT2 (Fig. 4).

Pulses are delivered from the anode of tube 4VT2 to the grids of the pulsed-HT supply tubes 4VT3 to 4VT7 and of the Contact Counter driving tube 4VT8. This latter tube delivers 400 I. P. S. pulses from its anode circuit via lead AK to the trigger electrodes of all 11 pulse distributing tubes 8VR1 to 8VR11 (Fig. 8) of the Contact Counter, these tubes being also controlled at their anodes which are supplied from the anode circuit of pulsed-HT tube 4VT7 (Fig. 4) over lead PHTE. The "off" position tube 8VR1 (Fig. 8) of the Contact Counter is primed from the auxiliary tube 8VC11A as previously described and fires on receipt of the first pulse received over lead AK. A pulse is delivered from its cathode to its associated counter tube 8VC1, and it also supplies a pulse over the first of the special "$x$" pulse leads, lead $0sx$. The counter tube 8VC1 fires and primes both the first position distributing tube 8VR2 and the first position pulsing tube 8VP1. The "off" position distributing tube 8VR1 is extinguished on the reduction of its HT supply, and the next pulse from lead AK will fire both the first position tubes in the distributing and pulsing chains. The pulsing tubes 8VP1 to 8VP9 on firing deliver pulses over the "$x$" pulse lead $1x$ to $9x$.

The distributing, pulsing and counting tubes fire successively on receipt of successive driving pulses, the distributing and pulsing tubes being extinguished by the pulsed-HT supply received over leads PHTE and PHTD, while the counting tubes are mutually extinguishing because of their common anode resistor R15. "$x$" pulses therefore appear at leads $1x$ to $9x$ in turn and special "$x$" pulses at leads $0sx$ to $9sx$ in turn. When the tenth distributing tube 8VR11 is reached, a bias is applied to the cathode follower 8VT1, and the tenth "$x$" pulse is generated at its cathode. Tube 8VT1 also applies a pulse via lead AJ to the Level Counter (Fig. 7) where it is applied to the trigger electrodes of all 15 self-extinguishing pulse repeater tubes 7VR1 to 15VR1.

The Level Counter takes one step after each complete cycle of the Contact Counter. The auxiliary tube 7VC2A was initially fired from the Sequence Control circuit by a pulse on lead AL as previously described, and the third position pulse repeater tube 7VR3 is therefore biased and is the first tube to strike on recepit of a pulse from the Contact Counter over lead AJ, a bias meanwhile being maintained on lead $2y$. The counter tube 7VC3 associated with the third position pulse repeater 7VR3 is fired by a pulse from the cathode of the latter and in turn primes the adjacent pulse repeater 7VR4 (not shown) and applies a bias to its "$y$" bias lead.

It will therefore be seen that each "$y$" bias lead from $2y$ onwards is energised in turn while all the "$x$" pulse leads are sequentially pulsed at 400 I. P. S. After the tenth "$x$" pulse there is a pause while the Contact Counter is in the "off" position, and this allows the "$y$" bias to stabilise before the "$x$" pulse sequence re-commences. The "Mark" tubes 11VF1 to 11VF$n$ (not shown) and 12VF1 to 12VF$n$ (not shown) of the Miscellaneous and Numerical Storage circuits respectively and 9VF1 to 9VF$n$ of the Binary Check Count circuit have their trigger electrodes connected to a coordinate scanning field, the axes of which comprise the ten "$x$" pulse and 15 "$y$" bias leads. Each trigger electrode is connected to one "$x$" and one "$y$" lead, the trigger electrodes of the "Mark" tubes 9VF1 to 9VF$n$ of the Binary Check Count circuit being associated with lead $1y$.

The ten tubes associated with lead $2y$ are pulsed first, and the Binary Check Count "Mark" tubes are therefore not pulsed in the high speed count. The "Mark" tubes in all the Storage circuits are fired on application of a simultaneous "$x$" pulse and "$y$" bias to their triggers. In the Miscellaneous Storage circuits, a "Mark" tube 11VF1 in firing applies a pulse to the associated "Store" tube, 11VP1, and the "Store" tubes which have been primed from the Register now fire. In the same way in the Numerical Storage circuits, both the "Store" and "Count" tubes 12VP1 and 12VP3 which have been primed from the Register also fire. The "Count" tubes are controlled by a pulsed-HT lead, PHTC, and those that have fired therefore extinguish after providing a pulse over leads AA and AB in series to the inlet of the first stage of the Binary Check Count circuit (Fig. 9).

In the Binary Check Count circuit tubes 9VBA1 and 9VBB1 of the element shown form a binary pair, the cathodes of the tubes being coupled by capacitor C20. Rectifiers MR1, MR2 are provided between cathode and trigger to prevent the minor gap being fired in the reverse direction by a spurious pulse to the cathode. In the zero position of the circuit, all tubes 9VBA1 to 9VBA$n$ are fired from the lead RB, which is now held at +50 v. The first pulse applied over lead AB fires tubes 9VBB1 and the cathode pulse transferred from this tube to its complementary tube 9VBA1 via capacitor C20 extinguishes the latter tube. In this condition the potential difference between the electrodes of diode 9VN1 is not sufficient to strike it. The next pulse received from lead AB causes tube 9VBA1 to fire. Its complementary tube 9VBB1 is extinguished by means of the cathode coupling, and the cathode pulse from tube 9VBA1 now increases the voltage across tube 9VN1 sufficiently to cause it to fire. A pulse is thereby applied to the second binary pair which operates in a similar manner, successive pulses applied to any stage causing the tubes of the stage to conduct in turn. There are sufficient stages provided to count to the number of "Count" tubes fired in the Numerical Storage circuits, and at the end of the high speed scan, the pattern of the fired tubes in the chain of binary pairs in the Binary Check Count circuit gives an indication of the number of "Count" tubes which have fired that is the number of "ones" in the binary representation of the Numerical information.

When the Level Counter (Fig. 7) has completed its scan of Level 14, the Level 15 pulse repeater tube 7VR15 fires, and a pulse is delivered from its cathode circuit via lead AN to pulse repeater 13VR2 (Fig. 13) corresponding to the counter tube 13VC2, in the Sequence Work circuit which indicates the end of the count. Tube 13VR2 fires and extinguishes and delivers a pulse to tube 13VC2 which also fires and operates relay CF in its cathode circuit. The firing of tube 13VC2 causes tube 13VC1 to extinguish because of their common anode resistor R25, and relay MB therefore releases.

Contacts MB1 now connect earth potential to the Register over lead B, and contacts MB2 connect +50 v. to lead DC. This provides a backing-off potential applied via lead AA (Fig. 4A) to the "Count" tubes 12VP3 of the Numerical Storage circuits (Fig. 12), and prevents spurious pulses being given to the Binary Check Count circuit during sending. Capacitor C6 (Fig. 4A) connected across resistor R6 absorbs the surge of current when contacts MB2 release to prevent a pulse being generated.

Contacts CF1 (Fig. 13) extend earth potential to the Register over lead SR to indicate that the Sender has received all the stored information. Approximately 27.5 ms. later, the Level 1 pulse repeater tube 7VR1 in the Level Counter (Fig. 7) will fire in the normal course of cyclic operation, and in turn will fire its corresponding Level 1 counter tube 7VC1, tube 6VE1 in the 400/50 I. P. S. Counter (Fig. 6B) via lead AU, and pulse repeater tube 5VR4 in the Sequence Control circuit (Fig. 5) via lead AM.

In the 400/50 I. P. S. Counter circuit (Fig. 6B), tube 6VE1 in firing extinguishes tube 6VE2 and the bias is thereby removed from the trigger of tube 6VR1A which is extinguished when tube 6VT1 next takes current. This cuts off the train of pulses over lead AD to the pulse inverting tube 4VT2 (Fig. 4) and the Contact Counter (Fig. 8) therefore stops with the tenth position counter tube 8VC11 fired.

Tube 5VR4 (Fig. 5) of the Sequence Control circuit in firing fires its associated counter tube 5VC4 and also supplies a pulse over lead DJ to the Sequence Work circuit (Fig. 13) to fire the pulse repeater tube 13VR3 which in turn fires the associated counter tube 13VC3 to operate relay HTK. Tube 13VC3 in firing causes tube 13VC2 to be extinguished, whereupon relay CF releases, removing the bias at lead SR from the Register. Relay HTK in operating at contacts HTK1 applies HT to the anode circuit of tube 3VW2 of the Supervisory Circuit (Fig. 3) via lead DB. The firing of tube 5VC4 (Fig. 5) causes a priming potential to be applied to the trigger electrode of tube 5VR5 but the rise of the priming potential is delayed by resistor R11 and capacitor C11.

The Sender is now ready to transmit its information over the inter-exchange junction, and tests whether the distant receiving circuit is free. This operation has already been described and its repetition at this stage is necessary since the receiver may still be dealing with information transmitted thereto from a previous operation of the Sender in which case +80 v. would be applied to the return leg MCB (Fig. 16) of the junction. If a free signal is returned, relay REC remains operated but if a busy condition exists on the junction, tube 16VT2 conducts and tube 16VT1 is cut off and relay REC is inoperative. The circuit remains in this condition until the junction becomes free and relay REC operates again. It will be noted that rectifier MR3, resistor R30, capacitor C31 and resistor R31 in the grid circuit of tube 16VT2 comprise a delay circuit to prevent spurious pulses on the junction from affecting the bias on the tube.

Assuming that the junction is free, the first pulse delivered over lead PL (Fig. 5A) to the Sequence Control circuit after the rise of priming potential on the trigger electrodes of tube 5VR5 (Fig. 5) as previously described, causes this tube to fire whereupon the resulting pulse from its cathode fires the counter tube 5VC5 and is taken by lead AT to the 400/50 I. P. S. Counter circuit where it fires the Send initiating counter tube 6VC7A (Fig. 6A) and tube 6VE3 (Fig. 6B). Tube 6VE3 in firing extinguishes tube 6VE1 and applies a priming bias to the trigger of the counter tube 6VC1 of the 400/50 I. P. S. Counter circuit. Tube 6VC7A in firing applies a priming bias to tube 6VP8.

The Level Counter (Fig. 7) is now resting with its first stage counter tube 7VC1 fired, and the circuits associated with lead 1y are ready for scanning, i. e. the Binary Check Count circuit stages. The eighth position pulse repeating tube 6VP8 (Fig. 6B) of the 400/50 I. P. S. Counter circuit which was primed from the send initiating tube 6VC7A, is now fired by the next pulse of the 400 I. P. S. pulse train applied to its trigger electrode. The pulse repeater tube 6VP8 in turn fires its corresponding counter tube 6VC8 which extinguishes tube 6VC7A and primes the pulse repeating tube in the first position of the counter. The 400/50 I. P. S. Counter circuit is now ready to step round at 400 I. P. S., and pulses will be supplied from the cathode of the first position pulse repeating tube 6VR1 at the rate of 50 I. P. S.

Impulses at the rate of 50 I. P. S. are delivered over lead AD to the pulse inverting tube 4VT2 (Fig. 4), and the pulsed-HT and Contact Counter driving tubes now produce 50 I. P. S. pulses from their anodes. As previously described, the Contact Counter circuit is stepped round, now at 50 I. P. S., and scans the circuits associated with each "x" bias lead in turn. Tube 4VT8 also applies a pulse over lead AZ to the first position counter tube of the 400/50 I. P. S. Counter circuit to re-start the cycle after a pulse has been received from lead AD.

The tube occupying each position of the scanning field fires as it receives an "x" pulse and a "y" bias simultaneously. In the case of the Prefix elements (Fig. 10), the firing of a tube 10VF results in a pulse being supplied to the common lead SC. It will be understood that there are a number of Prefix elements provided, the number corresponding to the number of "Mark" elements in the prefix signal. The purpose of the prefix signal is to distinguish at the receiver between an actual signal and a spurious signal, its purpose being explained in greater detail in the description relating to the Receiver.

In the case of the Miscellaneous and Numerical Storage circuits (Figs. 11 and 12) and firing of a "Mark" tube 11VF1 or 12VF1 respectively results in a pulse being applied to the trigger electrode of the corresponding Send Tube 11VP2 or 12VP2, and this tube fires if it is primed from its "Store" tube 11VP1 or 12VP1. In the case of the Binary Check Count circuit, the "Send" tube 9VP fires if it is primed by tube 9VBB of the binary pair. Each "Send" tube which fires delivers a pulse to the common lead SC, which in turn applies a pulse to the Send circuit.

In the Send circuit (Figs. 11 and 12) this pulse fires tube 14VC2, which in turn primes the "Space" pulse repeater tube 14VP1. When the third position pulse repeater 6VP3 (Fig. 6) of the 400/50 I. P. S. Counter circuit fires, it delivers pulses over lead AF to the "Space" and "Mark" pulse repeater tubes 14VP1 (Fig. 14) and 14VP2 of the Send circuit. If tube 14VC2 has fired, the "Space" tube 14VP1 will now fire and will in turn fire tube 14VB1. This tube in firing operates the polarized telegraph type relay CSC in its cathode circuit, and this now connects +80 v. to the "go" leg MCA of the junction in place of the continuous "mark" signal previously applied. When the fourth position pulse repeater tube 6VP4 (Fig. 6) of the 400/50 I. P. S. Counter circuit fires, it delivers a pulse over lead AG to fire tube 14VC1 (Fig. 14) of the Send circuit, and tube 14VC2 is thereby extinguished. Tubes 14VP1 and 14VB1, however, remain conducting and relay CSC remains in its operated position.

When the 50 I. P. S. scan reaches a Storage or Binary Check Count circuit in which the "Send" tube does not fire, pulse repeater tube 14VR3 of the Send circuit, which is primed by tube 14VC1 (Fig. 14), will fire from a pulse received over lead AE when the 400/50 I. P. S. Counter circuit reaches the second position and tube 6VP2 (Fig. 6) fires. Tube 14VR3 (Fig. 14) in turn will apply a pulse to tube 14VC3 which fires and primes the pulse repeater tube 14VP2. This tube fires on receipt of a pulse over lead AF from the 400/50 I. P. S. Counter circuit when the latter reaches the third position. Tube 14VP2 now fires the "Mark" tube 14VB2, which extinguishes the "Space" tube 14VB1, and relay CSC then releases and applies a "mark" signal of −80 v. to the junction. If the 50 I. P. S. scan tests two adjacent Storage circuits or Binary Check Count elements and finds them in the same condition, the contacts of relay CSC will not change over between the two "space" and "mark" signals.

Sending is complete when the 50 I. P. S. scan reaches the end of Level 14, and the Sender then waits for a signal from the Receiver indicating that all the information has been received correctly. This signal, referred to as the "OK" signal, takes the form of a −80 v. bias on the "return" conductor MCB of the junction. Because of the varying lengths of junctions and the possibility of intermediate tandem exchanges or repeaters in the junction, the delay between the end of sending and the reception of an OK signal may vary, and it is arranged that the time limits between which an OK signal is to be expected may be set in a Sender to cater for the particular junction it serves.

The limits are marked by the firing of the pulse repeater tube 3VP1 (Fig. 3), followed by the firing of the pulse repeater tube 5VR7 (Fig. 5A). These are arranged to fire as follows:

(*a*) For cases where the OK signal is to be expected less than 100 ms. after the end of Level 14 has been reached, tube 3VP1 (Fig. 3) is arranged to fire when the 50 I. P. S. scan reaches the "off" position of Level 15, and tube 5VR7 (Fig. 5) when the scan reaches the fifth position of Level 15.

(*b*) For cases where the OK signal is to be expected between 100 and 180 ms. after the end of Level 14 has been reached, tube 3VP1 (Fig. 3) is arranged to fire when the 50 I. P. S. scan reaches the fifth position of Level 15, and tube 5VR7 (Fig. 5A) when the scan reaches the ninth position of Level 15.

After the send is complete, pulse repeater tube 3VP1 (Fig. 3) is fired by a bias from lead 15*y* and a pulse received from the appropriate "*x*" lead. A pulse from its cathode fires pulse repeater tube 5VR6 (Fig. 5A) in the Sequence Control circuit over lead DA, and this tube in turn delivers a pulse to its corresponding counter tube 5VC6 which fires, and biases both the pulse repeater tubes 5VR8 and 5VR9. When an OK signal is received, relay REC in the Receiver Supervisory circuit (Fig. 16) operates, and connects the 400 I. P. S. pulse source to the trigger electrode of the pulse repeater tube 5VR9 (Fig. 5A) at lead PL. If this occurs before the pulse repeater tube 5VR7 fires, tube 5VR9 will fire and will strike its corresponding counter tube 5VC9, tube 3VW2 (Fig. 3) over lead AH and tube 15VC3A (Fig. 15) of the Fault and Resend circuit over lead AS.

Tube 3VW2 (Fig. 3) in firing operates relay OK which locks over its right-hand winding, self-hold contacts OK2 and lead OE to earth in the register. Contacts OK1 apply an earth signal over lead RC to the Register to indicate that the Receiver has received a correct set of information.

If the OK signal is not received by the Sender within the predetermined period, pulse repeater tube 5VR7 (Fig. 5A) is fired and pulses the pulse repeater tube 5VR8, to indicate a fault condition. This tube fires and delivers a pulse over lead AQ to the Fault and Resend circuit, where it fires tube 15VR1 (Fig. 15). It will be recalled that this tube was primed when the starting pulse applied to lead DD fired pulse repeater tube 15VR3A, which in turn fired the counter tube 15VC3. Tube 15VR1 in turn fires its corresponding counter tube 15VC1, and counter tube 15VC3 is extinguished. A pulse is also delivered over lead AP to the Sequence Control circuit where it fires the counter tube 5VC3A (Fig. 5) to indicate that a re-transmission is required. Tube 5VC3A firing causes tube 5VC6 to be extinguished and the bias is thereby removed from pulse repeater tubes 5VRE and 5VR9.

When the level 15 scan is complete, a pulse over lead AJ (Fig. 8) from the tenth position of the Contact Counter fires the first position pulse repeater tube 7VR1 (Fig. 7) of the Level Counter. This tube delivers a pulse over lead AM to pulse repeater tube 5VR4 (Fig. 5) of the Sequence Control circuit, and this tube fires. A pulse from its cathode strikes the associated counter tube 5VC4 after a delay. The first position pulse repeater tube of the Level Counter circuit also fires tube 6VE1 (Fig. 6B) of the 400/50 I. P. S. Counter circuit over lead AU.

Tube 6VE1 in firing extinguishes tube 6VE3 and thereby removes the priming bias from the first and seventh position counter tubes 6VC1 and 6VC7. At the same time tube 6VE1 applies a bias to pulse repeater tube 6VP9. This tube will now fire when the seventh position of the Level 1 scan is reached and in turn will fire counter tube 6VC9, stopping the 400/50 I. P. S. Counter in this position by extinguishing counter tube 6VC7 and thus removing the priming bias from the pulse repeater tube 6VP8. Pulse repeater tube 5VR5 (Fig. 5) of the Sequence Control circuit will be primed after the delayed firing of tube 5VC4, and will be fired by the 400 I. P. S. pulse train over contacts REC and lead PL when the Sender receives a "junction free" indication. The firing of tube 5VR5 starts the Sender in operation as previously described, and the information is transferred to the Receiver again.

If the Receiver again fails to signal that the information has been received correctly, pulse repeater tube 5VR7 of the Sequence Control circuit fires the "Faulty" pulse repeater tube 5VR8, which delivers a pulse over lead AQ to the Fault and Resend circuit. The counter tube 15VC1 (Fig. 15) is conducting and tube 15VR2 is biased. This latter tube now fires and in turn fires the counter tube 15VC2, tube 15VC1 thereby being extinguished. Tube 15VC2 now primes the "off" position pulse repeater tube 15VR3 which is fired by the 400 I. P. S. pulse train applied to its trigger electrode by lead PS1. The counter tube 15VC3 is now fired by the pulse from its pulse repeater tube 15VR3, extinguishing tube 15VC2, and a pulse is also delivered over lead AR to fire tube 5VC9A (Fig. 5A) of the Sequence Control circuit. The Sequence Control counter now rests in this position and does not resend. If after the second send the Sender receives an OK signal, this is displayed to the Register as previously described, and the Sequence Control counter is stepped to the ninth position, tube 5VC9 being fired.

The Sequence Control counter will now be in the ninth position, tube 5VC9 or 5VC9A being fired, and when the Contact Counter completes its scan of Level 15 a short time later, the Level Counter will be returned to Level 1. A bias returned from tubes 5VC9 or 5VC9A of the Sequence Control circuit over lead DE primes the pulse repeating tube 13VR4 (Fig. 13) of the Sequence Work circuit and this tube is now fired by a pulse over lead AO from the Level 1 pulse repeater tube 7VR1 (Fig. 7) of the Level Counter. Tube 13VR4 (Fig. 13) in firing fires its associated tube 13VC4 which operates relay OF and extinguishes tube 13VC3, releasing relay HTK. The Level 1 pulse repeater tube 7VR1 (Fig. 7) also delivers a pulse over lead AU to fire tube 6VE1 (Fig. 6B) in the 400/50 I. P. S. Counter circuit.

The release of relay HTK removes the HT from the anode lead DB of the OK tube 3VW2 at contacts HTK1, and if previously operated, relay OK (Fig. 3) now releases, the self-holding path over contacts OK2 having already been opened in the Register. The operation of relay OF returns a "clear" signal to the Register over contacts OF1 and tube 6VE1 (Fig. 6B) in firing resets the 400/50 I. P. S. Counter circuit to its normal position. A bias extended from tube 5VC9 or 5VC9A (Fig. 5A) of the Sequence Control circuit also primes the "off" position pulse repeater tube 5VR1 which now fires in response to the 400 I. P. S. pulse source connected over contacts REC and lead PL as soon as the junction returns a "line free" condition.

The "off" position pulse repeater tube 5VR1 of the Sequence Control circuit also applies a pulse to lead DF and fires the "reset" pulse repeater tube 13VR5 (Fig. 13) of the Sequence Work circuit. This in turn fires the associated "Reset" tube 13VC5, extinguishing tube 13VC4, releasing relay OF and operating relay RSA. Contacts RSA1 disconnect the holding earth from lead A and relay A in the Supervisory circuit, and relay A releases. Contacts A2 disconnect the holding earth from relay HTS which also releases. Relay HTS in releasing removes the HT supply from all the pulsed-HT tubes, from the Miscellaneous and Numerical Storage circuits, from the Binary Check Count circuit, from the Sequence Work circuit and from the Mark/Space binary circuit of the Send circuit. All information is now cleared from the Sender, and it is ready to be seized again by a Register.

If before the sending cycle has been completed the Register finds it necessary to clear the Sender of stored information, relay FR (Fig. 3) is operated over lead FR, and at contacts FR1 disconnects all HT supplies from the Sender. After this relay is released, the Sender can be set up in the normal way.

*Receiver*

The Receiver is set up when the HT supply is connected. In the Miscellaneous circuit (Fig. 26), tubes 26VD1 and 26VD2 fire after a delay due to the charging of capacitors C47 and C48 respectively. Tube 26VD2 (Fig. 20A) in firing applies a pulse over lead MP to tube 20VG2 in the I/C Control circuit and this tube fires. The increased current flow through resistor R40 reduces the potential drop across resistors R41, R42 thereby preventing tube 20VN1 from firing, so that the potential at the grid of the tube 20VT5 causes this tube to be cut off.

The tubes 20VT6 and 20VT7 form a screen-coupled multivibrator, the cathodes of the tubes being held at approximately +85 v. potential by means of the diode 20VN2. When the multivibrator is inoperative, tube 20VT7 conducts because of the positive bias on its grid, and tube 20VT6 is cut off because the current flow through resistors R43, R44 and tube 20VT5 holds its grid at a low potential. When tube 20VT5 is cut off, capacitor C40 discharges and the multivibrator commences to oscillate. The delay between the cut off of tube 20VT5 and the commencement of oscillation is determined by the setting of the tapping on resistor R44, and is normally arranged to be about 2.5 ms.

The multivibrator, which runs at 400 I. P. S. is locked to a crystal-controlled pulse source of 2 kc./s. square waves connected by lead PLA. The output from the anode of tube 20VT6 is taken to the grids of tubes 21VT1 (Fig. 21) and 21VT2 in the 50 I. P. S. Counter circuit via lead PLB. These two tubes provide respectively the triggering pulses and the anode controlling potentials for the tubes of the 50 I. P. S. Counter.

Tube 26VD1 (Fig. 26) firing in the Miscellaneous circuit delivers a pulse over lead MQ which fires tube 21VC1A (Fig. 21) in the first position of the 50 I. P. S. Counter circuit, tube 27VR2A (Fig. 27) in the second position of the Sequence Counter circuit, tube 23VC0A (Fig. 23) in the Contact Counter circuit, tube 22VR15A (Fig. 22) in the Level Counter circuit, and tube 32VB1A (Fig. 32) of the Check Miscellaneous circuit. In the cathode circuit of tube 26VD1 (Fig. 26), resistor R46 and capacitor C46 limit the initial current surge through the tube.

In the 50 I. P. S. Counter circuit (Figs. 21 and 21A), tube 21VC1A firing primes the second position pulse repeater tube 21VR2 which is fired by the next 400 I. P. S. positive pulse at the anode of tube 21VT1. On firing, tube 21VR2 delivers a pulse to its associated counter tube 21VC2 which fires and extinguishes tube 21VC1A. The third position pulse repeater tube 21VR3 is primed, and fires on receipt of the next 400 I. P. S. pulse from the anode of tube 21VT1. The negative excursions of the anode of tube 21VT2 extinguish the pulse repeating tubes after each has delivered its cathode pulse and the counter proceeds to run in this way at 400 steps per second.

In the Sequence Counter (Fig. 27), tube 27VR2A in firing applies a pulse to the second position counter tube 27VC2, which fires. A pulse is also delivered over lead LM to the Sequence Work circuit (Figs. 28 and 28A), where it fires tube 28VW1 to operate relay RHT. Contacts RHT1 release the operated relay RBA and apply HT to tubes 25VT3 to 25VT5 of the Pulse circuit (Fig. 25) over lead MW, to tubes 23VT1, 23VT2, 23VR0 to 23VR10 and 23VR1A to 23VR10A of the Contact Counter circuit (Fig. 23) over lead MX, and to tube 20VD2 of the I/C Control circuit (Fig. 20) over lead MV. In the Sequence Work circuit (Figs. 28 and 28A) the release of relay RBA releases relay RC in the Supervisory circuit by removing the earth applied from the Register over lead TN (Fig. 28A), contacts RBA1, lead MO, (Figs. 28A and 20) contacts LD1, lead MN (Figs. 20 and 24) and thence to the right-hand winding of relay RC. Contacts RC1 normal now return a +80 v. busy condition to the junction on the "return" conductor MCB.

In the Contact Counter circuit (Fig. 23), tube 23VC0A in firing sets the counter in the "off" position, and primes the first position pulse repeating tubes 23VR1 and 23VR1A controlling the "SX" and "CX" leads.

In the Level Counter circuit (Fig. 22), tube 22VR15A in firing delivers a pulse to the Level 15 counter tube 22VC15 which fires, priming the Level 1 pulse repeater tube 22VR1.

In the Check Miscellaneous circuit (Fig. 32), tube 32VB1A in firing sets the binary pair 32VB1, 32VB2, in the "1," or lefthand, position.

The 50 I. P. S. Counter (Figs. 21, 21A) has eight stages in a closed ring, and because it is driven by a 400 I. P. S. source, the recurrence frequency of pulses provided by the cathode of any one of its pulse repeaters is 50 I. P. S. Pulses from the cathode of the fifth position pulse repeater tube 21VR5 fire the fifth position counter tube 21VC5, and are also applied to the grid of the cathode follower tube 21VT3. This tube delivers 50 I. P. S. pulses over lead LH to the Sequence Counter circuit (Figs. 27, 27A and 27B), over lead LK to the Contact Counter circuit (Fig. 23) and over lead LG to the Pulse circuit (Fig. 25). Pulses are also applied directly from the pulse repeater tube 21VR5 (Fig. 21A) to tube 25VT1 (Fig. 25) of the Pulse circuit over lead LF.

Pulses from the 50 I. P. S. Counter circuit fed over lead LG, drive the pulse inverting tube 25VT2, whose anode circuit output controls the grids of the three pulsed-HT supply tubes 25VT3 to 25VT5 of the Pulse circuit. The potentials on each of the three pulsed-HT leads PHTR, PHTS, PHTT are arranged to swing between approximately +180 v. and +50 v. as the grid of its controlling tube is driven negative or positive respectively by tube 25VT2.

Pulses from the 50 I. P. S. Counter circuit fed over lead LK (Fig. 21A) drive the Contact Counter (Fig. 23) at 50 I. P. S., the pulse repeater tubes 23VR0 to 23VR10 firing to successive pulses after being primed by the preceding counter tube. In parallel with tubes 23VR1 to 23VR10 are further pulse repeater tubes 23VR1A to 23VR10A, pulsed synchronously with the former via lead MG. These tubes apply "*cx*" pulses to leads 1*cx* to 10*cx* in turn, while the pulse repeater tubes 23VR0 to 23VR10 apply "*sx*" pulses to leads 0*sx* to 10*sx* in turn. The Level Counter (Fig. 22), resting on Level 15, to which it was set by the pulse received over lead MQ, applies a priming bias over lead 15*y* to all tubes associated with Level 15, and these are scanned in turn by the Contact Counter.

In the Sequence Work circuit (Figs. 28 and 28A), pulse repeating tubes 28VP3 and 28VP5 to 28VP7 are associated with Level 15 of the Level counter, and these are fired in turn by pulses from leads 2*sx*, 6*sx*, 7*sx* and 9*sx*. When position 2 of the Contact Counter is reached, tube 28VP3 in firing applies a pulse to its corresponding counter tube 28VG2, which fires. When position 6 is reached, pulse repeater tube 28VP5 fires, and in turn fires its associated counter tube 28VW5, which extinguishes tube 28VG2 because of the common anode resistor R48, and operates relay Z. Relay Z at contacts Z1 disconnects HT from the Storage tubes (Fig. 30) of the scanning field at MZ and applies a high potential to lead MC. This is taken to the trigger electrodes of all the tubes such as 30VB2 (Fig. 30) of the binary check circuit, and these tubes fire.

When position 7 of the Contact Counter is reached, pulse repeater tube 28VP6 (Fig. 28A) of the Sequence Work circuit fires, and in turn fires its associated counter tube 28VW6. Tube 28VW5 is thereby extinguished, releasing relay Z, and the firing potential is now removed from lead MC and the Storage tubes of the scanning field have their HT supply restored. Tube 28VW6 in firing operates relay CT, whose contacts are ineffective at this stage. When position 9 is reached, pulse repeater tube 28VP7 fires and in turn fires its associated counter tube 28VG3, which extinguishes tube 28VW6, releasing relay CT.

In the 50 I. P. S. Counter circuit, at the end of the first cycle, the eighth position pulse repeater tube 21VR8 delivers a pulse over lead LL to fire tube 32VB2 (Fig. 32) in the Check Miscellaneous circuit. Previously tube 32VB1A was fired, and a voltage established across diode 32VN1. The cathode pulse resulting from the firing of tube 32VB2 now breaks down tube 32VN1, and extinguishes tube 32VB1A, and the subsequent rise in potential at resistor R51 is sufficient to fire tube 32VG1. This tube now applies a priming bias over lead LW to tube 27VR9B (Fig. 27B) of the Sequence Counter circuit. It should be noted that rectifiers MR6, MR7 and MR8 (Fig. 32) are connected between trigger electrode and cathode of tubes 32VB1, 32VB1A and 32VB2 to prevent any of the minor gaps from firing in the reverse direction when another of the tubes fires. Rectifier MR9 is provided for pulse limiting.

At the end of the Level 15 scan when the pulse repeater tubes of the Contact (Fig. 23) Counter reach the tenth position, the cathode follower 23VT3 is caused to conduct momentarily, and provides the 10*sx* scanning pulse as well as firing the tenth position counter tube 23VC10. A pulse from the 10*sx* lead now fires the Level 1 pulse repeater tube 22VR1 (Fig. 22) of the Level Counter circuit, which has been primed from the Level 15 counter tube 22VC15. The Level 1 counter tube 22VC1 is now fired by its pulse repeater tube, priming all the tubes associated with lead 1*y*, and priming the Level 2 pulse repeating tube 22VR2. In the Sequence Counter (Fig. 27B), pulse repeater tube 27VR10 is connected to the bias lead 1*y* and pulse lead 0*sx*, and therefore fires after the 50 I. P. S. scan has completed Level 15 but before it reaches position 1 of Level 1. A pulse from its cathode fires counter tube 27VC10 which primes the "off" position pulse repeater tube 27VR1 and extends a bias over leads LY (Figs. 27B and 33) and LD (Figs. 33 and 20) in series to the grid of tube 20VT4 in the I/C Control circuit. This tube, which was previously cut off, now conducts, and extinguishes tube 20VG2 by reducing its anode potential. The "off" position pulse repeater tube 27VR1 (Fig. 27) of the Sequence Counter will be fired by the next pulse from the 50 I. P. S. Counter circuit over lead LE, and in turn delivers a pulse to the "off" position counter tube 27VC1 which fires, and to lead LP which takes it to the trigger electrode of tube 28VG1 in the Sequence Work circuit (Fig. 28). This tube fires and extinguishes tube 28VW1 thus releasing relay RHT. Tube 28VG1 is self-extinguishing.

Relay RHT in releasing removes HT from the anodes of tube 20VD2 (Fig. 20) of the I/C Control circuit and the pulsed-HT tubes 25VT3 to 25VT5 (Fig. 25) of the Pulse circuit, and applies HT to the anode of tube 20VD1 (Fig. 20) of the I/C Control circuit. Contacts RHT1 (Fig. 28) also complete a circuit for relay RBA which operates and extends earth from the register applied to lead TN over lead MO (Figs. 28A and 20), contacts LD1, lead MN (Figs. 20 and 24) to the right-hand winding of relay RC in the Supervisory circuit. This relay operates and applies a −80 v. "free" signal to the junction on the "return" leg MCB.

The firing of the "off" position counter tube 27VC1 (Fig. 27) of the Sequence Counter extinguishes tube 27VC10, removing the bias over leads LY and LD from tube 20VT4 (Fig. 20) in the I/C Control circuit. Tube 20VT4 is now cut off, and the rise in anode potential causes tube 20VN1 to conduct. The resulting positive potential on resistor R42 is applied to the control grid of tube 20VT5 which conducts and the reduced anode voltage causes a reduction in the control grid potential of tube 20VT6 whereby the multivibrator is prevented from operating. The scan is therefore stopped on Level 1 before position 1 is reached, and the Receiver is ready to accept impulses from the Sender.

The normal or "mark" signal on the incoming leg MCA of the junction is −80 v., which changes to +80 v. in the "space" condition. The first space signal received biases positively the grid of tube 20VT1 of the I/C Control circuit. This tube conducts and cuts off the previously conducting tube 20VT2, allowing its anode voltage to rise sufficiently to fire tubes 20VD1 and 2VD2. These tubes fire after a delay as previously explained. Tube 20VD1 fires first and applies a pulse to tube 20VG1, which fires, and also applies a pulse over lead LB to the pulse repeating tube 27VR2 (Fig. 27) in the Sequence Counter circuit. This tube is primed by the "off" position counter tube 27VC1, and now fires, firing in turn the second position counter tube 27VC2 and applying a pulse over lead LM to tube 28VW1 (Fig. 28) in the Sequence Work circuit. This tube fires and operates relay RHT, whose contacts apply HT to the pulse repeating tubes of the Contact Counter circuit and to the pulsed-HT tubes of the Pulse circuit. Relay RBA is released by contacts RHT1, and contacts RBA1 release relay RC (Fig. 24) in the Supervisory circuit, which now returns a +80 v. busy signal to the Sender. Contacts RHT1 (Fig. 28) also apply HT to tube 20VD2 (Fig. 20) in the I/C Control circuit and remove HT from tube 20VD1, which now extinguishes.

The firing of tube 20VG1 causes tube 20VN1 to be extinguished thereby cutting off tube 20VT5. The anode voltage thus rises and when capacitor C40 discharges, the control grid voltage of tube 20VT6 rises and the multivibrator begins to oscillate. This now starts to drive the 50 I. P. S. Counter which is resting in the first position. It is arranged that the total time taken for this counter to reach the fifth position from the instant the first space signal commences is 10 ms., this period including the delay before the multivibrator was started. The first 50 I. P. S. pulse driving the Contact Counter to its first testing position therefore appears 10 ms. after the commencement of the incoming impulse, and since the signal impulses are 20 ms. wide, the tests are always made in the middle of the signal.

The delay before tube 20VD2 fires is arranged to be about 5 or 6 ms., so that a spurious pulse of short duration appearing on the junction will not cause the tube to fire. In this case, the Sequence Counter remains in the second position, tube 27VC2 (Fig. 27) being fired and tube 27VR4 being primed, and the latter tube fires on receipt of a pulse from the 50 I. P. S. Counter circuit over lead LH. The Sequence Counter is then moved into the fourth position, when tube 27VR4 causes tube 27VC4 to fire, and the Receiver will subsequently restore to its normal condition, without returning an "OK" signal to the Sender.

In the case of a genuine message, tube 20VD2 (Fig. 20) in firing delivers a pulse over lead LC to the Sequence Counter circuit where it fires the pulse repeater tube 27VR3 which has been primed from the counter tube 27VC2. The pulse repeater tube fires its associated counter tube 27VC3, which then primes tube 27VR4A and the pulse repeater tube 27VR5.

When the 50 I. P. S. Counter reaches the fifth position it delivers a pulse via its cathode follower tube 21VT3 (Fig. 21A) and lead LK to step the Contact Counter (Fig. 23) on to its first position. A pulse is also applied over lead LF to the cathode follower 25VT1 in the Pulse circuit (Fig. 25). This tube acts as a gating circuit for the *"cx"* pulses produced by the Contact Counter circuit, and determines whether or not a particular *"cx"* pulse shall be applied to the VF1 tubes of the Prefix elements, Binary Check circuit and Miscellaneous and Numerical Storage circuits, which constitute the scanning field.

Tube 25VT1 is controlled by the condition of the incoming side of the junction. If a space signal is being received, tube 20VT1 (Fig. 20) conducts, tube 20VT2 is cut off and HT bias is fed to the Pulse (Fig. 25) circuit over lead LA. This blocks the rectifier MR5 to make it non-conducting in the forward direction to pulses received over lead LF, and such pulses are effective on the grid of the tube. When a mark signal is being received, tube 20VT1 (Fig. 20) is cut off, tube 20VT2 conducts, and the bias fed to lead LA is much below the HT potential. Rectifier MR5 (Fig. 25) now shunts pulses received from lead LF into capacitor C45 so that such pulses are ineffective on the grid of tube 25VT1.

The scans in the Sender and Receiver run over corresponding circuits at the same speed but slightly out of step because of the transit time of the junction. It is arranged that *"cx"* pulses are only produced for those points in the scanning field which correspond to conducting storage tubes in the Sender, and while the Contact Counter continues to be stepped by 50 I. P. S. pulses received over lead LK, only those "A" tubes, 23VR1A, 23VR2A (Fig. 23) and so on, that are primed when a space signal is being received, are fired by a pulse from lead MG.

In the scanning field, the first four tubes to be scanned are part of the Prefix elements. These are provided to ensure that a genuine message is being received, and each message is preceded by a fixed pattern of pulses which is readily distinguished from a series of spurious pulses which might appear on a junction. The pattern used in the embodiment shown in the drawing is:

space—space—mark—space for the first four signals. If this is received correctly the Receiver is conditioned to accept the remainder of the message.

Figure 29:
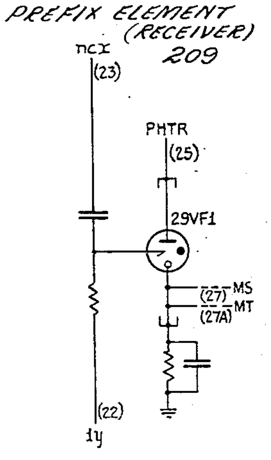
Fig. 29 shows the circuit of a Prefix Element for use with the Receiver.

As the first four tubes are scanned, pulses are delivered to the *"cx"* leads corresponding to space signals received, and if the correct sequence is received, pulses are applied over leads $1cx$, $2cx$ and $4cx$ to the first, second and fourth Prefix element tubes 29VF1 (Fig. 29), which are primed by lead $1y$. These tubes fire in turn, and each delivers a pulse to a common lead extending to the trigger electrodes of the pulse repeating tubes 27VR5 to 27VR7 (Fig. 27A) of the Sequence Counter, which fire in succession and fire their corresponding counter tubes 27VC5 to 27VC7. If a correct prefix signal has been received, the counter tube 27VC7 will remain conducting and will prime the pulse repeating tube 27VR8.

If an incorrect prefix signal is received, either the fourth scanning pulse will not step the Sequence Counter to the seventh position, or the third scanning pulse will be allowed through the gating tube 25VT1 by a spurious space signal and the third Prefix element tube 29VF1 (Fig. 29) will be fired by pulse $3cx$. If any of the counting tubes 27VC3, 27VC5 and 27VC6 (Fig. 27) remains conducting after the scan has completed Level 1, one of the tubes 27VR4A to 27VR4C will be primed. Before position 1 of Level 2 is reached, tube 26VF1 (Fig. 26) in the Miscellaneous circuit is fired by the $0sx$ pulse, and delivers a pulse over lead MR to tubes 27VR4A to 27VR4C (Fig. 27). If an incorrect prefix signal has been received, either one of these tubes is fired, or the third Prefix element tube fires, and a pulse is delivered over the common lead LR to the Level Counter circuit where it fires the Level 15 tube 22VC15A (Fig. 22). The Level Counter is therefore moved direct to Level 15, and the Storage tubes are not scanned. In this case, no "OK" signal will be returned to the Sender, and the Receiver will restore to its normal condition.

Returning to the case where a correct prefix signal is received, tube 27VC7 (Fig. 27) of the Sequence Counter is fired, priming the pulse repeating tube 27VR8. Tubes 30VF1 (Fig. 30) in the Binary Check circuit elements are associated with Level 1 and are now scanned in turn, and those which receive a *"cx"* pulse will be fired in accordance with the number received from the Binary Check Count circuit in the Sender. The tubes which fire cause their associated tube 30VE1 to fire, extinguishing the corresponding tubes 30VB2 by the generated cathode pulse. Relay BHT (Fig. 28) in the Sequence Work circuit is at present unoperated, and tubes 30VB1 (Fig. 30) in the elements of the Binary Check circuit will therefore not have HT connected to their anodes. Pulses passed from one binary element to the next via leads MK and ML due to the firing of tubes 30VE1 and 30VN1 will therefore be ineffective.

Reverting to the element shown in Fig. 9 at the Binary Check Count circuit in the Sender, this circuit is in its zero position when the left-hand tubes such as 9VBA1 of the binary pairs are conducting. A "space" signal is transmitted for each element in which the right-hand tube such as 9VBB1, is conducting. In the Binary Check circuit in the Receiver, on the other hand, the reception of a "space" signal causes the right-hand tube of the appropriate pair to be extinguished. It will thus be seen that effectively the number stored in the Binary Check circuit in the Receiver is the complement to the maximum number which may be counted by the circuit of the number stored in the Binary Check Count circuit in the Sender. If now the Binary Check circuit counts the number of "ones" in the Numerical information transmitted from the Sender, the circuit should be in its position of maximum count i. e. with all 30VB2 tubes conducting at the end of the transmission of this information.

The Miscellaneous and Numerical Storage circuits are now scanned in turn, and in those which receive a "*cx*" pulse, tube 31VF1 fires. This tube in firing, fires the tubes 31VG1 (Fig. 31) and 31VS1 in the same Storage circuit. When a tube 31VS1 fires it primes its corresponding tube 31VW1, but this tube does not fire until relay TR in the Supervisory circuit (Fig. 24) operates later. A tube 31VG1 in firing causes a voltage rise at its cathode load R45 (Fig. 26) which is common to all such tubes, and a pulse is applied to lead ML of the Binary Check circuit, in the case of Numerical Storage circuits, and to lead NL of the Check Miscellaneous circuit in the case of Miscellaneous Storage circuits.

It should be explained that the Miscellaneous information is stored on groups of tubes and it is arranged that only one tube is fired in any group. The circuit shown in Fig. 32 belongs exclusively to one group and at this time tubes 32VB2 and 32VG1 will be conducting as previously described and a priming potential will thus be applied over lead LW to tube 27VR9B (Fig. 27B). Now assume that the first tube in the group is fired so that a pulse will be applied over lead NL (Figs. 26 and 32) to the trigger electrode of tube 32VG2. This pulse is also applied over lead LV (Figs. 32 and 27B) to tube 27VR9A but is without effect since the priming potential for this tube is obtained from the cathode of tube 32VG2 (Fig. 32) which is non-conducting at this time. Tube 32VG2 however strikes to the pulse over lead NL and extinguishes tube 32VG1. A priming potential is now applied to tube 27VR9A (Fig. 27B) over lead LU and the priming potential previously applied to tube 27VR9B over lead LW is removed.

It will first be assumed that the reception is correct so that no further pulses will be applied to lead NL. Coincident with the *cx* pulse corresponding to the fourth tube of the group, an *sx* pulse is applied to the common tube 32VF1 (Fig. 32). This tube now strikes and applies a pulse to tube 32VB1 which also strikes. Further as the 50 I. P. S. counter reaches the succeeding eighth position, tube 32VB2 is fired by a pulse over lead LL and extinguishes tube 32VB1. Tube 32VN1 now strikes as previously described and applies a pulse to tube 32VG1 which strikes and to tube 27VR9B (Fig. 27B) which does not strike since its priming potential is supplied from the cathode of tube 32VG1 which at this moment is non-conducting. The striking of tube 32VG1 extinguishes tube 32VG2 and again applies a priming potential to tube 27VR9B (Fig. 27B) but this is without effect. Hence neither of the tubes 27VR9A and 27VR9B are struck indicating correct reception.

If, however, a second pulse is applied over lead NL (Fig. 32), tube 32VG2 will still be conducting from the previous pulse and tube 27VR9A (Fig. 27B) will thus be primed over lead LU. Also the second pulse will pulse tube 27VR9A over lead LV and this tube will strike and the Sequence counter will be stopped in the "fault" position due to tube 27VC9 being fired. No information can thus be transferred to the I/C Register and the Receiver would not return an "OK" signal to the Sender. The Receiver would then restore to its normal condition as will be explained later.

If no pulses are applied to lead NL, tube 32VG1 (Fig. 32) will remain conducting and the priming potential will continue to be applied to tube 27VR9B (Fig. 27B). Hence when tube 32VN1 (Fig. 32) strikes as previously explained, a pulse is applied to lead LX and tube 27VR9B (Fig. 27B) strikes with the same result as the striking of tube 27VR9A.

In preparation for the scanning of the Numerical Storage circuits, pulse repeating tube 28VP1 (Fig. 28) is fired by a pulse and bias applied over leads 1*sx*, 3*y*. A pulse is passed to the associated counter tube 28VW2 which fires and operates relay BHT. This connects HT to the anodes of tubes 30VB1 (Fig. 30) in the Binary Check circuit over lead MZ, and this circuit is now able to function as a normal binary counter. The Numerical Storage circuits are scanned in the same manner as the Miscellaneous Storage circuits, tubes 31VF1 (Fig. 31) firing if they receive a "*cx*" pulse from the gating circuit. Those tubes 31VF1 which fire, in turn fire the associated tubes 31VG1 and 31VS1, and tube 31VW1 is primed. Tubes 31VG1 in the Numerical Storage circuits have a common cathode load R45 (Fig. 26), to which they are connected by leads MM, and each time a tube 31VG1 (Fig. 31) fires, a pulse is delivered over lead ML (Figs. 26 and 30) to the Binary Check circuit.

It will be recalled that the binary counter has been set to register the complement of the count stored in the Binary Check Count circuit to the Sender, and at the end of the scan of Numerical Storage circuits, the counter should have been driven to register its maximum count, i. e. all the tubes 30VB2 (Fig. 30) should be conducting. At this point tube 26VP1 (Fig. 26) is fired by a pulse and bias from leads 8*sx*, 9*y*, and delivers a pulse over lead LT to tube 27VR9 (Fig. 27B) in the Sequence Counter circuit. If the count of received numerical information corresponds with the Binary Check Count pattern received earlier, tube 27VR9 will not be primed and therefore does not respond to this pulse. If, however, there is a discrepancy between the counts in the Sender and the Receiver, the 30VB1 tube (Fig. 30) in one or more of the binary elements will be conducting, and a bias will be extended over leads MJ and LS (Fig. 26) in series to tube 27VR9 (Fig. 27B) in the Sequence Counter circuit, and this tube will fire to the pulse received over lead LT. This in turn would fire the counter tube 27VC9. The Register would then be cleared of information, and the Receiver would restore to its normal condition, no "OK" signal being returned to the Sender.

After the Miscellaneous and Numerical Storage circuits have been scanned, tube 26VP2 (Fig. 26) is fired from a pulse and bias received from leads 0*sx*, 15*y*, i. e. just before the Level 15 scan commences. Tube 26VP2 in firing delivers a pulse over lead LN to the Sequence Counter circuit, where it fires the pulse repeater tube 27VR8 (Fig. 27A) which has been primed by the counter tube 27VC7. Pulse repeater tube 27VR8 in firing, applies a pulse to its associated counter tube 27VC8 which fires, and also applies a pulse via lead LO to the Sequence Work circuit, where it fires the pulse repeating tube 28VP2 (Fig. 28). This tube applies a pulse to its associated work tube 28VW3 which fires and operates relay OK.

Relay OK in operating at contacts OK1 and OK2 completes circuit over leads NA and NB respectively for relays RC and WA (Fig. 24). The operation of relay RC returns an "OK" signal to the Sender by connecting −80 v. to the return leg MCB of the junction at contacts RC1. Relay WA locks to an earth connection in the I/C Register over lead DT and its self-holding contacts WA1, and contacts WA2 now apply an earth signal to the I/C Resister over lead ST to indicate that the Receiver is now ready to transfer its information to the Register. Contacts WA3 disconnect HT from lead ME and tube 26VD2 (Fig. 26) which extinguishes.

In the Sequence Work Circuit (Fig. 28), the counter tube 28VW3 in firing, applies a bias over leads LZ (Figs. 28 and 33) and LD (Figs. 33 and 20) in series to the I/C Control circuit to bias tube 20VT4 (Fig. 20) into a conducting state. Tube 20VG1 is thereby extinguished. The firing of the 27VC8 (Fig. 27B) counter tube in the Sequence Control circuit applies a bias over lead LQ to prime the pulse repeating tube 28VP4 in the Sequence Work circuit (Fig. 28).

The scan continues on Level 15 until the pulse repeating tube 28VP3 is reached by pulse 2*sx*. This tube in turn fires its associated tube 28VG2, and the work tube 28VW3 is thus extinguished. The bias is thereby removed from leads LZ and LD, tube 20VT4 (Fig. 20) is cut off, and a positive bias is extended to the grid of tube 20VT5 to stop the oscillations of the multivibrator as previously explained. The scan therefore stops on Level 15, position 1.

The I/C Register now signals to the Receiver that it is ready for the information to be transferred. The Register removes the holding earth of relay WA (Fig. 24) from lead DT and relay WA releases. HT is restored to the anode and trigger of tube 26VD2 (Fig. 26) over contacts WA3 and lead ME, and this tube fires. A pulse from its cathode is applied to tube 20VG2 (Fig. 20A) which fires, allowing the multivibrator to start oscillating. The 50 I. P. S. Counter is driven as before, and the scanning cycle is completed. A pulse from tube 26VD2 (Fig. 26) is also applied to the Transfer pulse repeater tube 28VP4 (Fig. 28) of the Sequence Work Counter, which was primed over lead LQ from the 27VC8 counter tube (Fig. 27B) of the Sequence Counter, and tube 28VP4 (Fig. 28) now fires. This in turn fires tube 28VW4 which operates relay TO.

Relay TO in operating at contacts TO1 connects earth to lead ND (Figs. 28A and 24) to operate relay TR (Fig. 24), and relay TR operates and connects the HT supply to the windings of the I/C Register storage relays at leads such as OT and to the anodes of the tubes 31VW1 (Fig. 31) of the Miscellaneous and Numerical Storage circuits via further leads NG (Figs. 24 and 31). Relay TR (Fig. 24) also applies HT to the triggers of all these tubes via contacts TR1 and leads NJ (Figs. 24 and 31), and those which have previously been primed by their associated tubes 31VS1 now fire and operate their storage relays in the Register.

When the Level 15 scan reaches lead 6*sx*, the pulse repeater tube 28VP5 (Fig. 28A) in the Sequence Work Counter circuit fires, and in turn fires its associated work tube 28VW5 which operates relay Z and extinguishes the work tube 28VW4. Relay TO therefore releases, causing relay TR (Fig. 24) to release by removing earth from lead ND. The contacts of this latter relay now remove HT from all the tubes 31VW1 (Fig. 31) of the Storage circuits and these tubes extinguish. Relay Z (Fig. 28A) in operating removes HT from the "Early Transfer" binary circuit (Fig. 33) and from the tubes 30VE1 (Fig. 30) of the Binary Check circuit at lead MY, and resets this latter circuit by firing the tubes 30VB2 over lead MC.

When the Level 15 scan reaches lead 7*sx*, the pulse repeater tube 28VP6 (Fig. 28B) in the Sequence Work Counter circuit fires and delivers a pulse to its associated work tube 28VW6 which also fires and operates relay CT, at the same time extinguishing work tube 28VW5 which releases relay Z. Relay CT in operating extends a clearance signal to the I/C Register over lead CT. The scan proceeds to lead 9*sx*, when pulse repeater tube 28VP7 fires and in turn fires the tube 28VG3. This latter tube in firing extinguishes work tube 28VW6, releasing relay CT. The Contact Counter moves to the last position, and the Receiver resets itself as already described, returning a free signal to the junction indicating that it is now ready to receive a further transmission.

Provision is made for supervisory signals to receive a double check as to their accuracy. These signals are sent in coded form, and are received by the Miscellaneous Storage circuits. Such a signal may, for instance, comprise two groups of two pulse positions, with a single pulse appearing in each group. A pulse appearing in the first position in each group would then signify an "A" condition, and a pulse in the second position in each group, a "B" condition. It will be seen that if in an incorrect signal a pulse appeared in, say, the first position in the first group and the second position in the second group it would represent neither "A" nor "B" but would be passed as correct by the Check Miscellaneous circuit because this circuit only tests for the presence of one pulse in each group.

Because of the importance of such signals, it is arranged that the appropriate Miscellaneous Storage circuits shall make a second check. In such circuits, it is arranged that the element which receives the first pulse in the pattern, conditions the element which is to receive the second pulse in the pattern and if the second pulse appears in an incorrect position, it is not registered in the Check Miscellaneous circuit and a fault is signalled. In the examples mentioned, the trigger electrode of the tubes 31VG1 (Fig. 31) of the storage elements comprising the second group would be disconnected from their resistors R50 and connected instead via leads MA and MD to the cathodes of the tubes 31VS1 of the corresponding storage elements comprising the first group. The tubes 31VG1 of the first group would be normally primed.

In this arrangement, assuming a supervisory signal of the "A" type were being received, tube 31VF1 of the first element of the first group would fire and apply pulses to tubes 31VG1 and 31VS1. These two tubes would fire, delivering a pulse to the Check Miscellaneous circuit (Fig. 32) over lead MM.

If the signal were correct, the next "*cx*" pulse would be received by the tube 31VF1 (Fig. 31) of the first element in the second group, and this would fire, applying pulses to tubes 31VG1 and 31VS1. Both these tubes would now fire, because tube 31VG1 would be primed from the tube 31VS1 of the first element of the first group, and a pulse would again be passed to the Check Miscellaneous circuit over lead MM. In the case of an incorrect signal, where the second "*cx*" pulse was received, for example by the tube 31VF1 of the second element of the second group, the pulse applied to its corresponding tube 31VG1 would be ineffective because this tube would not be primed. A pulse would therefore not be transmitted to the Check Miscellaneous circuit and tube 28VR9A (Fig. 27B) of the Sequence Counter circuit would fire from a combination of pulse and bias, moving the counter to the "Faulty" position by firing tube 27VC9. Similar considerations apply to other incorrect supervisory signals which would be passed as correct by the Check Miscellaneous circuit.

Figure 33:
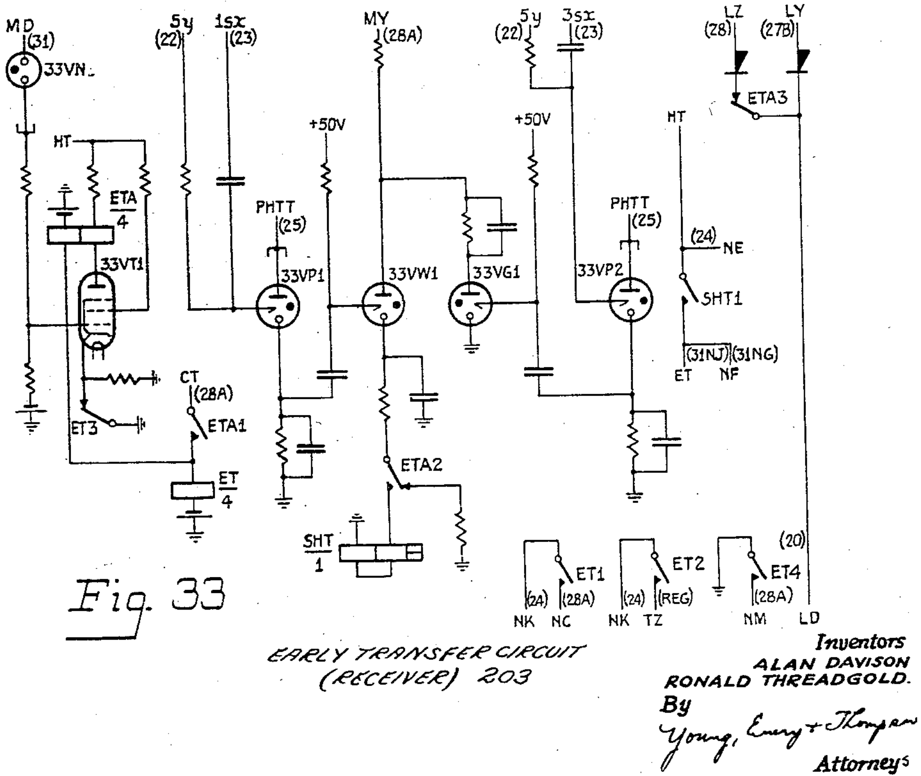
Fig. 33 shows the Early Transfer circuit.

Certain of the transmitted information may be of such a nature that it can be used at the receiving station before the transmission is complete, and provision is made for the Receiver to recognise such information and transfer it to the Register while the remainder of the message is still being stored. An "early transfer" signal inserted in the message is received by a Miscellaneous Storage circuit (Fig. 31) whose tube 31VS1 has its cathode connected over lead MD to the Early Transfer circuit (Fig. 33). When such a tube 31VS1 (Fig. 31) fires, tube 33VN1 (Fig. 33) is fired and the grid of tube 33VT1 is biased positively. This tube conducts, operating relay ETA which at contacts ETA1 connects a holding circuit for itself to earth over contacts ETA1, lead CT (Figs. 33 and 28A) and contacts CT1 (Fig. 28A), and also operates relay ET (Fig. 33). Relay ET at contacts ET3 disconnects the short-circuit from the current limiting resistor in the cathode circuit of tube 33VT1. Contacts ETA3 disconnect the cathode of the 28VW3 counter tube (Fig. 28) of the Sequence Work Counter circuit at lead LZ (Figs. 33 and 28) from the grid of tube 20VT4 (Fig. 20) of the I/C Control circuit at lead LD (Figs. 33 and 20).

When all the storage elements whose information is subject to early transfer have been scanned, tube 33VP1 is fired by a pulse and bias coincidence from leads 1*sx*, 5*y* and applies a pulse to tube 33VW1. This tube fires and relay SHT is operated over contacts ETA2 operated. Contacts SHT1 are connected in parallel with contacts TR1 (Fig. 24) in the HT supply of the tubes 31VW1 of all the Storage circuits requiring early transfer, and the operation of relay SHT (Fig. 33) at contacts SHT1 connects HT to leads ET and NF, corresponding to leads NJ and NG (Fig. 24) and causes such early transfer tubes as are primed to fire and operate their anode-connected storage relays in the Register.

This transfer of information is completed by the time the Contact Counter has taken two steps, when tube 33VP2 is fired by a pulse and bias coincidence on leads 3*sx*, 5*y*. Tube 33VG1 then receives a pulse and fires, extinguishing tube 33VW1 and releasing relay SHT. Those tubes 31VW1 which have just fired in certain Storage circuits are now extinguished by the removal of HT from their anodes at contacts SHT1.

At the end of the message, if the Receiver has checked that the message is correct, relay OK (Fig. 28) operates and at contacts OK1 extends earth to the I/C Register via leads NA (Figs. 28A and 24) and OK and to relay RC which operates, and via lead NK (Figs. 24 and 33) contacts ET1 operated lead NC (Figs. 33 and 28A) TO1 normal and lead ND (Figs. 28A and 24) to operate relay TR. Relay TR in operating applies HT to the tubes 31VW1 of the Storage circuits, and those tubes which have been primed now fire and operate their associated storage relays in the Register.

When Level 15 is reached, tube 28VP3 (Fig. 28) of the Sequence Work Counter will be fired by a pulse from lead 2*sx*, but tube 28VP4 is not used because when early transfer is required, relay WA (Fig. 24) is not operated due to the operation of relay ET (Fig. 33), and no transfer pulse is generated by tube 26VD2 (Fig. 26). Relays Z and CT (Fig. 28A) in the Sequence Work Counter operate normally, and the operation of relay CT removes the holding earth from relay ET and ETA in the Early Transfer circuit (Fig. 33). These relays release, and the Early Transfer and Supervisory circuits are now restored to their normal condition. The Receiver completes its cycle as previously described.

If during the normal part of the message the Receiver finds that there is a fault, relay OK (Fig. 28) is not operated and the normal part of the message is not transferred to the Register. Relay CT operates and applies a clearance earth to the Register.

What is claimed is:

1. In an electrical signalling system for transmitting messages from a sender to a receiver in a code consisting only of the digits "0" and "1," checking arrangements comprising a first binary counting circuit at said sender and having a predetermined number of stages, a second binary counting circuit at said receiver and having the same number of stages as said first binary counting circuit, storage elements at said sender each storage element storing one digit, scanning means for applying scanning potentials to said storage elements successively, means responsive to a first operation of said scanning means for applying scanning potentials to said storage elements for storing digits therein, means responsive to the storing of a "1" digit in a storage element for applying a pulse to said first binary counting circuit whereby said first binary counting circuit counts the number of "1" digits in the message, means responsive to a second operation of said scanning means for applying scanning potentials successively to the stages of said first binary counting circuit, and to said storage elements, a send circuit in said sender, means in each stage of said first binary counting circuit responsive to the application of scanning potentials thereto for controlling said send circuit to transmit to said receiver the number counted by said first binary counting circuit, means in each storage element responsive to the second application of a scanning potential thereto for controlling said send circuit to transmit to said receiver digits corresponding to the digits stored therein, means at said receiver for injecting into said second binary counting circuit the complement of the number counted by said first binary counting circuit and transmitted to said receiver and means responsive to the reception of the message for applying pulses to said second binary counting circuit equal to the number of "1" digits in the message received whereby correct reception of the complete message is indicated by the counting out of said second counting circuit.

2. Checking arrangements as claimed in claim 1 and comprising in addition at said receiver an incoming control circuit to which said number and said message are applied storage elements, each storage element storing one digit and potential generating means controlled by said incoming control circuit to apply potentials to the stages of said second binary counting circuit to inject the complement of said number into said second binary counting circuit and to apply potentials to said storage elements at the receiver to store the digits transmitted to said incoming control circuit.

3. Checking arrangements as claimed in claim 1 wherein each stage of said first and second binary pulse counting circuits comprises first and second gas discharge tubes connected to form a binary pair, means in said sender for initially applying ignition potentials to the first gas discharge tubes in the stages of said first binary counting circuit, means in said receiver for initially applying ignition potentials to the second gas discharge tubes in the stages of said second binary counting circuit, means responsive to the subsequent striking of a first tube in said first binary counting circuit for applying a pulse to the next stage and means responsive to the subsequent striking of a second tube in said second binary counting circuit for applying a pulse to the next stage whereby the number injected into said second binary counting circuit is the complement of the number counted by said first binary counting circuit.

4. Checking arrangements as claimed in claim 1 wherein the code consists of a single "1" digit in a group of successive digit elements and additional checking arrangements are included at the receiver and comprise for each group of successive digit elements a first binary circuit a second binary circuit, a first indicating gas discharge tube and a second indicating discharge tube, means for initially setting said first binary circuit in the "0" position, means for initially setting said second binary circuit in the "1" position, means responsive to the second binary circuit in the "0" position for priming said first indicating gas discharge tube, means responsive to the second binary circuit in the "1" position for priming said second indicating gas discharge tube, means responsive to the reception of a one digit for transposing said second binary circuit and for applying an ignition potential to said first indicating gas discharge tube, means responsive to the transposition of said first binary circuit from the "1" position to the "0" position for applying an ignition potential to said second indicating gas discharge tube, means responsive subsequent to the last digit element of a group for transposing said first binary circuit from the "0" to the "1" position and means responsive subsequent to said last-mentioned means for transposing said first binary circuit from the "1" to the "0" position whereby neither of said first and second indicating gas discharge tubes strike if a single "1" digit is received in the group of successive elements, said first indicating gas discharge tube strikes if two "1" digits are received and said second indicating gas discharge tubes strikes if no "1" digit is received.

5. Checking arrangements as claimed in claim 1 wherein the code consists of a "1" digit in corresponding digit elements in two successive groups of digit elements and comprising in addition a plurality of groups of storage elements at said receiver, one storage element storing one digit and including a cold cathode gas discharge tube, a source of priming potential permanently applied to the gas discharge tubes of a first group of storage elements representing the first group of digit elements, means for applying an ignition potential to a gas discharge tube of one storage element of said first group to store a "1" digit and means responsive to the striking of a gas discharge tube of said one storage element for applying a priming potential to the gas discharge tube of the corresponding storage element of a second group of storage elements representing the second group of digit elements.

References Cited in the file of this patent

UNITED STATES PATENTS

| | | |
|---|---|---|
| 2,059,204 | Boswau | Nov. 3, 1936 |
| 2,399,473 | Desch | Apr. 30, 1946 |
| 2,426,278 | Mumma | Aug. 26, 1947 |
| 2,468,065 | Hartley | Apr. 26, 1949 |
| 2,606,243 | Lesigne | Apr. 5, 1952 |
| 2,609,143 | Stibitz | Sept. 2, 1952 |
| 2,640,872 | Hartley et al. | June 2, 1953 |
| 2,677,725 | Schuler | May 4, 1954 |
| 2,689,950 | Bayliss et al. | Sept. 21, 1954 |
| 2,696,599 | Holbrook | Dec. 7, 1954 |
| 2,703,361 | Van Duuren | Mar. 1, 1955 |
| 2,719,959 | Hobbs | Oct. 4, 1955 |
| 2,740,106 | Phelps | Mar. 29, 1956 |